(12) United States Patent
Fujita et al.

(10) Patent No.: US 6,700,679 B1
(45) Date of Patent: Mar. 2, 2004

(54) IMAGE RECORDING APPARATUS

(75) Inventors: Katsushi Fujita, Sayama (JP); Masato Doi, Sayama (JP); Tsuyoshi Sugita, Sayama (JP); Yasuaki Tamakoshi, Sayama (JP); Miyuki Hosoi, Hino (JP); Katsutoshi Sawada, Hino (JP)

(73) Assignee: Konica Minolta Holdings, Inc., Tokyo (JP)

( * ) Notice: Subject to any disclaimer, the term of this patent is extended or adjusted under 35 U.S.C. 154(b) by 0 days.

(21) Appl. No.: 09/399,002

(22) Filed: Sep. 20, 1999

(30) Foreign Application Priority Data

Sep. 21, 1998 (JP) .......................... 10-283567
Jun. 2, 1999 (JP) .......................... 11-154933

(51) Int. Cl.[7] ............................... H04N 1/46
(52) U.S. Cl. ....................... 358/1.9; 358/3.3
(58) Field of Search ............. 358/1.9, 3.3, 3.06–3.12, 358/500–502, 515–523, 527, 534, 535; 382/237

(56) References Cited

U.S. PATENT DOCUMENTS

| 4,268,871 | A | * | 5/1981 | Kawamura | 347/251 |
| 4,807,020 | A | * | 2/1989 | Hirosawa et al. | 358/530 |
| 5,191,361 | A | * | 3/1993 | Abe | 347/116 |
| 5,283,841 | A | * | 2/1994 | Yamada | 382/162 |
| 5,357,344 | A | * | 10/1994 | Kasamatsu et al. | 358/3.21 |
| 5,740,332 | A | | 4/1998 | Murakami | |

FOREIGN PATENT DOCUMENTS

| EP | 0 713 328 A2 | 5/1996 |
| EP | 0 826 495 A1 | 2/1998 |
| EP | 0 831 640 A2 | 3/1998 |

OTHER PUBLICATIONS

Copy of a European Search Report dated Aug. 13, 2003.

\* cited by examiner

Primary Examiner—Thomas D. Lee
Assistant Examiner—Stephen Brinich
(74) Attorney, Agent, or Firm—Finnegan, Henderson, Farabow, Garrett & Dunner, L.L.P.

(57) ABSTRACT

An image recording system is provided with an image data producing apparatus to produce and output halftone dot image data corresponding to a single sheet of output image, for each of plural colors successively; an image recording apparatus having a drum, a rotation driving mechanism, an optical unit to expose the light sensitive material on the drum to plural color light simultaneously in accordance with the halftone dot image data of plural ($N \geq 3$) colors, and a sub-scanning mechanism to move the optical unit in a direction parallel to a rotation axis of the drum; and an image data storing apparatus to store the halftone dot image data and to output the halftone dot image data to the image recording apparatus, the image data storing apparatus comprising plural memory devices each storing the halftone dot image data corresponding to a single sheet of the output image for one of plural (N or N−1) colors.

12 Claims, 46 Drawing Sheets

BLOCK DIAGRAM SHOWING THE FIRST EXAMPLE

BLOCK DIAGRAM SHOWING THE SECOND EXAMPLE

BLOCK DIAGRAM SHOWING THE THIRD EXAMPLE

BLOCK DIAGRAM SHOWING THE FOURTH EXAMPLE

BLOCK DIAGRAM SHOWING HALFTONE DOT IMAGE RECORDING APPARATUS OF THE INVENTION

DIAGRAM SHOWING EFFECT OF THE FIFTH EMBODIMENT

FIG. 26

| PRINTED MATTER DATA | | | | RED LASER INTENSITY | GREEN LASER INTENSITY | IR LASER INTENSITY | REPRODUCTION COLOR BY EXPOSURE |
|---|---|---|---|---|---|---|---|
| BK | C | M | Y | | | | |
| 0 | 0 | 0 | 1 | 100 | 100 | 0 | Y |
| 0 | 0 | 1 | 0 | 100 | 100 | 100 | M |
| 0 | 1 | 0 | 0 | 0 | 0 | 100 | G |
| 0 | 1 | 1 | 0 | 0 | 0 | 100 | B |
| 0 | 1 | 0 | 1 | 0 | 0 | 0 | G |
| 0 | 0 | 1 | 1 | 100 | 100 | 0 | R |
| 0 | 1 | 1 | 1 | 0 | 0 | 0 | GY |
| 0 | 0 | 0 | 0 | 100 | 100 | 100 | W |
| 1 | 0 | 0 | 0 | 0 | 0 | 0 | BK |
| 1 | 0 | 0 | 1 | 0 | 0 | 0 | BK |
| 1 | 0 | 1 | 0 | 0 | 0 | 0 | BK |
| 1 | 0 | 1 | 1 | 0 | 0 | 0 | BK |
| 1 | 0 | 0 | 0 | 0 | 0 | 0 | BK |
| 1 | 1 | 0 | 1 | 0 | 0 | 0 | BK |
| 1 | 1 | 1 | 0 | 0 | 0 | 0 | BK |
| 1 | 1 | 1 | 1 | 0 | 0 | 0 | BK |

FIG. 27

| | | CORRESPONDING LASER INTENSITY | | |
|---|---|---|---|---|
| | | R | G | IR |
| STANDARD COLOR | Y | 100 | 100 | 0 |
| | M | 100 | 0 | 100 |
| | C | 0 | 100 | 100 |
| | B | 0 | 0 | 100 |
| | G | 0 | 100 | 0 |
| | R | 100 | 0 | 0 |
| | BK | 0 | 0 | 0 |
| | GY | 0 | 0 | 0 |
| | W | 100 | 100 | 100 |

FIG. 28

| | | CORRESPONDING LASER INTENSITY | | |
|---|---|---|---|---|
| | | R | G | IR |
| STANDARD COLOR | Y | 100 | 100 | 0 |
| | M | 100 | 0 | 100 |
| | C | 0 | 100 | 100 |
| | B | 0 | 0 | 100 |
| | G | 0 | 100 | 0 |
| | R | 100 | 0 | 0 |
| | BK | 0 | 0 | 0 |
| | GY | 0 | 0 | 0 |
| | W | 100 | 100 | 100 |
| | SP | a | b | c |

FIG. 29

COLOR CORRECTION SETTING (%)
CHANNEL 1

LUT DATA OF CHANNEL 1:

| | | R | G | 1R |
|---|---|---|---|---|
| STANDARD COLOR | Y | 100 | 100 | 0 |
| | M | 100 | 0 | 100 |
| | C | 0 | 100 | 100 |
| | B | 0 | 0 | 100 |
| | G | 0 | 100 | 0 |
| | R | 100 | 0 | 0 |
| | BK | 0 | 0 | 0 |
| | GY | 0 | 0 | 0 |
| | W | 100 | 100 | 100 |

TEN KEY:
| 1 | 2 | 3 |
|---|---|---|
| 4 | 5 | 6 |
| 7 | 8 | 9 |
| | 0 | |

MENU — 116 MENU KEY
CLEAR — 115 CLEAR KEY
ENTER — 114 ENTER KEY

DIAGRAM SHOWING CONCRETE EMBODIMENT OF HALFTONE DOT IMAGE DATA STORING MEANS

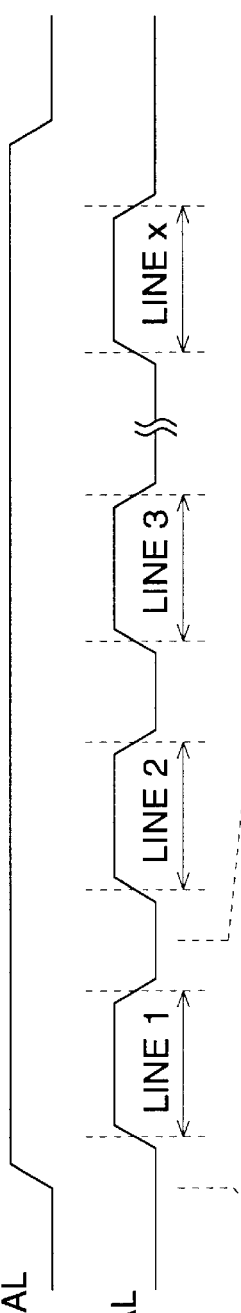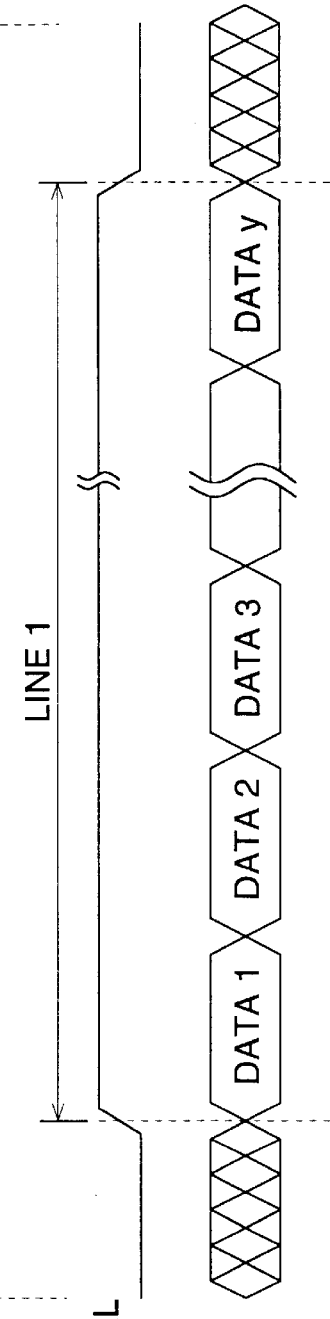
FIG. 47 (a) PAGE CONTROL SIGNAL
FIG. 47 (b) LINE CONTROL SIGNAL
FIG. 47 (c) LINE CONTROL SIGNAL
FIG. 47 (d) HALFTONE DOT IMAGE DATA SIGNAL

DIAGRAM SHOWING RELATIONSHIP BETWEEN
THE NUMBER OF DISKS AND DISK ACCESS TIME

ILLUSTRATION FOR DATA WRITING IN DISK AND READING

DIAGRAM SHOWING HOW DATA ARE HOUSED IN DISKS

ILLUSTRATION FOR REARRANGEMENT OF IMAGE DATA ON DISK

IMAGE RECORDING APPARATUS

BACKGROUND OF THE INVENTION

The present invention relates to an image recording system having therein a halftone dot image data producing apparatus which produces halftone dot image data and outputs them, an image recording apparatus which records a halftone dot image on a photosensitive material in accordance with halftone dot image data, and a halftone dot image data storing apparatus which stores halftone dot image data produced by the halftone dot image data producing apparatus and outputs the halftone dot image data to the image recording apparatus, and to the halftone dot image data storing apparatus.

In recent years, due to popularization of desk top publishing, there have been generalized an operation wherein images inputted from a scanner are subjected to image editing on a software of a computer and are paginated, and editing on a full digital basis has lost its novelty.

In the process of this sort, there are conducted image setter output wherein page-edited image data are directly outputted on a film, CTP (computer to plate) output wherein image recording is directly conducted on a printing plate, and CTC (computer to cylinder) wherein image recording is directly carried out on a printing plate which is wound around a cylinder of a printing machine, all for improving efficiency.

In this case, when output on a film or output on a printing plate is conducted only for confirmation of proofreading, and printing proofreading and other proofreading with other materials are conducted, there is caused a problem that films and printing plates are wasted and extra works are required.

Accordingly, in the process of this kind wherein image forming and image editing on a full digital basis are conducted by a computer, in particular, there is demanded a system to directly conduct color image output which is called DDCP (direct digital color proof).

In such DDCP, a color proof which reproduces output shown by digital image that is processed on a computer is prepared to confirm a pattern, an image color, a composition and letters and characters, before recording on a plate-making film with an image setter from digital image data processed on a computer, or before conducting final printing work to prepare a printing plate directly by CTP, or before conducting image recording with CTC directly on a printing plate wound around a cylinder of a printing machine.

In the process of proofreading in this printing process, a color proof is prepared and used for the following three applications.
1) Confirmation of errors in a job site, namely internal correction
2) External correction submitted to an orderer and a designer for confirmation of finish, and
3) Print samples supplied to an operator of a printing machine as a final sample of printed matters In this case, for internal confirmation and for a part of external correction, there are used proofreading materials incapable of reproducing a halftone dot image, namely, proofreading by a sublimation transfer system, and an occasion to use an outputted object from ink jet and electrophotography, because of needs such as shortening of delivery time and cost reduction. However, for the purpose of confirmation of reproducibility of highlight and details, and of confirmation of interference fringes representing improper phantom image called moire in printing, there actually is strong demand for a proof which can reproduce printed halftone dots faithfully.

Therefore, as an image recording system which makes such color proof as that stated above, there has been proposed an image recording system which has therein a halftone dot image data producing apparatus which produces halftone dot image data and outputs them, an image recording apparatus which records a halftone dot image on a photosensitive material in accordance with the halftone dot image data, and a halftone dot image data storing apparatus which stores halftone dot image data produced by the halftone dot image data producing apparatus and outputs halftone dot image data to the image recording apparatus.

As the image recording apparatus mentioned above, there has been proposed an image recording apparatus having therein a drum on which a photosensitive material can be fixed on the outer circumferential surface, a rotation driving mechanism which rotates the drum and an optical unit which exposes a photosensitive material fixed on the outer circumferential surface of the drum in accordance with image signals, and a sub-scanning mechanism which moves the optical unit in the direction which is in parallel with the rotation axis of the drum, wherein the photosensitive material is fixed on the drum, then the photosensitive material fixed on the outer circumferential surface of the drum is subjected to exposure by the optical unit in accordance with image signals while the drum is being rotated by the rotation driving mechanism, and the optical unit is moved by the sub-scanning mechanism in parallel with the rotation axis of the drum to record a halftone dot image on the photosensitive material fixed on the outer circumferential surface of the drum.

In this case, the halftone dot image data producing apparatus outputs halftone dot image data for each color in succession, but exposure is conducted simultaneously for plural colors on the image recording apparatus. Therefore, it is necessary to stock halftone dot image data temporarily. In the past, in this case, halftone dot image data equivalent to several times of main scanning are made in succession, and halftone dot image data equivalent to several times of main scanning are stored temporarily, then they are sent to the image recording apparatus where a halftone dot image is recorded.

However, the speed for generating halftone dot image data is not constant, and it sometimes takes more time than expected. In this case, what is stocked temporarily is only halftone dot image data equivalent to several times of main scanning. Therefore, an amount of produced data is not sufficient, which makes image recording to be impossible. In the conventional apparatus, therefore, when generation of data is not sufficient, the image recording apparatus was required to have a function to suspend image recording temporarily. There was further a problem that image recording time was long. Even in the case where the same halftone dot image is recorded on plural sheets of photosensitive material, each sheet required generation of halftone dot image data of raster image format, resulting in a long total image recording time caused by generating time for image data.

SUMMARY OF THE INVENTION

The invention has been achieved in view of the problems stated above, and its object is to prevent suspension of image recording by making image data and thereby to make it possible to conduct image recording at high speed by outputting image data at high speed.

The above object can be attained by the following structure.

An image recording system, comprises:

a halftone dot image data producing apparatus to produce and output halftone dot image data corresponding in amount to a single sheet of output image for each of plural colors in succession;

an image recording apparatus comprising a drum on an outer circumferential surface of which a light sensitive material can be fixed, a rotation driving mechanism to rotate the drum, an optical unit to expose the light sensitive material on the drum to plural color light simultaneously in accordance with the inputted halftone dot image data of plural (N≧3) colors, and a sub-scanning mechanism to move the optical unit in a direction parallel to a rotation axis of the drum, whereby the image recording apparatus records a halftone dot image on the light sensitive material in such a way that the light sensitive material is fixed on the drum, the drum is rotated by the rotation driving mechanism, the optical unit exposes the light sensitive material on the drum to plural color light in accordance with the halftone dot image data, and the sub-scanning mechanism moves the optical unit in a direction parallel to a rotation axis of the drum; and a halftone dot image data storing apparatus to store the halftone dot image data produced by the halftone dot image data producing apparatus and to output the halftone dot image data to the image recording apparatus, the halftone dot image data storing apparatus comprising plural memory devices each storing the halftone dot image data corresponding in amount to a single sheet for one of plural (N or N−1) colors.

Further, the above object may be attained by the following preferable structure.

In a system to record half tone dot image on a recording sheet made of a color light sensitive material, thereby producing a color proof, the color proof producing system is characterized in that the color proof producing system comprises half tone dot image data producing means for producing half tone dot image data;

half tone dot image data storing means for storing the half tone dot image data corresponding in amount to at least a single sheet of a color proof; and half tone dot image recording means for recording a half tone dot image on the recording sheet on the basis of the half tone dot image data read out from the half tone dot image data storing means, the half tone dot image recording means including a rotating hollow drum provided with a plurality of holes passing through from its peripheral surface to its inside, wherein a half tone dot image is form on the recording sheet while the drum is rotated on the condition that the recording sheet is wound and held around the drum, and pressure reducing means for reducing the inside pressure of the rotating drum, wherein the recording sheet can be formed in plural different sizes and the rotation speed of the rotating drum is changed in accordance with the size of the recording sheet wound around the rotating drum.

An image recording apparatus, comprising:

a drum;

a rotation driving mechanism to rotate the drum;

a roll setting section to set a roll of a light sensitive material;

a cutter to cut the light sensitive material fed from the roll setting section into a sheet; and a optical section to irradiating exposure points in plural channel with light from plural light sources; wherein the image recording apparatus records half tone dot image whose pixel density is 1000 dpi or more in such a way that the drum holds the light sensitive material cut by the cutter into the sheet whose sheet width and sheet length are 0.25 m or more, the rotation driving mechanism rotates the drum, and the exposure is conducted in accordance with digital image signals, and wherein the peripheral speed of the drum at the time of recording an image is 3 m/sec or more, the degree of eccentric of the drum is smaller than 100 $\mu$m, and the linear expansion coefficient $R1$(/K) of the drum and the diameter D (cm) of the drum satisfy the formula "$R1 \times D \leq 0.01$".

BRIEF DESCRIPTION OF THE DRAWINGS

FIG. 26 is a diagram showing combinations among Y, M, C and BK plates.

FIG. 27 is a diagram showing standard colors.

FIG. 28 is a diagram showing standard colors.

FIG. 29 is an illustration showing a color correction setting screen.

FIGS. 47(a) to 47(d) are time chart showing operations of data rearrangement.

DETAILED DESCRIPTION OF THE PREFERRED EMBODIMENT

The present invention relates to an image recording system having therein a halftone dot image data producing apparatus which produces halftone dot image data and outputs them, an image recording apparatus which records a halftone dot image on a photosensitive material in accordance with halftone dot image data, and a halftone dot image data storing apparatus which stores halftone dot image data produced by the halftone dot image data producing apparatus and outputs the halftone dot image data to the image recording apparatus, and to the halftone dot image data storing apparatus. Here, there will be explained various examples of the image recording system having therein a halftone dot image data producing apparatus which produces halftone dot image data and outputs them, an image recording apparatus which records a halftone dot image on a photosensitive material in accordance with halftone dot image data, and a halftone dot image data storing apparatus which stores halftone dot image data produced by the halftone dot image data producing apparatus and outputs.

First, the first example will be explained as follows, referring to a block diagram in FIG. 1. In the first example, there will be explained halftone dot image data storing apparatus 500 which is provided in halftone dot image recording apparatus 2 and stores halftone dot image data.

Halftone dot image data producing apparatus 200 is generally a general-purpose computer in which a software for generating halftone dot image data called a raster image processor (RIP) is incorporated, and it may also be one composed of a special-purpose hardware.

Halftone dot image data outputted from halftone dot image data producing apparatus 200 are stored in halftone dot image data storing apparatus 500 through the standard interface (IF) such as SCSI, IEEE 1394 and Ethernet or through a special purpose interface which is out of the standard. Due to this, when outputting "Fukuhan" (in Japanese, Fukuhan means that plural sheets of the same image are outputted, it is possible to transfer to the halftone dot image recording apparatus only by reading halftone dot image data from a memory device of the halftone dot image data storing apparatus 500 without doing RIP processing again.

Figure 2:
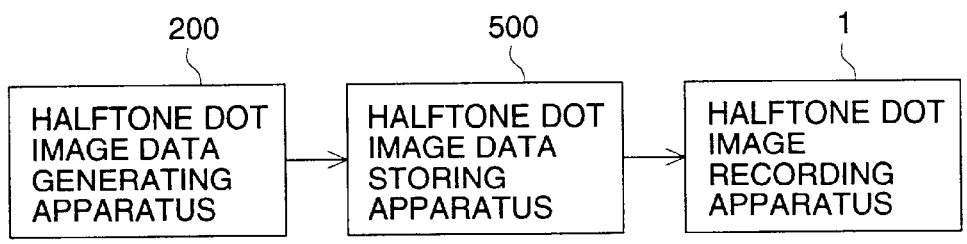
FIG. 2 is a block diagram showing the second example.
Figure 3:
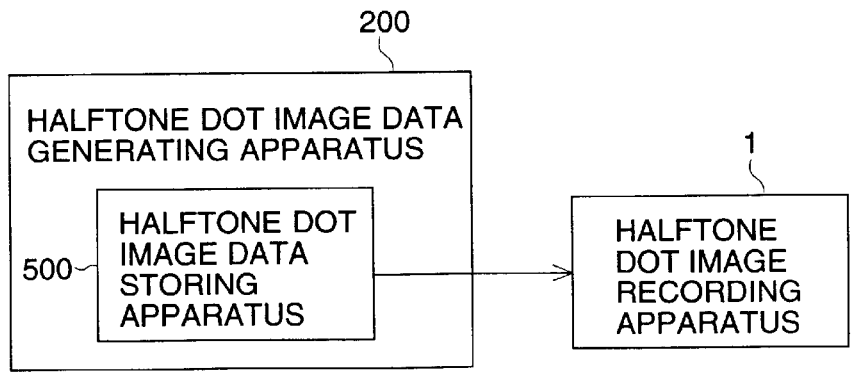
FIG. 3 is a block diagram showing the third example.

Though the halftone dot image data storing apparatus 500 is structured as a part of a main body of the halftone dot image recording apparatus 1 in the first example, the halftone dot image data storing apparatus 500 may also be arranged as a special purpose casing located between halftone dot image data producing apparatus 200 and halftone dot image recording apparatus 1 as shown in the second example in FIG. 2, or it may further be structured as a part in the halftone dot image data producing apparatus 200 as shown in the third example in FIG. 3. Further, each of the halftone dot image data producing apparatus 200 and the halftone dot image data storing apparatus 500 may be structured as a part of the halftone dot image recording apparatus 1 main body as shown in the fourth example in FIG. 4.

In this image recording system, the halftone dot image data producing apparatus 200 is an apparatus which outputs halftone dot image data for plural colors equivalent to one sheet in succession for each color. The halftone dot image recording apparatus 1 is an apparatus having therein a drum on which a photosensitive material can be fixed on its outer circumferential surface, a rotation driving mechanism which rotates the drum, an optical unit which simultaneously exposes the photosensitive material fixed on the outer circumferential surface of the drum for plural colors in accordance with inputted halftone dot image data for N (N≧3) colors, and a sub-scanning mechanism which moves the optical unit in the direction that is in parallel with the rotation axis of the drum. wherein the photosensitive material is fixed on the drum, the photosensitive material fixed on the outer circumferential surface of the drum is exposed by the optical unit in accordance with halftone dot image data while the drum is being rotated by the rotation driving mechanism, then the optical unit is moved by the sub-scanning mechanism in the direction that is in parallel with the rotation axis of the drum, and thus, the halftone dot image is recorded on the photosensitive material fixed on the outer circumferential surface of the drum, and it solves the problems stated above.

Therefore, in the present embodiment, there is provided halftone dot image data storing apparatus 500 which stores halftone dot image data produced by the halftone dot image data producing apparatus 200 and outputs halftone dot image data to the halftone dot image recording apparatus 1. This halftone dot image data storing apparatus 500 has one or more memory devices for each color of N pieces of colors or N−1 pieces of colors. The one or more memory devices for each color of N pieces of colors or N−1 pieces of colors can store halftone dot image data corresponding to one sheet of output image for the color. It can comply with high speed recording of halftone dot image of a drum rotation system by reading image data for plural colors simultaneously from the memory devices, outputting image data at high speed, and by recording plural colors simultaneously, and it can record halftone dot images at high speed, thus, it is possible to suppress occurrence of a phenomenon that image recording is stopped by preparation of image data.

Incidentally, temporary suspension of image recording caused by preparation of data which is not in time can be prevented by halftone dot image data storing apparatus 500 which stores halftone dot image data equivalent to one sheet for each color of N colors, which is preferable.

Even in the case of the storing apparatus which stores halftone dot image data equivalent to one sheet for each color of N−1 colors, temporary suspension of image recording seldom occurs because frequency of data generation for one color which is not in time is much lower than that of data generation for all of N colors which is not in time, which is more preferable than in the past. In this case, it is preferable that storing apparatus 500 which stores halftone dot image data equivalent to one sheet produces halftone dot image data for remaining color lastly, and halftone dot image data for other colors are outputted from other recording apparatuses, synchronizing with generation of halftone dot image data for the aforesaid color. In this case, it is preferable that the storing apparatus which stores halftone dot image data equivalent to one sheet has a buffer which temporarily stores halftone dot image data for remaining color.

It is preferable that the aforesaid image recording apparatus is one which simultaneously records images equivalent to the M scanning lines while the drum makes one turn based on halftone dot image data which are rearranged for each scanning line portion of plural lines (M lines), and the halftone dot image data storing apparatus has a data rearranging device which converts halftone dot image data inputted successively for each color from the halftone dot image data producing apparatus into the arrangement of data for each scanning line portion of the M scanning lines.

Due to this, halftone dot image data inputted successively for each color from the halftone dot image data producing apparatus are rearranged by the halftone dot image data storing apparatus into the arrangement of data for each row of M lines. Therefore, the image recording apparatus 1 can record halftone dot images at high speed.

It is preferable that the storing apparatus provided for each color of N colors or N−1 colors of the halftone dot image data storing apparatus stores halftone dot image data equivalent to one sheet rearranged by the data rearranging device.

Due to this, it is possible to comply with high speed recording of halftone dot images of a drum rotation type and to record halftone dot images at high speed by reading image data for plural colors simultaneously, then outputting image data at high speed and by recording plural colors simultaneously, and it is possible to supress occurrence of a phenomenon that image recording is stopped by preparation of image data, because the halftone dot image data storing apparatus has a storing apparatus which stores halftone dot image data equivalent to one sheet rearranged to arrangement of data for each of M rows from halftone dot image data inputted successively for each color from the halftone dot image data producing apparatus.

It is further preferable that the storage apparatus is a storing apparatus of a disk type and it is provided for each color.

Due to this, it is possible to comply with high speed recording of halftone dot images of a drum rotation type and to record halftone dot images at high speed by reading image data for plural colors simultaneously, then outputting image data at high speed and by recording plural colors simultaneously, and it is possible to supress occurrence of a phenomenon that image recording is stopped by preparation of image data, while making the storing apparatus to be capable of storing data requiring large storing capacity such as halftone dot image data and to be inexpensive.

It is preferable that a buffer which temporarily stores image data read out successively in the prescribe order from the storing apparatus of a disk type and outputs them is provided for each color, and dispersion of reading speed with which the storing apparatus of a disk type reads image data is adjusted and outputted by the butter provided for each color.

Owing to this, dispersion of reading speed with which the storing apparatus of a disk type reads image data is adjusted and outputted, because image data are stored in the pre-scribed order and a storing apparatus of a disk type is provided for each color of the plural colors. Therefore, relationship between image data read out of plural storing apparatuses of a disk type can be made to be of a prescribed relationship, and it is possible to make complicated systems not to be required for handling of image data inputted in the image recording apparatus.

It is preferable that there is provided a second buffer which temporarily stores successively image data outputted from the buffer provided for each color of the plural colors and outputs them, and this second buffer adjusts a difference between the speed of outputting image data from the buffer provided for each color of the plural colors and the speed of inputting image data in the image recording apparatus, and outputs it.

Due to this, it is possible to supress a phenomenon that dispersion of the speed of transmitting image data to the image recording apparatus makes the buffer not to function sufficiently.

It is preferable that there is provided a light buffer which temporarily stores halftone dot image data rearranged by the data rearranging device and outputs them, and this light buffer adjusts a difference between the speed of the data rearranging device to output image data and the speed of the storing apparatus of a disk type to write image data and outputs it.

Due to this, a difference between the speed of the data rearranging section to output image data and the speed of the storing apparatus of a disk type to write image data is adjusted, and thereby, it is possible to make the disk type storing apparatus to store data on a physically continuous state, and to read data stably at high speed.

Further it is preferable that the disk type storing apparatus is physically divided into plural physical storing areas so that image data equivalent to one sheet may be stored substantially only in one physical storing area to be outputted, and the presence or absence of defective physical storing area on the disk type storing apparatus is detected, and a defective physical storing area is not used.

Due to this, it is possible to record images at high speed by reading image data for plural colors simultaneously, outputting image data at high speed and by recording plural colors simultaneously, and it is possible to supress occurrence of a phenomenon that image recording is stopped by preparation of image data, because an external storing apparatus which stores and reads out image data in the prescribed order is provided for each color. It is further possible to supress occurrence of a phenomenon that the mutual relationship of image data read out of the plural disk type storing apparatuses is disturbed by the defective physical storing area used, because no defective physical storing area is used, and occurrence of reading error and writing error can be supressed, resulting in stable image recording.

Incidentally, "substantially only in one physical storing area" means that the invention includes one having no big difference substantially, emphasizing "substantially only in one physical storing area", because there is no big influence even when the first and last data only are stored in another physical storing area, for example.

It is preferable to detect the presence or absence of a defect on the physical storing area wherein image data read out by the reading speed for image data to be read out of the disk type storing apparatus have been stored.

Owing to this, it is possible to detect the presence or absence on physical storing areas without providing a special device, and it is possible to conduct stable and excellent storage and reading of halftone dot image data by avoiding storage of halftone dot image data in the physical storing area which has been detected as a defective one.

Incidentally, as a method to detect the presence or absence of a defect on the physical storing area wherein image data read out by the reading speed for image data to be read out of the disk type storing apparatus have been stored, there are given the following methods to which the invention is not limited.

The first method is one to detect the presence or absence of a defect on physical storing areas wherein image data read out of the external storing apparatus having low reading speed have been stored, from dispersion of the reading speed for image data to be read out of the external storing apparatus having low reading speed.

The second method is one wherein the presence or absence of a defect on physical storing areas is detected depending on whether or not the speed for reading image data out of the external storing apparatus is the prescribed speed or lower.

It is preferable that image data equivalent to one sheet are stored in one physical storing area in a continuous manner substantially and physically.

Due to this, it is not only possible to make halftone dot image data to be stored at high speed, but also possible to make them to be outputted at high speed.

It is preferable that the halftone dot image data storing apparatus has plural sets of the storing apparatuses provided for each color of the plural colors, and has a control means which selects one set out of the plural sets to make image data to be written and to make image data to be outputted from one set in other sets.

Due to this, it is possible to generate halftone dot image data with a halftone dot image data producing apparatus, and to record halftone dot images with a halftone dot image recording apparatus in accordance with halftone dot image data outputted from a halftone dot image data storing apparatus, while outputting the halftone dot image data to the halftone dot image data storing apparatus.

Figure 5:
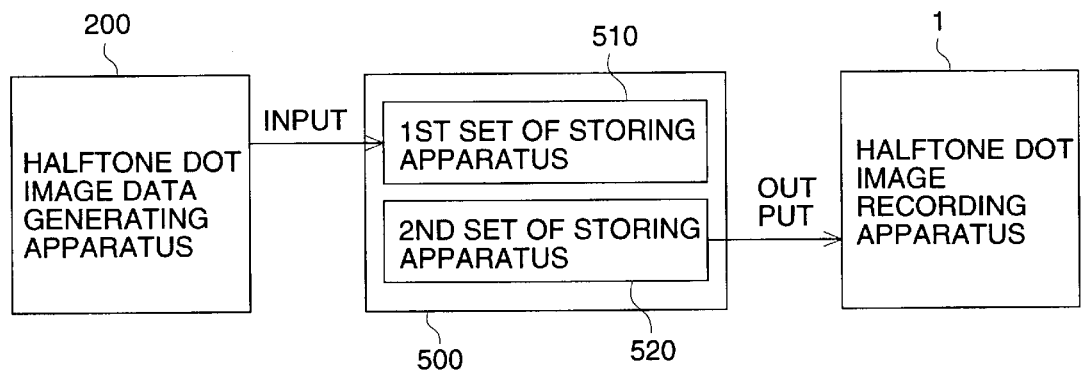
FIG. 5 is a block diagram showing a halftone dot image recording apparatus.

FIG. 5 is a block diagram showing the foregoing. In this example, halftone dot image data storing apparatus 500 has plural sets (two sets in this case) of storing apparatus, and while halftone dot image data are being read from a storing apparatus in one of the plural sets, for example, in first set 510 of storing apparatus, and are being transmitted to halftone dot image recording apparatus 1 for preparing a color proof, halftone dot image data can be transmitted from halftone dot image data producing apparatus 200 to the storing apparatus in the other of the plural sets, for example, in second set 520 of storing apparatus, resulting in improvement of total productivity.

Figure 6:
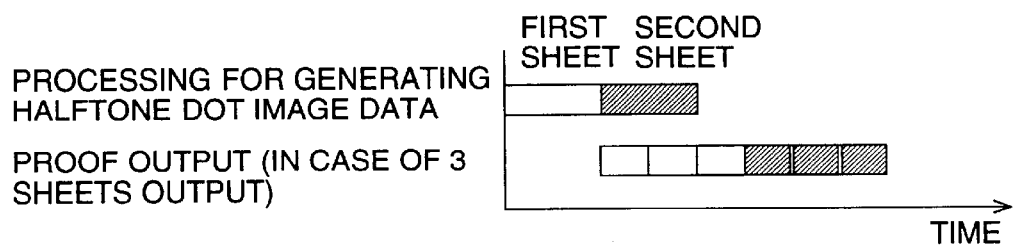
FIGS. 6(a) and 6(b) are diagrams showing effect of the present invention.
Figure 6:
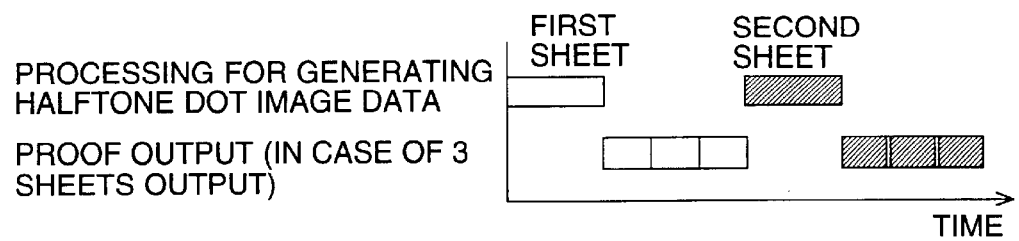

FIG. 6 is a diagram showing the effect of the foregoing. This diagram shows an example wherein a halftone dot image is recorded on each of three photosensitive materials from each of two sheets of halftone dot image data. FIG. 6(b) shows processing to generate halftone dot image data where the structure shown in FIG. 5 is not employed, in which, after the processing to generate halftone dot image data for the first sheet, halftone dot images for three sheets are recorded based on the produced halftone dot image data for the first sheet, and after completion of recording of halftone dot images for three sheets, the processing to generate halftone dot image data for the second sheet is conducted, and then halftone dot images for three sheets are recorded based on the halftone dot image data for the second sheet.

When the structure shown in FIG. 5 is employed, on the contrary, while conducting the processing to generate halftone dot image data for the second sheet after conducting the processing to generate halftone dot image data for the first sheet, halftone dot images for three sheets are recorded simultaneously based on the halftone dot image data for the first sheet, and after completion of the processing to generate halftone dot image data for the second sheet, halftone dot images for three sheets are recorded based on the halftone dot image data for the second sheet, as shown in FIG. 6(a). Thus, the time required for processing can be shortened, by recording halftone dot images based on halftone dot image data read out of the halftone dot image data storing apparatus while processing to generate other halftone dot image data is being conducted.

When the halftone dot image data storing apparatus has plural sets of the storing apparatuses provided for each of plural colors and has a control means which selects one set out of the plural sets to make image data to be written, and makes image data to be outputted from one set of other sets, as stated above, it is possible to output, while transmitting halftone dot image data to the halftone dot image recording apparatus 1 from one set of storing apparatuses in the plural sets of storing apparatuses of the halftone dot image data storing apparatus 500, the following halftone dot image data to another set of storing apparatus of the halftone dot image data storing apparatus 500 from the halftone dot image data producing apparatus 200.

Incidentally, the storing apparatus is an apparatus to store data and it includes an internal storing apparatus where a centering processing unit (CPU) such as a semiconductor memory can directly read and write and an external storing apparatus where the central processing unit (CPU) can not read or write directly. The external storing apparatus includes storing apparatuses of a disk type such as a hard disk drive (HDD) and a magnetic disk drive (MO) and a streamer which stores data on a magnetic tape such as DAT, and it is preferable that the external storing apparatus is one which stores data on a storing medium through magnetism or light and magnetism, but the invention is not limited only to these.

A buffer is an apparatus which stores data temporarily, and FIFO buffer element is an element which functions as a buffer which outputs data on a first in first out basis.

As plural colors, there are given four colors of Y, M, C and BK which represent original colors for printing, or three colors of B. G and R representing three primary colors of light, or three colors of Y, M and C representing three primary colors of color, or five or more colors including four colors of Y, M, C and BK representing primary colors of printing and one or plural specific colors, however, the invention is not limited to these. Incidentally, Y represents yellow, M represents magenta, C represents cyan, BK represents black, B represents blue, G represents green and R represents red.

EXAMPLE

Examples of the invention will be explained as follows, referring to the drawings. Incidentally, the invention is not limited to the examples explained below. Meaning of a terminology in the following explanation is strictly the meaning of the terminology used in the example, and the meaning of the terminology in the invention is not limited to the description.

Example

Figure 1:
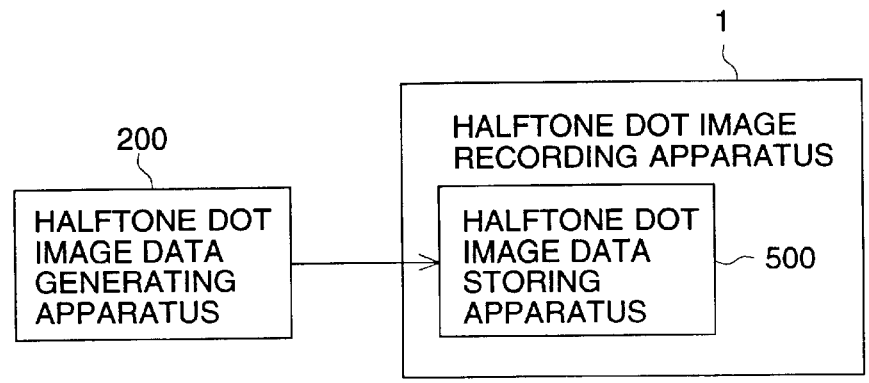
FIG. 1 is a block diagram showing the first example.

An image recording system of the present example is an image recording system explained in FIG. 1, and it is a system for obtaining a color proof for obtaining a proof for confirming the finish of printed matters in advance from digital signals. To be concrete, it is a system wherein, for making color printed matters, halftone dot image data of raster image format are prepared from digital image data described in various styles, and before preparing a printing plate, halftone dot image data of raster image format are prepared from digital image data by halftone dot image data producing apparatus 200, halftone dot image data storing apparatus 500 rearrange from the halftone dot image data of raster image format thus prepared to the halftone dot image data of the format suitable for halftone dot image recording apparatus 1, then a color proof for simulation of images obtained through printing by printing plates prepared from digital image data described in various styles is prepared when the halftone dot image recording apparatus 1 stores images based on halftone dot image data rearranged by the halftone dot image data storing apparatus 500, then, the presence or absence of errors in layout, colors, characters is inspected on the image shown by digital image data, and a color proof is prepared for confirming the finish of printed matters in advance.

An outline of the image recording system of the present example will be explained as follows halftone dot image data producing apparatus (raster image processor: RIP) 200 which is provided outside halftone dot image recording apparatus 1 of the present example and is connected to the halftone dot image recording apparatus 1 successively (surface-sequential) produces halftone dot image data of Y, M, C and BK of raster image format for each color from image data for electronic plate making which is an origin of electronic plate making.

It is preferable to reproduce from image data for electronic plate making by means of the collection of halftone dots having the same number of screen lines as in printed matters, and to reproduce by making a pixel gain amount to approximate that of printed matters. Due to this, it is not only possible to reproduce printing halftone dot images on a high fidelity basis but also possible to accurately reproduce tone jump, moir and image defects which are easily caused as troubles of image data for electronic plate making, resulting in a merit that correction can be made. Rough correction does not naturally require such reproduction on a high fidelity, and rough correction can be made for halftone dot images.

The halftone dot image data producing apparatus 200 sends halftone dot image data produced to halftone dot image data storing apparatus 500 for each color successively (surface-sequential). These halftone dot image data of a raster image format are converted into a format for exposure for each number of scanning lines (equivalent to one main scanning), and they are stored in a data accumulating apparatus attached to the halftone dot image data storing apparatus 500.

Figure 7:
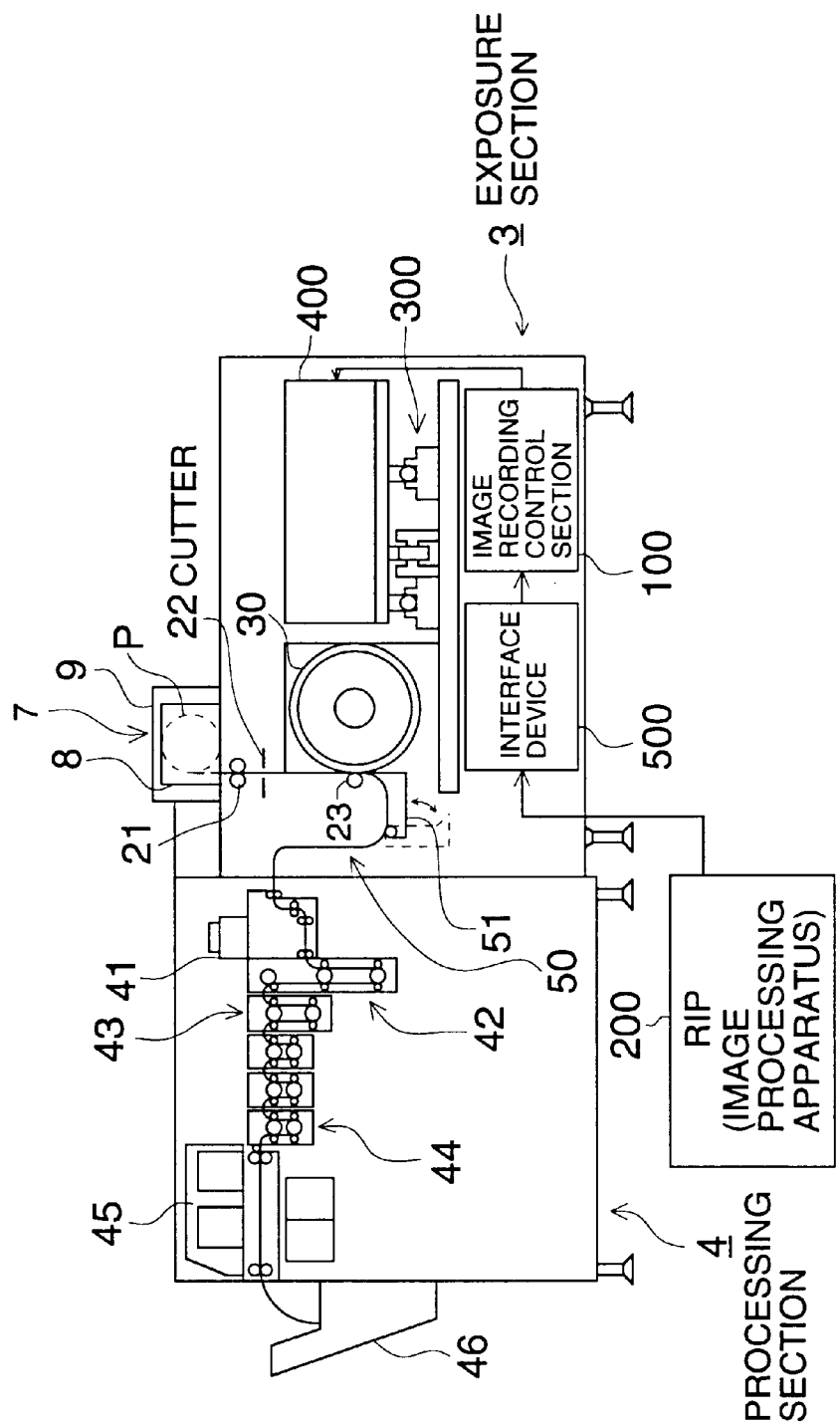
FIG. 7 is a cross sectional view showing a halftone dot image recording apparatus.

After halftone dot image data equivalent to one sheet for all colors of Y, M, C and BK converted into a format for exposure for each number of scanning lines (equivalent to one main scanning) are stored in a storing apparatus representing a data accumulating apparatus attached to the halftone dot image data storing apparatus 500, the halftone dot image data storing apparatus 500 reads out image data composed of all data of Y, M, C and BK with a format for exposure for each number of scanning lines, and outputs data of all colors simultaneously (point-sequential) to image recording control section 100 of the halftone dot image recording apparatus 100 shown in FIG. 7.

The image recording control section 100 controls to make photosensitive material P to be exposed to images based on image data wherein pixel data composed of inputted all data of Y, M, C and BK are converted to a format for exposure for each number of scanning lines.

First, halftone dot image recording apparatus 1 of the present example will be explained.
(Outline of the Halftone Dot Image Recording Apparatus)

In the halftone dot image recording apparatus 1 of the present example, a roll-shaped silver halide color photographic photosensitive material is set as a photosensitive material as shown in FIG. 7, then it is cut into a sheet at an exposure section, and is exposed to laser light in accordance with halftone dot image data rearranged by halftone dot image data storing apparatus 500, and then is developed at the developing section, thus, a color proof is made.

FIG. 7 is a schematic diagram showing an example of the internal structure of halftone dot image recording apparatus 1. The halftone dot image recording apparatus 1 has therein exposure section 3 for exposing images on a photosensitive material and processing section 4 for developing the exposed photosensitive material.

The following structure is roughly provided inside the exposure section 3. Roll setting section 7 is a portion where magazine 8 housing a roll of roll-shaped photosensitive material P is loaded, and it is provided on the upper portion of the apparatus main body. Loading of magazine 8 is conducted by opening and closing sheet-feeding cover 9. Though the roll setting section 7 of the present example is a portion where magazine 8 housing a roll of photosensitive material P is loaded, it may also be one where a roll of photosensitive material can directly be set.

Magazine 8 which is set on roll setting section 7 is a magazine which houses a roll that is rolled with its photosensitive surface of photosensitive material P facing outward. Incidentally, when the roll setting section 7 is one on which a photosensitive material roll can be set directly, it is preferable that a roll which is rolled with its photosensitive surface of photosensitive material P facing outward is set.

On the vertically lower portion of the roll setting section 7 for a magazine housing photosensitive material P, there are provided paired rollers 21 and cutter 22 which is for cutting a photosensitive material to a prescribed length. The paired rollers 21 are arranged at the position which is in the vicinity of an outlet for the loaded magazine 8 when the a magazine is loaded.

Squeeze roller 23 is provided on the vertically lower portion of the paired rollers 21, and it can be brought into contact with or separated from drum 30 provided on main scanning section 30. A conveyance path for a photosensitive material from the outlet for magazine 8 to the squeeze roller 23 is extended downward almost vertically. The squeeze roller 23 is pressed against drum 30 when photosensitive material P is supplied to the drum 30, so that the supplied photosensitive material P may be brought into close contact with an external circumferential surface of the drum 30. During that period, when the photosensitive material P is conveyed for a prescribed length, the squeeze roller 23 stops and cutter 22 cuts photosensitive material P into a sheet with a prescribed length. After that, the squeeze roller 23 rotates to make photosensitive material P to be brought into close contact with an external surface of the drum 30.

The drum 30 is made to be capable of rotating by the squeeze roller 23, and when photosensitive material P is conveyed to the drum 30, the photosensitive material P is fixed to the outer circumferential surface of the drum 30 by air suction while the drum 30 is being rotated by the squeeze roller 23. After the photosensitive material P is completely fixed to the outer circumferential surface of the drum 30, the squeeze roller 23 is separated from the drum 30. Then, after the squeeze roller 23 is separated from the drum 30, the mechanism to rotate the drum 30 makes the drum 30 to rotate at the rotating speed which is higher than that for fixing the photosensitive material P closely to the drum 30 and rotates the drum 30 at high speed while fixing the photosensitive material P on the outer circumferential surface so that the photosensitive material P may be subjected to main scanning in the course of recording.

Incidentally, it is preferable that the peripheral speed of the drum 30 for image recording is 3 m/sec or more (in particular, 5 m/sec or more, or further, 10 m/sec or more). Due to this, the time for image recording can be shortened. Further, it is preferable that the peripheral speed of the drum 30 for image recording is 70 m/sec or less (especially, 50 m/sec or less). Due to this, the peripheral speed of the drum 30 is stabilized, the time required to stabilize the peripheral speed is shortened, the cost of the apparatus is low, and safety is secured. Incidentally, in the halftone dot image recording apparatus, the peripheral speed of the drum 30 for image recording is about 30 m/sec.

Optical unit 400 is arranged to face the drum 30, and it is moved by sub-scanning mechanism 300 in the direction which is in parallel with the rotation axis of the drum 30. The optical unit 400 receives digital image signals and writes images with a laser beam on the photosensitive material P on the drum 30.

The optical unit 400 records a latent image of halftone dot image on the photosensitive material P while conducting exposure in accordance with digital image signals, with main scanning which means a rotation of the drum 30 on which the photosensitive material P is fixed on the outer circumferential surface and with sub-scanning which means movement of the optical unit 400 in the direction which is in parallel with the rotation axis of the drum 30.

Sheet ejection section 50 has exfoliation guide 51 which can come into contact with or can leave the drum 30. The exfoliation guide 51 is usually away from the drum 30, and when image writing is competed and the drum 30 stops, the exfoliation guide 51 comes in contact with the drum 30, the squeeze roller 23 is brought into pressure contact with the drum 30 to rotate it and the exfoliation guide 51 exfoliates the photosensitive material P from the drum 30.

When a leading edge of the photosensitive material P has passed paired conveyance rollers of sheet ejection section 50 after the photosensitive material P is exfoliated from the drum 30 by the exfoliation guide 51, the exfoliation guide 51 leaves the drum 30. Then, the sheet ejection section 50 sends the exfoliated photosensitive material P to developing section 4. Then, the sheet ejection section 50 conveys the photosensitive material at the conveyance speed used in the developing section 4 which is slower than the peripheral speed of the drum 30 (the same as the conveyance speed for a photosensitive material in exposure section 3 which is kept until the leading edge of the photosensitive material P arrives at developing section 4).

In that case, to avoid troubles caused by the speed difference, the trailing edge of the photosensitive material P is accumulated temporarily in accumulator section 60 located under the exfoliation guide 51, when the exfoliation guide 51 leaves the drum 30.

The developing section 4 is provided with color developing section 42, bleach fixing section 43, stabilizing section 44, drying section 45 and sheet ejection tray 46. When a direct positive photosensitive material of a chemical fog type is used, processing is conducted in the order of color developing processing, bleach fixing processing, stabilizing processing and drying, and the photosensitive material P thus developed is ejected onto sheet ejection tray 46.

Figure 4:
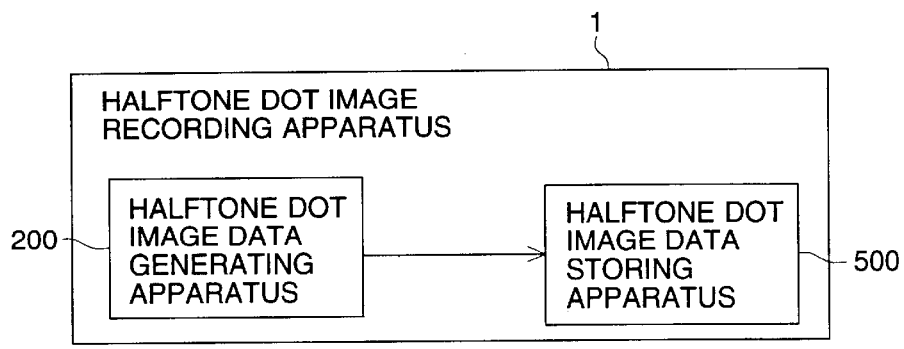
FIG. 4 is a block diagram showing the fourth example.

There is further provided second exposure section 41 which gives uniform exposure on the photosensitive material which has been finished in terms of image writing and is fed from the part of the exposure section 3, and when a direct positive photosensitive material of an internal latent image type is used, the second exposure section 41 is one which conducts exposure while photosensitive material P is in a processing liquid for color developing, and second exposure section 41 and color developing section 42 in FIG. 4 substantially constitute one processing tank wherein a shallower portion in the processing tank is the second exposure section 41.

Incidentally, the second exposure section 41 is needed when a photosensitive material used is a direct positive photosensitive material of an internal latent image type, and it is not necessary when a direct positive photosensitive material of a chemical fogging type is used.

(Sheet Feeding of the Halftone Dot Image Recording Apparatus)

Figure 8:
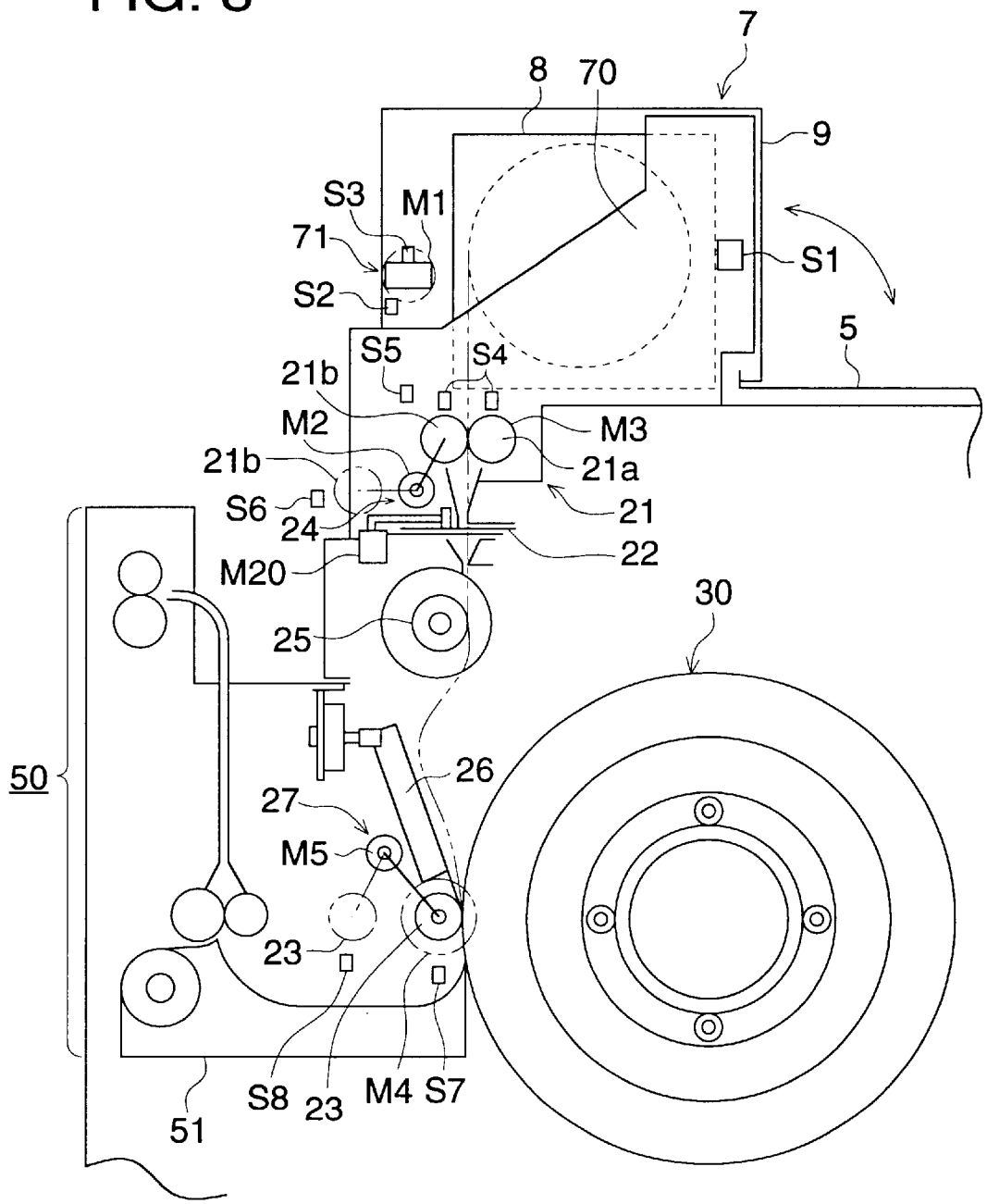
FIG. 8 is a cross sectional view showing a portion from roll setting section 7 to sheet ejection section 50.

Next, sheet feeding to the drum will be explained based on FIG. 8 representing the side view showing a range from roll setting section 7 to sheet ejection section 50.

As stated above, there is provided cover 9 on roll setting section 7 located on the upper portion of the apparatus main body so that the cover may be opened and closed, and magazine 8 is set in loading inlet 70 when the cover is opened. In this case, a proper amount of photosensitive material is drawn out of the magazine 8 in advance so that it may be nipped by paired rollers 21*a* and 21*b*. The roller 21*b* has on its surface high friction material such as rubber, while the surface of the roller 21*a* positioned on the emulsion side of the photosensitive material is structured with low friction material such as Bakelite having a smooth surface.

Under the condition that magazine 8 is set, the cover 9 is closed and locked by the use of locking mechanism 71. The locking mechanism 71 is operated by cover locking motor M1.

On the cover 9, there is provided magazine existence detection sensor S1, and on the loading inlet 70, there are provided cover opening/closing detection sensor S2 and cover locking detection sensor S3.

On the conveyance path between paired rollers 21 and magazine 8, there is arranged transmission type end detection sensor S4, and a trailing end of photosensitive material P housed in magazine 8 in a form of a roll is detected by the end detection sensor S4. The transmission type sensor has a convenient point that the trailing end of a photosensitive material can be surely detected even for roll setting section 7 having great degree of freedom for the position of a photosensitive material. In other words, when a detection means such as a reflection type sensor or a microswitch is used, it sometimes operates erroneously when a distance between the sensor and a photosensitive material is varied, but troubles like that are not caused when a transmission type detection means is used.

By positioning the end detection sensor S4 at the upstreamside of paired rollers 21 when viewed from the conveyance direction for a photosensitive material, it is not necessary to drop an abnormally shorter photosensitive material in a proper space as in the case of a conventional apparatus (because a conveyance means can be stopped when a photosensitive material is nipped by the conveyance means), and thereby no taking-out opening for exclusive use does not need to be provided, which is advantageous for easy operation and for a compact apparatus.

In the structure stated above, an opening for setting (inserting) a photosensitive material provided on the roll setting section 7 serves also as a taking-out opening for an abnormally shorter photosensitive material.

Roller (hereinafter referred to as a conveyance roller) 21*a* on one side of the paired rollers is fixed in terms of position, while roller (hereinafter referred to as a conveyance roller) 21*b* on the other side is arranged so that it can be moved by roller moving mechanism 24, and it is kept to be on standby at the standby position (shown with two-dot chain lines) excepting the period for conveying a photosensitive material, for the purpose of avoiding occurrence of creases caused by pressure contact of the roller.

The roller moving mechanism 24 is operated by conveyance means (conveyance roller) pressure contact releasing motor M2. Detection of the position of the conveyance roller 21*b* is conducted by both conveyance roller pressure contact position detection sensor S5 and conveyance roller releasing position detection sensor S6.

Incidentally, driving for the paired rollers is conducted by conveyance motor M3 through the conveyance roller 21*a*.

It is so arranged that when the trailing end of a photosensitive material is detected by the end detection sensor S4 while the photosensitive material is conveyed by the paired rollers, at least driving of the paired rollers is stopped based on the information of the detection of trailing end.

In this case, the distance between the sensor and the roller and the conveyance speed have been determined so that the photosensitive material may be nipped by the paired rollers.

It is so arranged that, simultaneously with this, liquid crystal panel 11 shows that photosensitive materials P have been used up, and displays processing for the abnormally shorter photosensitive material P which is nipped by the paired rollers 21.

In the structure stated above, it is also possible to structure so that the paired rollers are not only stopped but also rotated reversely for a prescribed time after being stopped so that the photosensitive material may be returned upward in the drawing, or it is possible to structure so that releasing of reverse rotation and/or pressure contact of the paired rollers may be conducted through manual operation means after the cover 9 is opened, or combination of the two above is available, resulting in a broad degree of freedom for the structure.

Cutter 22 is a disk cutter, and it is usually located at the initial position which is on one side of the conveyance path for photosensitive material P and is a retreated position. The cutter 22 is driven by cutter motor M20 to reciprocate in the lateral direction of photosensitive material P (the direction perpendicular to the sheet in FIG. 4).

Encoder roller 25 and guide 26 are provided between the cutter 22 and squeeze roller 23, and photosensitive material P which is conveyed drives the encoder roller 25 to rotate to measure the length of feeding for the photosensitive material.

Though the surface base body of the squeeze roller 23 is made of rubber in the apparatus of the present embodiment, the invention is not limited to this, and it is preferable from the viewpoint of close contact between the drum 30 and photosensitive material P that the surface base body is an elastic body. Due to this, elastic deformation of the surface base body of the squeeze roller 23 makes photosensitive material P to come in close contact with the drum sufficiently.

The squeeze roller 23 can be moved by roller moving mechanism 27 between the pressure contact position (shown with solid lines in FIG. 4) and the pressure contact releasing position (shown with broken lines in FIG. 4), and it is driven to rotate by drum sheet feeding/ejecting motor M4. Squeeze roller pressure contact position detection sensor S7 and squeeze roller releasing position detection sensor S8 detect the position of the squeeze roller 23. The roller moving mechanism 27 is operated by squeeze roller pressure contact releasing motor M5.

Incidentally, proper guide members can be provided among the paired rollers 21, the cutter 22 and the encoder roller 25, and it is further possible to provide other rollers which come in pressure contact with the encoder roller to nip and convey a photosensitive material and to provide another guide which faces guide 26.

Figure 9:
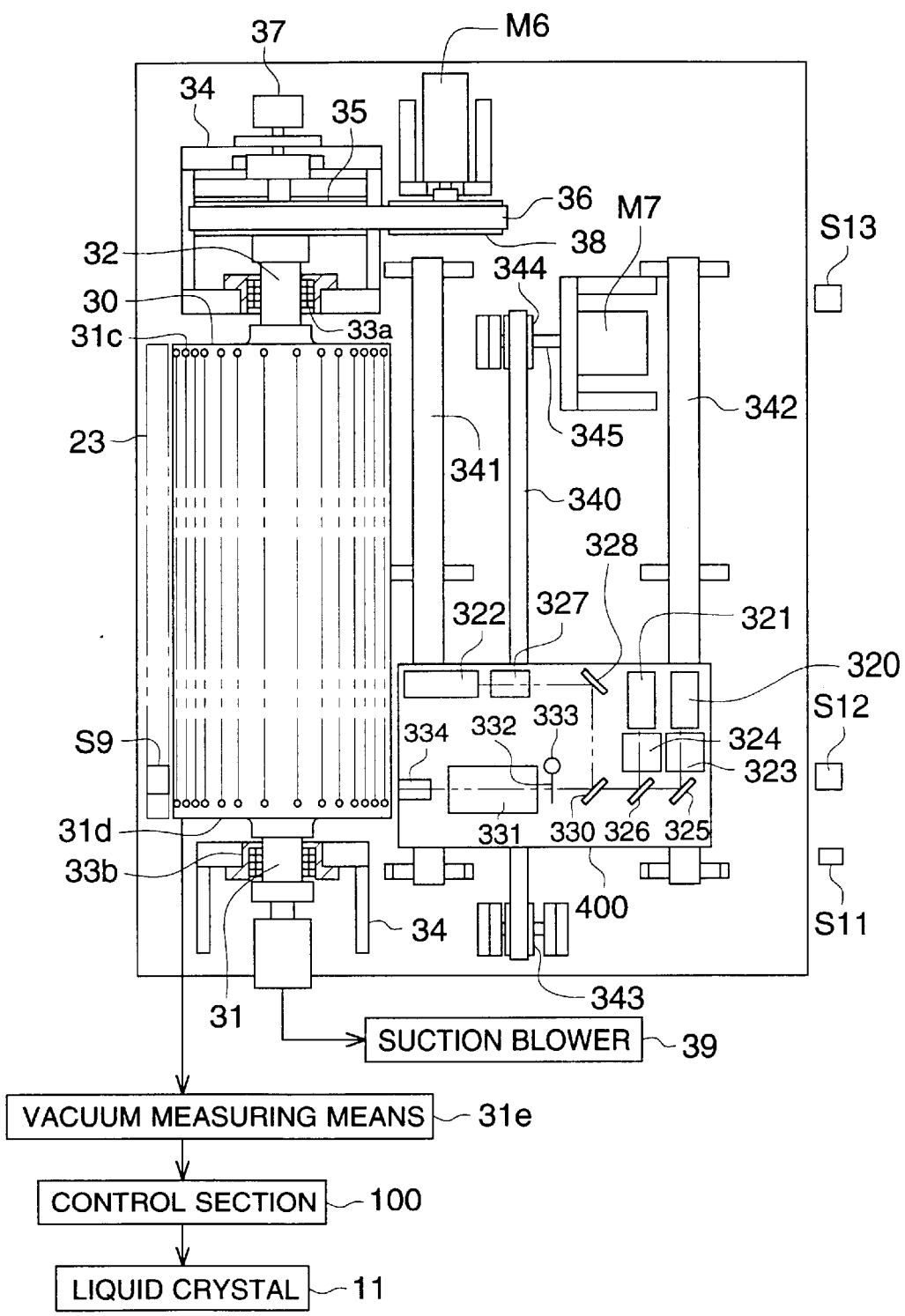
FIG. 9 is a top view showing the drum 30 and the surrounding of optical unit 400.

Next, drum 30 and surrounding of optical unit 400 will be explained based on FIG. 9 representing a top view showing the drum 30 and the surrounding of optical unit 400.

(Surrounding of the Drum of the Halftone Dot Image Recording Apparatus)

On both ends of the rotation shaft of the drum 30, there are provided shaft portions 31 and 32, and shaft portions 31 and 32 of the drum 30 are pivoted rotatably on supporting stand 34 through bearings 33*a* and 33*b*. A rotation driving mechanism which rotates the drum 30 on its rotation shaft is provided with driving pulley 35 provided on the shaft portion 32 on one side of the drum 30, output pulley 38 connected to the driving pulley 35 on a power basis through belt 36, drum rotating motor M6 which rotates the output pulley 38 and belt 36, thereby the drum rotating motor M6 rotates the output pulley 38 which transmits its rotation to the driving pulley 35 through the belt 36, thus the drum 30 is driven to rotate. The drum rotating motor M6 is a motor whose excitation can be released. Incidentally, the motor M6 is usually excited, and therefore, when another mechanism tries to rotate the motor shaft of the motor M6, there is caused resistance. However, when the excitation is released, the drum rotating motor M6 does not cause any resistance when the drum 30' is rotated by another mechanism.

Rotary encoder 37 is provided at the position which is on the shaft on one side of drum 30 and is further out of the position where the driving pulley 35 is provided, and pulse signals outputted from the rotary encoder are used for control of writing and reading. The shaft portion 31 on the other side of the drum is connected to suction blower 39.

The drum 30 is composed of a hollow body made of aluminum, and it is of the structure to have a number of suction holes each penetrating from the outer circumferential surface to the inside of the drum 30. Therefore, the inside of the drum 30 is decompressed by the operation of suction blower 39, and thereby, photosensitive material P can be fixed on the surface of the drum 30 through air suction.

It is preferable that a diameter of the drum 30 is 10 cm or more from the viewpoint of usefulness and curl of a color proof to be made and exposure accuracy, and it is 1 m or less (in particular, 50 cm or less, or further 40 cm or less) from the viewpoint of the easy production for obtaining apparatus cost, apparatus size and necessary exposure accuracy and of less bad influence of thermal expansion. Incidentally, the diameter in the halftone dot image recording apparatus of the present example is 29 cm.

The width of the drum 30 (length of outer circumferential surface of the drum 30 in the rotation axis direction) is preferably 30 cm or more (in particular, 50 cm or more) from the viewpoint of usefulness of a color proof to be made, and it is preferably 1.5 m or less (in particular, 1 m or less) from the viewpoint of easy production for obtaining apparatus cost, apparatus size and necessary exposure accuracy. Due to this, specific mechanical strength is not necessary, and low cost is realized, the machine is not so heavy, floor space is not limited, and the machine can be installed at a convenient location. Incidentally, the width of the drum in the halftone dot image recording apparatus of the present example is 60 cm.

It is preferable that the sheet width of photosensitive material P to be exposed (length of photosensitive material P in the direction of the rotation axis of the drum 30) is 1.5 m or less, from the viewpoint of the easy production to obtain apparatus cost, apparatus size and necessary exposure accuracy, and due to this, the size in the direction of the drum shaft can be small, and weight for obtaining structure accuracy and strength for the drum itself, mounting section for the drum, and optical scanning section can be small, and it is not necessary to select the installation location. It is further preferable from the viewpoint of usefulness of a color proof to be made that the sheet width is 25 cm or more (in particular, 50 cm or more).

It is preferable that the sheet length of photosensitive material P to be exposed (length of photosensitive material P in the rotation direction of the drum 30) is 2 m or less (in particular, 1.5 m or less) from the viewpoint of the easy production to obtain apparatus cost, apparatus size and necessary exposure accuracy, and due to this, the size in the direction of the drum radius can be small, influence of thermal expansion of the drum is small, processing accuracy can easily be secured, weight for obtaining necessary structure accuracy and strength can be small, and it is not necessary to select the installation location. It is further preferable from usefulness of a color proof to be made that the sheet length is 25 cm or more.

The sheet size of photosensitive material P to be exposed is preferably 0.06 $m^2$ or more (in particular, 0.12 $m^2$ or more) from the viewpoint of usefulness of a color proof to be made. The sheet size of 3 $m^2$ or less (in particular, 2 $m^2$ or less) is preferable, and due to this, the apparatus size can be small, and the weight for obtaining necessary structure strength can be made to be on the level where the installation location does not need to be selected.

In the halftone dot image recording apparatus of the present example, the sheet width and sheet length of photosensitive material P correspond to 57 cm×35 cm, 57 cm×70 cm and 57 cm×85 cm, and in the case of the size of 57 cm×35 cm, an effective image area is 55.5 cm×33.7 cm and an image of A3 size can be reproduced, while in the case of the size of 57 cm×70 cm, an effective image area is 55.5 cm×67.4 cm and an image of A2 size can be reproduced, and in the case of the size of 57 cm×85 cm, an effective image area is 55.5 cm×82.8 cm and an image of B2 size can be reproduced.

Figure 10:
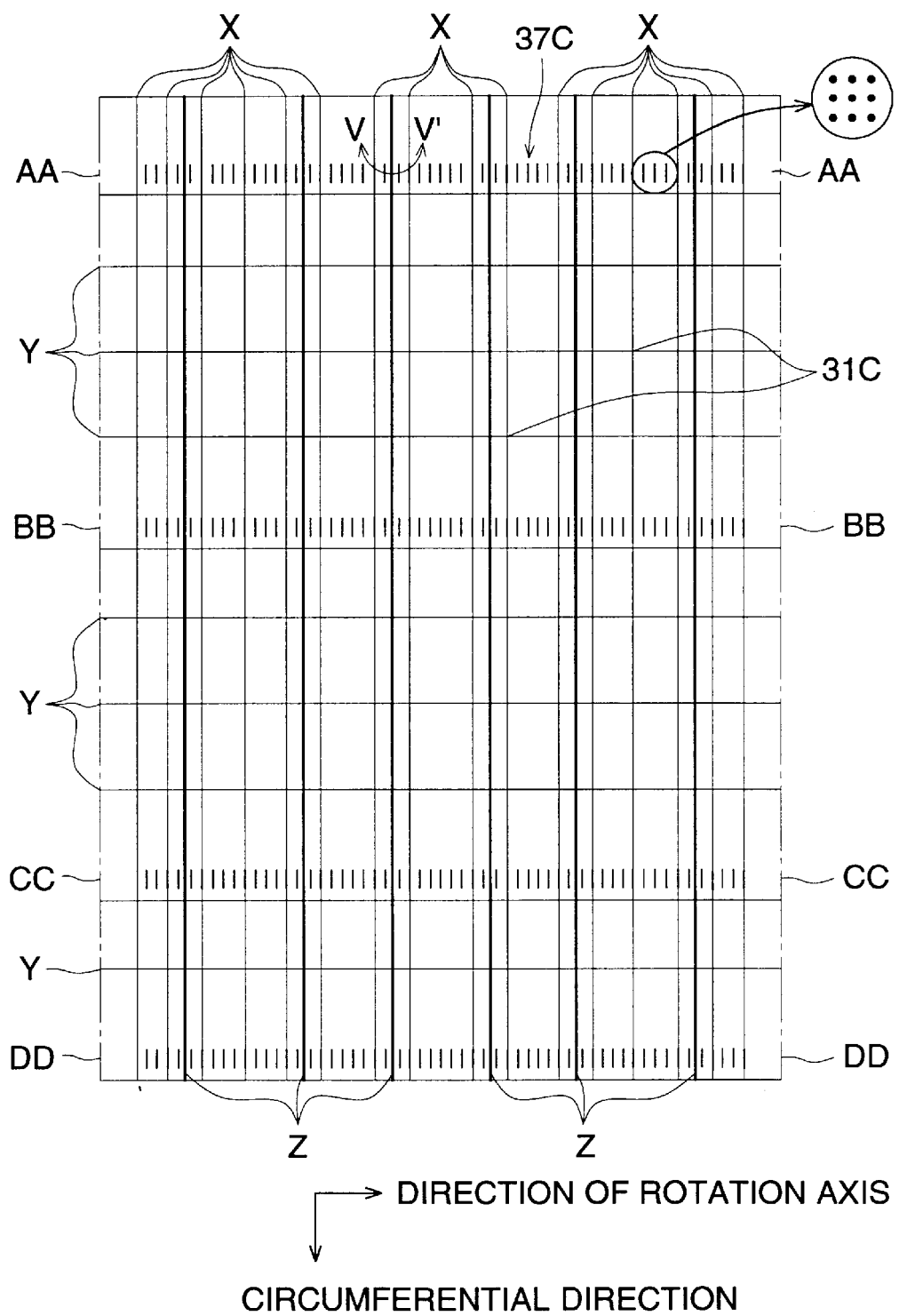
FIG. 10 is a development elevation view showing a circumferential surface of the drum 30.

Next, arrangement of a large number of suction holes 37c provided on drum 30 will be explained, referring to FIG. 10. FIG. 10 is a development elevation of a circumferential surface of the drum 30. The position of a leading edge of photosensitive material P held on the outer circumferential surface of the drum 30 is always constant. Independently of the size of a photosensitive material, more suction holes 37c than those on other areas are provided on the linear area AA extended in the direction of rotation axis on the position where the leading edge portion of photosensitive material P held on the outer circumferential surface of the drum 30 is located. Due to this, the leading edge of photosensitive material P which is easily exfoliated by high speed rotation of the drum 30 is hardly exfoliated, and exposure can be carried out stably.

Further, more suction holes 37c on the drum 30 are provided on the position corresponding to the trailing edge of each photosensitive material in different size, and more suction holes are provided on linear area BB extended in the direction of rotation axis corresponding in terms of position to the trailing edge of A3 size held on the outer circumferential surface of the drum 30, on linear area CC extended in the direction of rotation axis corresponding in terms of position to the trailing edge of A2 size held on the outer circumferential surface of the drum 30, and on linear area DD extended in the direction of rotation axis corresponding in terms of position to the trailing edge of B2 size held on the outer circumferential surface of the drum 30, in the same way as in the linear area AA extended in the direction of rotation axis corresponding to the leading edge held on the outer circumferential surface of the drum 30 which is common to plural sizes of photosensitive material. Further, suction holes 31c are provided on intersections of plural grooves X extended in the direction of rotation axis and plural grooves Y extended in the direction of rotation (circumferential direction). Owing to the arrangement and distribution of these suction holes 31c and grooves for suction, each of photosensitive materials in different sizes can be attracted closely.

Figure 11:
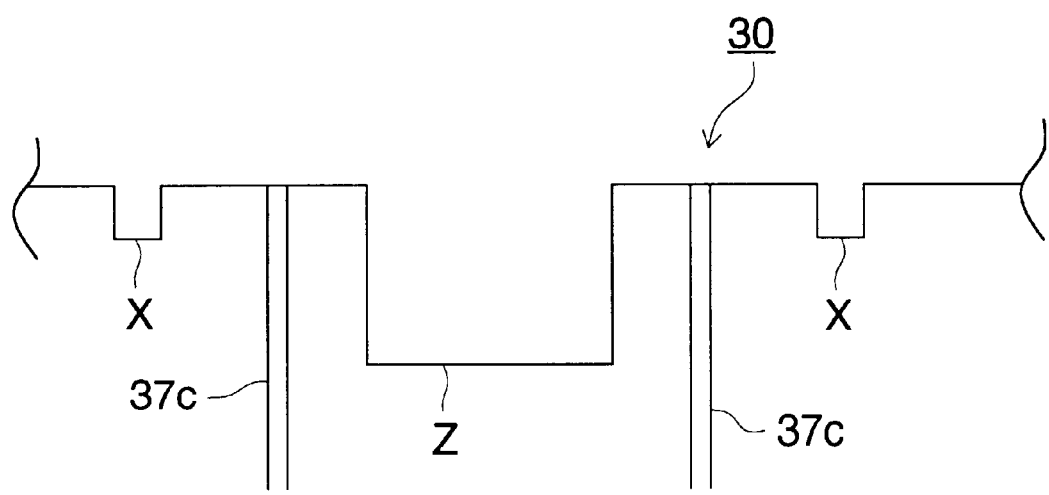
FIG. 11 is a sectional view taken on line V–V' in FIG. 10.

As shown with thick lines in FIG. 10, plural exfoliation grooves Z are provided on the entire circumference in the direction of rotation (circumferential direction). This exfoliation groove is formed to be broader and deeper than the groove X for air suction so that claw section 51a of exfoliation guide 51 which exfoliates a photosensitive material may enter, as shown in FIG. 11 which shows a sectional view taken on line V–V' in FIG. 10.

For the following explanation, an area within a range where a photosensitive material in either size can be held on the surface of drum 30 is defined as a holding area. It is preferable that the rate of an area of suction holes to the holding area is 0.01% or more (in particular, 0.02% or more), because a loss of suction pressure is less, holding capability by means of suction is greater, and partial lifting can be prevented. It is further preferable that the rate of an area occupied by suction holes to the holding area on the surface of the drum 30 is 5% or less (in particular, 1% or less), because bad influence on rigidity of the drum is less, holding capability by suction is sufficient, and in the case of multi-size in particular, leakage of air from the area other than a small size sheet is less and thereby, a small size sheet can be held sufficiently even in the case of high speed rotation. In the apparatus of the present embodiment, the holding area on the surface of drum 30 has therein about 300 suction holes each having a diameter of about 1.4 mm. Therefore, the rate of an area of suction holes to the holding area on the surface of drum 30 in the apparatus of the present embodiment is about 0.03%.

Suction hole density in the holding area on the surface of drum 30 means the number of suction holes per unit area in the holding area on the surface of drum 30, and it is preferably 50 holes/m$^2$ or more (in particular, 100 holes/m$^2$ or more) from the viewpoint of stable suction of photosensitive material P and uniform suction, and it preferably is 100000 holes/m$^2$ or less (in particular, 10000 holes m$^2$ or less) from the viewpoint of manufacturing cost of drum 30 and suction force per one suction hole. In the apparatus of the present embodiment, suction hole density in the holding area on the surface of drum 30 is about 200 holes/M$^2$.

The drum 30 is in a shape of a cylinder closed on its shaft 32 side, and it is of a structure wherein leakage of air from the outside is prevented by a disk provided on the internal surface of the cylinder on the other side except leakage through holes penetrating from the circumferential surface to the inside. On this disk, there is provided shaft 31 whose tip is connected, through a pipe, to suction blower 39 which decompresses the inside of drum 30. Thus, the inside of the drum 30 is decompressed when the suction blower 39 operates. On the disk on which the shaft 31 is provided, there is provided pressure detection meter 31e as shown in FIG. 9. and the pressure detection meter 31e detects pressure inside the drum 30.

Further, the pressure detection meter 31e detects pressure inside the drum 30 before a photosensitive material is wound around the drum 30 and pressure inside the drum 30 after a photosensitive material has been wound around the drum 30. Then, based on both pressures thus detected, control section 100 judges whether or not a photosensitive material jammed when it is supplied, and it makes liquid crystal panel 11 to display occurrence of a jam.

(Sub-scanning Mechanism of the Halftone Dot Image Recording Apparatus)

Figure 12:
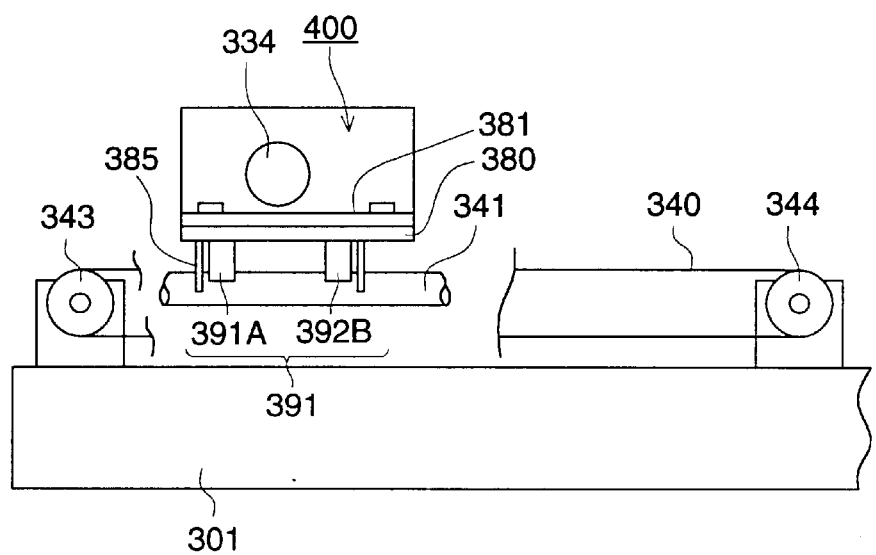
FIG. 12 is a sectional view of the side of the sub-scanning mechanism.
Figure 13:
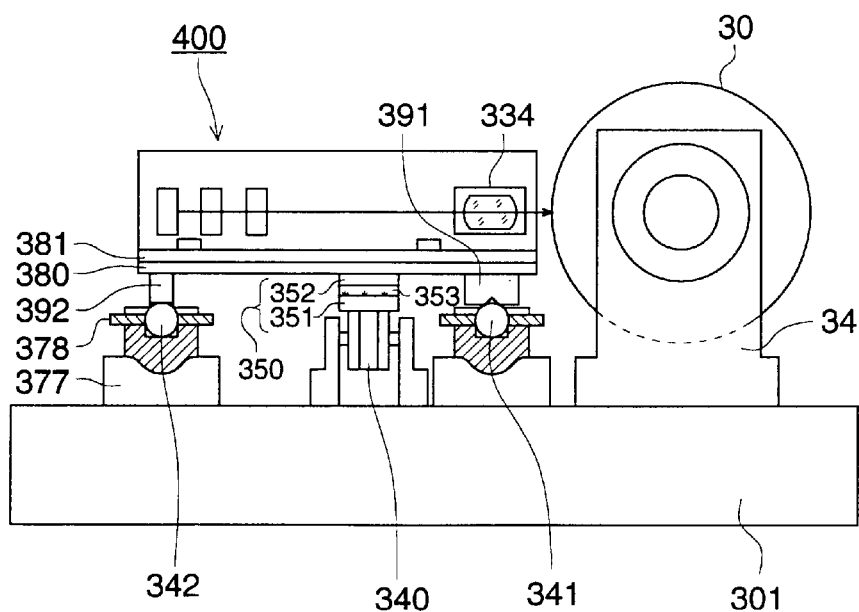
FIG. 13 is a sectional view of the rear side of the sub-scanning mechanism.

Next, sub-scanning mechanism 300 which conducts sub-scanning by moving optical unit 400 will be explained, referring to FIG. 9, FIG. 12 which represents a sectional view of the side of the sub-scanning mechanism and FIG. 13 representing a sectional view of the rear side. The optical unit 400 is fixed on metal belt 340, and it can move in the direction that is in parallel with the rotation axis of drum 30, while being guided by paired guide rails 341 and 342 provided to be in parallel with the rotation axis of drum 30. The metal belt 340 is trained about paired pulleys 343 and 344, and the pulley 344 on one side is connected directly to rotation shaft 345 of driving motor M7. When the rotation shaft 345 is rotated by the driving motor M7, pulley 344 fixed on the rotation shaft 345 is rotated, and thus, the metal belt 340 trained about pulley 343 and pulley 344 is rotated. Then, light source section 400 on metal belt 340 moves in the direction that is in parallel with rotation axis of drum 30.

Incidentally, the driving motor M7 is a pulse motor, and it is fixed on apparatus main body 301. As the driving motor M7, it is also possible to use a servo-motor. The optical unit 400 is connected to the metal belt 340 through its connecting section 350, and when the driving motor M7 rotates, the metal belt 340 is rotated and the optical unit 400 moves straight.

This metal belt 340 is a flat belt made of metal, and its material preferably includes, for example, 301 stainless steel, 302 stainless steel, titanium, and beryllium copper. A thickness of the metal belt is preferably 0.025 mm to about 0.5 mm. Yield strength of the material is preferably 180 kg/mm$^2$ (in the case of SUS301HY). Since the metal belt is light in weight and thin in thickness, highly accurate positioning control can easily be carried out. In the driving system by means of a metal belt, initial dimension can be maintained for a long time because there is no sliding portion, no lubricant is needed and the system is clean, which is different from a screw driving system. Further, the metal belt which is not gear driving does not cause uneven rotation, and it can conduct highly accurate straight guiding.

In the sub-scanning mechanism, platen 380 is guided straight by sliding members 391 and 392 which slide, when the metal belt 340 is driven to rotate by driving motor M7, on guide shafts 341 and 342 which are fixed on apparatus main body 301. The sliding member 391 is composed of sliding members 391A and 391B.

A material used for the guide shafts 341 and 342 is stainless steel which is easily machined and is easily finished accurately. Therefore, the optical unit 400 can be guided accurately by the guide shafts. The guide shafts 341 and 342 are mounted on shaft fixing rest 377, and are fixed thereon after fine adjustment by screw 377M. With regard to straight movement guide mechanism 70, the sliding member 391 having V-groove slides to the guide shaft 341 side and moves straight. The sliding member 392 slides to the guide shaft 342 side. The metal belt 340 is arranged on the side of the guide shaft 341 to smooth the driving. Incidentally, in place of the sliding member having a V-groove, it is also possible to use two bearings which are put on the guide shaft in a way that outer circumferential surfaces of the two bearings form a V shape.

A vibration-preventing method for a straight movement guide mechanism will be explained. Between the metal belt 340 and the optical unit 400, there is provided vibration-preventing member 353 which is fixed between upper connection member 352 and lower connection member 351 both of connection section 350. This prevents that vibration is transmitted from the metal belt 340 to the optical unit 400 to lower accuracy of the position of exposure conducted by a beam of light.

Next, how to clean the guide shaft in the straight movement guide mechanism will be explained. Cleaning member 385 such as nonwoven fablic cloth is mounted on the sliding member 391, and the cleaning member cleans a sliding surface of guide shaft 341 when the cleaning member moves. Incidentally, though the cleaning member 385 is fixed on the platen 380, it may also be fixed on the sliding member 391. In the same way, an unillustrated cleaning member which cleans a sliding surface of guide shaft 342 through the movement of the sliding member 392 is provided.

The driving motor M7 rotates slowly for the advance movement of the optical unit 400 for exposing photosensitive material P, while the driving motor rotates at high speed for the returning movement of the optical unit 400 by increasing the speed of rotation for returning the optical unit at higher speed than that for advance movement of the same. Due to this, speedup of exposure can be attained.

The optical unit 400 is suspended at the sub-scanning reference position, then sub-scanning is started from this position, and when the sub-scanning is completed with an amount of movement corresponding to the image size, the optical unit returns to the sub-scanning reference position.

On the side of the movement area of the optical unit 400, there are provided sub-scanning reference position detection sensor S11, sub-scanning writing position detection sensor S12 and sub-scanning overrun position detection sensor S13 to be in parallel with the direction of the drum shaft.

The optical unit 400 is suspended at the detection position of the sub-scanning reference position detection sensor S11, then sub-scanning is started from this position, and when the sub-scanning is completed with an amount of movement corresponding to the image size, the optical unit returns to the sub-scanning reference position.

Further, as shown in FIG. 5, encoder 37 which detects rotational position of drum 30 is provided to be coaxial with the rotation axis of drum 30. Based on pulse signals outputted, and leading edge position signals for photosensitive material P outputted from leading edge position sensor S9 which detects the leading edge position of photosensitive material P, the encoder 37 conducts writing control and rotation control for drum rotating motor M6. The drum rotating motor M6 rotates drum 30 at high speed by the use of a servo-motor.

To be more concrete, encoder 37 which detects rotational position of drum 30 is provided to be coaxial with the rotation axis of drum 30 as shown in FIG. 9. The encoder 37 has therein a reference phase, phase A and phase B, and each phase outputs pulse signals which are sent to control section 100. Information of leading edge position for photosensitive material P is inputted into the control section 100 from leading edge position sensor S9 which detects a leading edge position of photosensitive material P, and the control section 100 conducts writing control and rotation control for drum rotating motor M6 based on information from the leading edge position sensor S9 and from the encoder 37. The drum rotating motor M6 rotates drum 30 at high speed by the use of a servo-motor.

The control section 100 sets the reference phase (rotational angle serving as a reference) of the encoder 37 on the leading edge position of photosensitive material P. To be concrete, the control section 100 counts pulse signals which are outputted from the encoder 37 for a certain rotational angle with a reference of leading edge position detection signal from the leading edge position sensor S9, and sets the reference phase of the encoder 37 on the leading edge position of photosensitive material P.

The control section 100 detects an amount of feeding in the direction of drum rotation with the reference phase of the encoder 37 serving as a starting point, and controls the image writing position based on the amount of feeding mentioned above. The pulse signals are detected in the direction of drum rotation with the reference phase of the encoder 37 serving as a starting point, and the image writing position is determined with the prescribed pulse count to write images.

Figure 14:
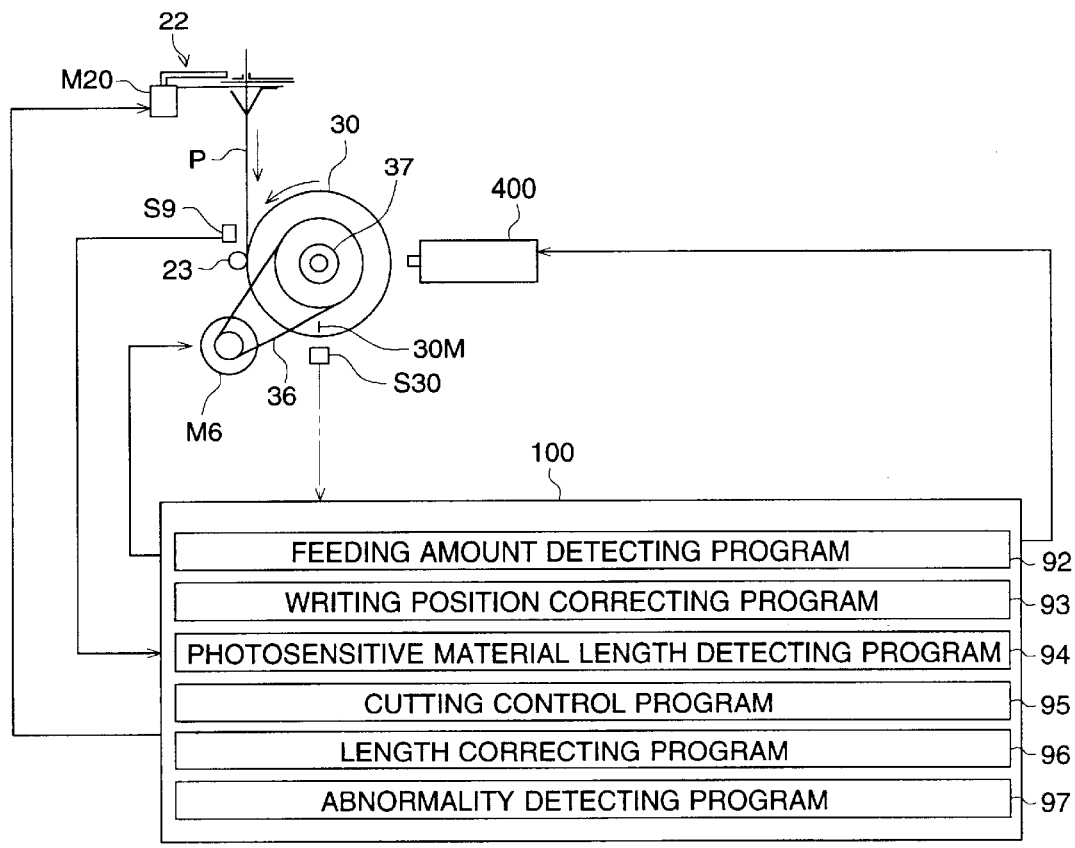
FIG. 14(a) is an illustration showing an arrangement among a drum 30, an optical unit 400, and an encoder 37.
FIG. 14(b) is a diagram showing pulse signal outputted from the encoder 37.
Figure 14:
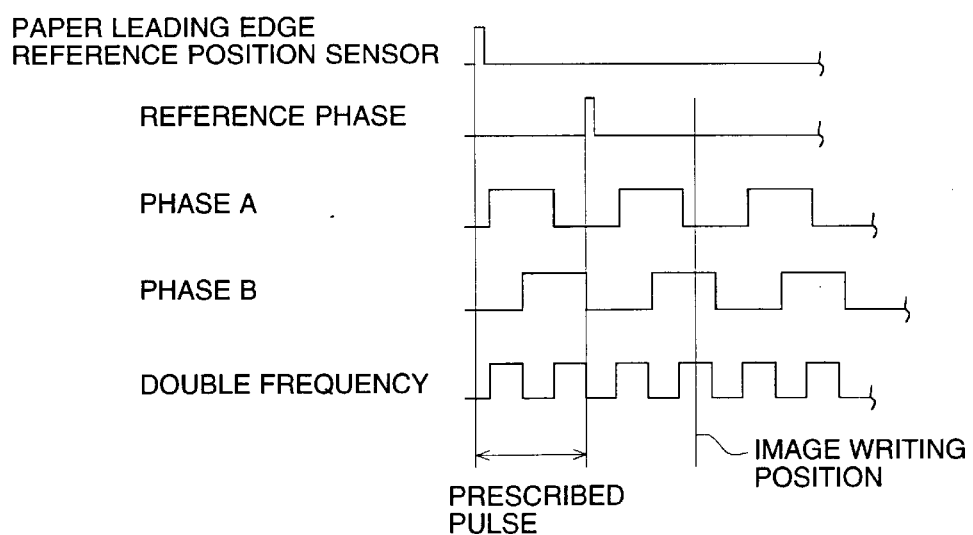

Further, in the control section 100, pulse signals with double frequency are generated by the use of phase A and phase B both outputted from the encoder 37 as shown in FIG. 14(*b*), and image writing is conducted with a reference of the number of pulse signals from the reference phase. Pulse signals with double frequency are generated by processing phase A and phase B outputted from the encoder 37 through exclusive OR, and image writing is conducted with a reference of the pulse signals, which makes it possible to control an error of image writing position and thereby to improve image quality.

The control section 100 has therein feeding amount detection program 92 which detects an amount of feeding in the direction of drum rotation with the reference phase of the encoder 37 serving as a starting point and writing position correction program 93 which corrects the image writing position based on the amount of feeding mentioned above. Pulse signals are detected in the direction of drum rotation with the reference phase of the encoder 37 serving as a starting point, then, the image writing position is determined with the prescribed pulse count, and an amount of difference between the actual image position and the prescribed value is corrected, which makes it possible to control an error of image writing position and thereby to improve image quality.

Further, the control section 100 is provided with photosensitive material length detection program 94 which detects the length of photosensitive material P based on the number of pulse signals with the reference phase of the encoder 37 serving as a starting point and with cutting control program 95 which cuts photosensitive material P to the desired length based on the detection of the length of the photosensitive material before fixing the photosensitive material P on the surface of drum 30 through suction. The length of the photosensitive material is detected based on the number of pulse signals with the reference phase of the encoder 37 serving as a starting point, and the cutting control program 95 drives cutter motor M2, thus, it is possible for cutter 22 to cut photosensitive material P to the desired length.

The control section 100 is further provided with photosensitive material length correction program 96 which corrects, based on the number of pulse signals of the encoder 37, the length of photosensitive material P that varies for each apparatus, and a difference between the actual length of photosensitive material P and a target value is corrected and then is controlled by the cutting control program 95, and cutter motor M20 is driven by the cutting control program 95, thus, the length of photosensitive material P is varied and positional accuracy for fixing through suction can be improved. Further, when setting photosensitive material (recording sheet) P on the rotary drum, the encoder 37 can also be used for determining the setting position.

The control section 100 is further provided with abnormality detection program 97 which divides pulse signals outputted from the encoder 37 with a counter, then converts it into the value smaller than the encoder output value, and compares it with the prescribed value to judge abnormality of the speed of drum rotation, thus, pulse signals outputted from the encoder 37 mounted on the drum shaft which rotates at high speed are divided by the counter to be converted into the value smaller than an encoder output value to be capable of being taken in, and this value is compared with the prescribed value, thus, it is possible to judge whether this value reaches the prescribed value or it is deviated from the prescribed value, and to judge abnormality of the speed of drum rotation.

When the specification of the speed of drum rotation in the course of image writing is changed, the abnormality detection program 97 can read the prescribed value to be an appropriate value automatically, corresponding to the number of revolutions after the change, thus, it is possible to improve reliability of the apparatus by reading the prescribed value to be an appropriate value automatically when the specification of the speed of drum rotation in the course of image writing is changed.

The present apparatus is provided with marking position detection program S30 which puts on drum 30 the marking 30M representing the position to start writing images on photosensitive material P, and detects the position of the marking, and the marking detection signals are sent to the control section 100 to start writing images. By detecting the marking position on the drum 30, and by starting image writing with the marking detection signals, it is possible to eliminate an error of an amount of feeding caused by the writing position which is deviated from the reference phase, by reading the marking, and is possible to limit an error of a writing position to the minimum.

The control section 100 detects the length of photosensitive material P based on the number of pulse signals obtained by counting with the reference phase of the encoder 37 serving as a starting point, and cuts the photosensitive material P to the desired length with cutter 22 by driving cutter motor M20.

(Optical Unit of the Halftone Dot Image Recording Apparatus)

Optical unit 400 has therein red laser light source (LD) 320, green laser light source (HeNe) 321 and infrared laser light source LD 322 as shown in FIG. 9. The green laser light source (LD) 320 emits green laser beam to which the magenta color forming layer (M layer) of photosensitive material P is sensitive, the red laser light source (LD) 321 emits red laser beam to which the cyan color forming layer (C layer) of photosensitive material P is sensitive, and the infrared laser light source (LD) 322 emits infrared laser beam to which the yellow color forming layer (Y layer) of photosensitive material P is sensitive.

Incidentally, the number of colors for the optical unit 400 is not limited to three, but it may be four including, for example, green laser diode, red laser diode, first infrared laser diode (oscillated wavelength 760–880 nm), and second far infrared laser diode (oscillated wavelength 900 nm or more).

Green laser light source 320, red laser light source 321 and infrared laser light source 322 are arranged to be modulated in terms of a quantity of light in accordance with modulation signals, and they emit respectively laser beams of three wavelengths for green G, red R and infrared IR to make C, M and Y layers of the photosensitive material to be sensitive. In other words, it is a photosensitive material wherein one of the B, G and R photosensitive layers is sensitive to infrared light, and a light source is shifted to infrared side. In that arrangement, He—Ne laser representing a gas laser is used as a laser light source for green G, while a semiconductor laser (LD) is used as a laser light source for red R and infrared IR.

A semiconductor laser is generally smaller in apparatus size and lower in cost than a gas laser, and if it is possible to use a semiconductor laser for three wavelengths, the size and cost of the exposure system can be reduced remarkably. However, in this case, a photosensitive material wherein three C, M and Y layers are sensitive to red wavelength or more is needed because of the restriction of oscillated wavelength of the semiconductor laser, and a photosensitive material having this specific characteristic is hard to be manufactured and to be stored, and its cost is high. Therefore, an arrangement is made not to use Ar laser because Ar laser used generally as a laser for blue B is especially large in size and high in cost, but to use He—Ne laser as a laser for green G, so that a photosensitive material which is sensitive to green wavelength or more may be used as a photosensitive material, to reduce cost and size of an exposure system.

Figure 15:
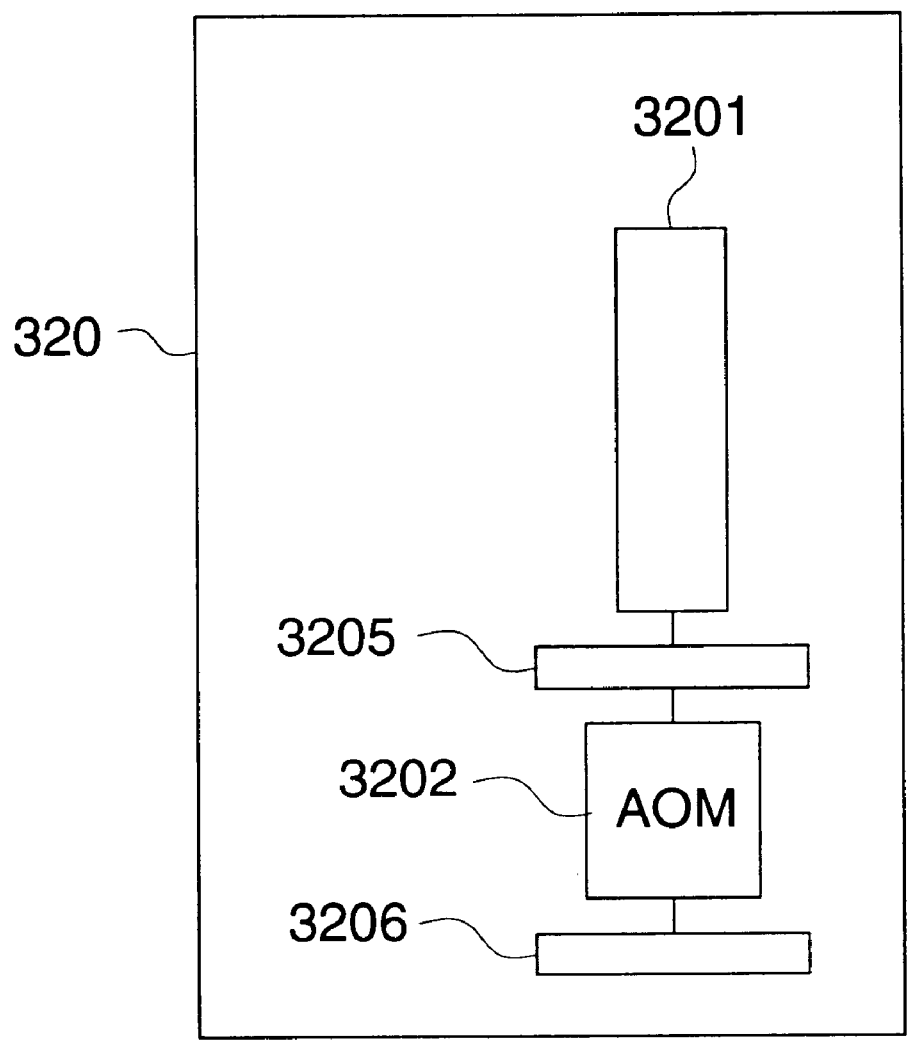
FIG. 15 is a top view showing a green laser light source.
Figure 16:
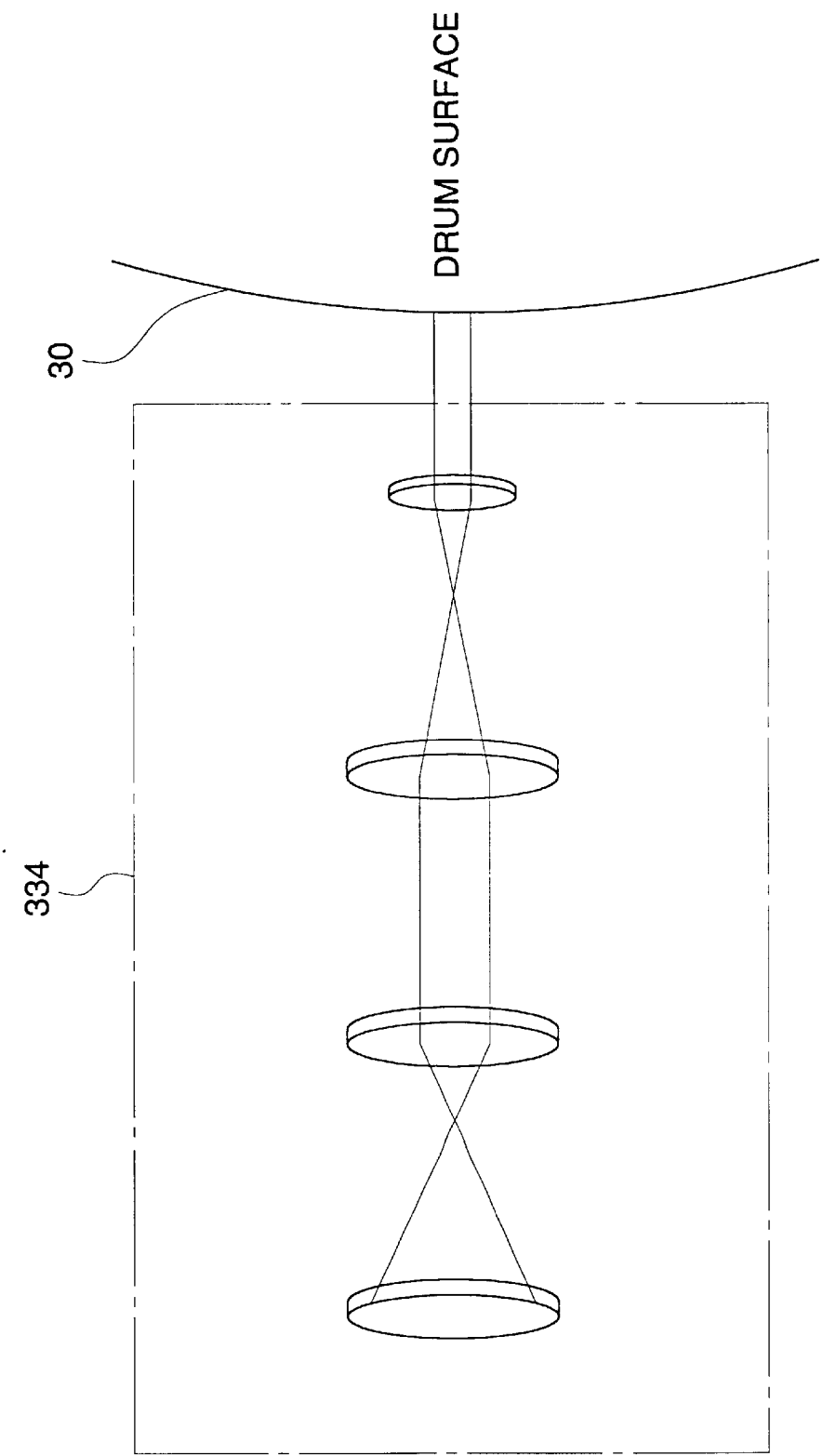
FIG. 16 is an illustration showing a beam irradiation on the drum.
Figure 17:
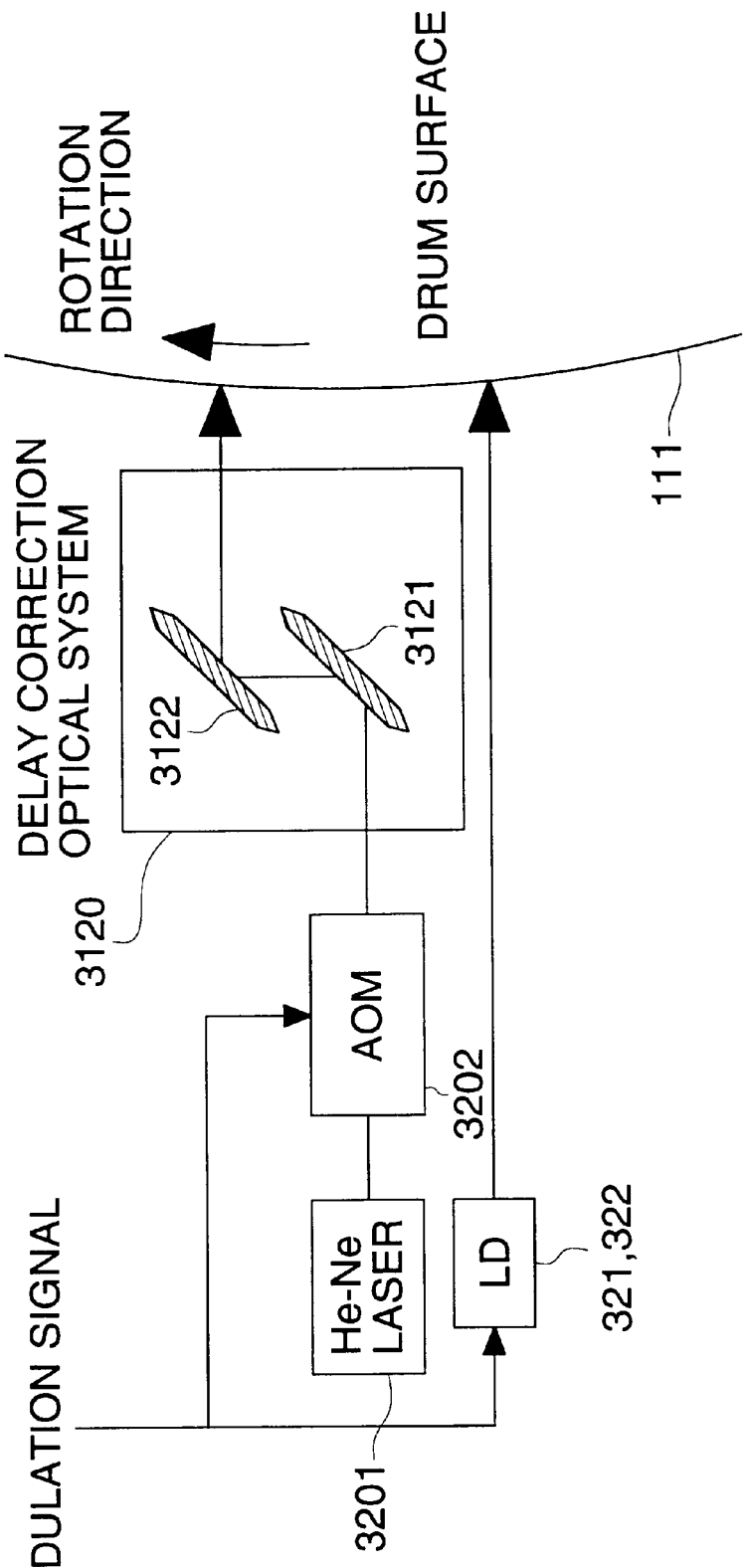
FIG. 17 is an illustration showing a delay device to delay the beam passage.

As shown in FIG. 15, the green laser light source is arranged to be modulated in terms of a quantity of light, with a laser beam (green laser beam) from He—Ne laser 3201 modulated in terms of a quantity of light in accordance with modulation signals (image signals) by an acousto-optic modulator (hereinafter referred to as AOM).

Then, the laser beam modulated in terms of a quantity of light by AOM 3202 is reflected by reflection mirror 325, then, passes through two dichroic mirrors 326 and 330, and is projected on photosensitive material P fixed on rotary drum 30 through image forming lenses 331 and 334.

Between AOM 3202 and He—Ne laser 3201, there is arranged cylindrical lens 3205 which reduces a beam diameter of a laser beam to enter AOM 3202, and between AOM 3202 and reflection mirror 325, there is arranged cylindrical lens 3206 which returns the beam diameter reduced by the cylindrical lens 3205 to its original diameter.

When a diameter of a beam to enter AOM 3202 is large, response of AOM 3202 is lowered. It is therefore arranged so that a diameter of a laser beam to enter AOM 3202 is reduced by cylindrical lens 3205 to improve response of AOM 3202. It is also arranged so that the beam diameter may be returned to its original diameter by cylindrical lens 3206 after AOM 3202 has been subjected to modulation in terms of a quantity of light.

Incidentally, a beam shape of a laser beam from He—Ne laser 3201 is mostly a circle, while that of a laser beam from each of semiconductor lasers (LD) 32d1 and 322 is elliptical. It is therefore arranged so that a laser beam having an elliptical beam shape may be changed by cylindrical lenses 323 and 327 to one having a circular beam shape like a laser beam from He—Ne laser 3201. Due to this, laser beams for three wavelengths each having a circular beam shape are used for exposure scanning.

Figure 19:
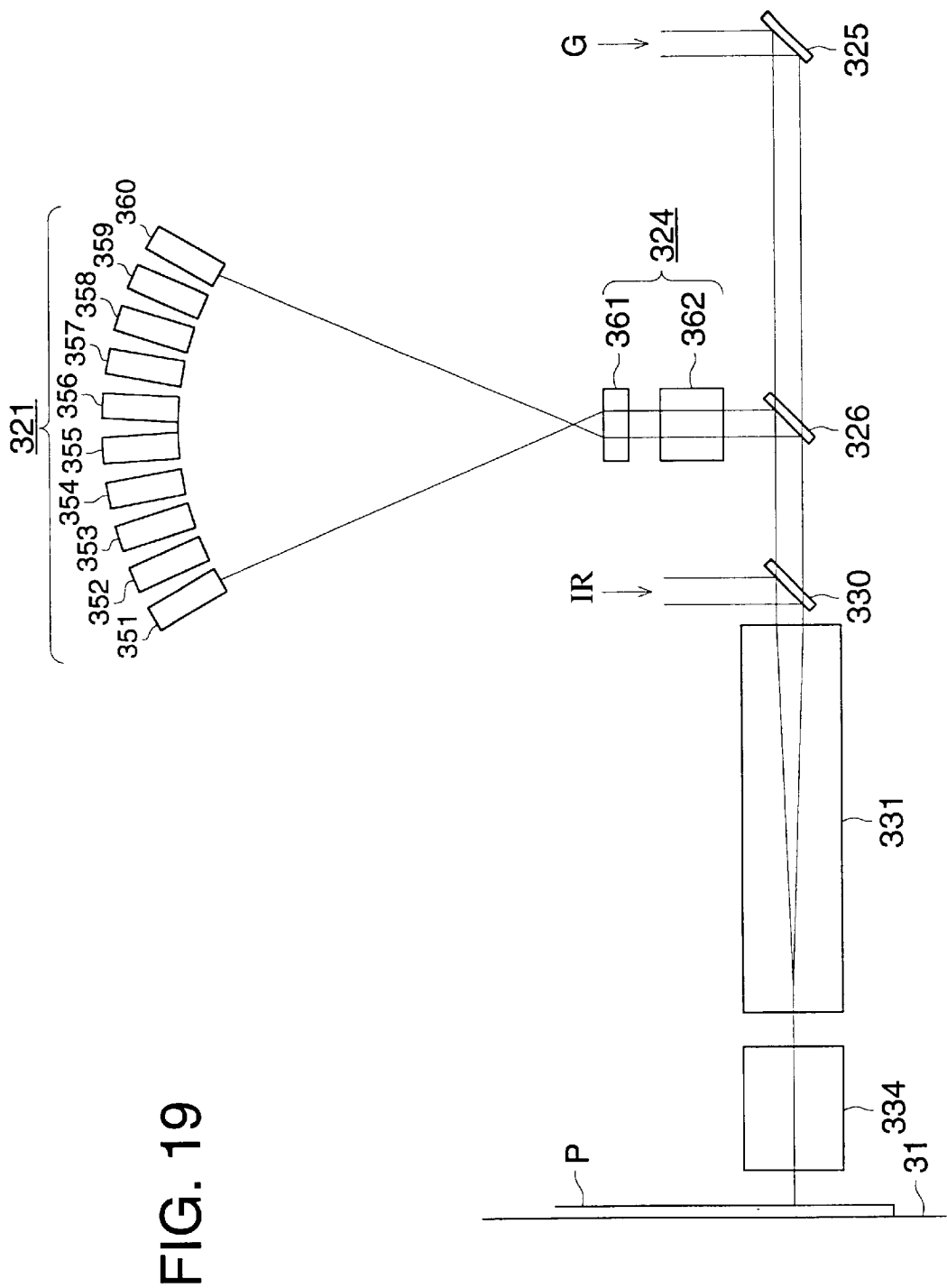
FIG. 19 is an illustration showing an arrangement of optical devices.

Image forming lens 334 is structured as shown in FIG. 19, and laser beams for three wavelengths are perpendicularly projected onto a photosensitive material as parallel beams each being reduced in terms of beam diameter. When such image forming lens 334 is used in the structure, a diameter and position of a laser beam used to expose photosensitive material P are not changed even when a distance between the image forming lens 334 and the photosensitive surface of photosensitive material P is changed by eccentric motion of drum 30.

Incidentally, there is a difference of reponse speed between modulation by AOM 3202 and direct modulation of semiconductor lasers 321 and 322, and the response speed of the direct modulation is higher. Therefore, if the modulation signal of the same timing is given to AOM 3202 and to semiconductor lasers 321 and 322 under the arrangement shown in FIG. 15, beams which are to expose the same point on the drum 30 are deviated from each other.

Therefore, it is advisable that there is provided delay correction optical system 3120 which makes the position for a laser beam modulated by AOM 3202 from He—Ne laser 3201 to expose to be ahead of the position for a laser beam from semiconductor lasers 321 and 322 to expose.

The delay correction optical system 3120 is composed of two reflection mirrors 3121 and 3122 which are arrange to be in parallel with each other, and it is used to expose the position to which the laser beam from AOM 3202 is shifted to the main scanning direction.

When the delay correction optical system 3120 is provided, the portion exposed by semiconductor lasers (LD) 321 and 322 is exposed by He—Ne laser 3201 later, resulting in that the laser beam from He—Ne laser 3201 and the laser beam from semiconductor lasers 321 and 322 can be superposed on the photosensitive surface of a photosensitive material for conducting exposure.

Incidentally, in place of shifting a laser beam from He—Ne laser 3201 optically, a beam position for a laser beam from semiconductor lasers (LD) 321 and 322 may be shifted in the direction opposite to the direction of rotation of the drum 30, in the structure. Namely, it is acceptable that the laser beam from He—Ne laser 3201 is used for exposure after the delay in the main scanning direction equivalent to the delay of response of AOM 3202 in the arrangement.

Though response delay of AOM 3202 is corrected optically in the arrangement in the foregoing, it is also possible to cope with response delay by correction of delay of modulation data (image data).

Figure 18:
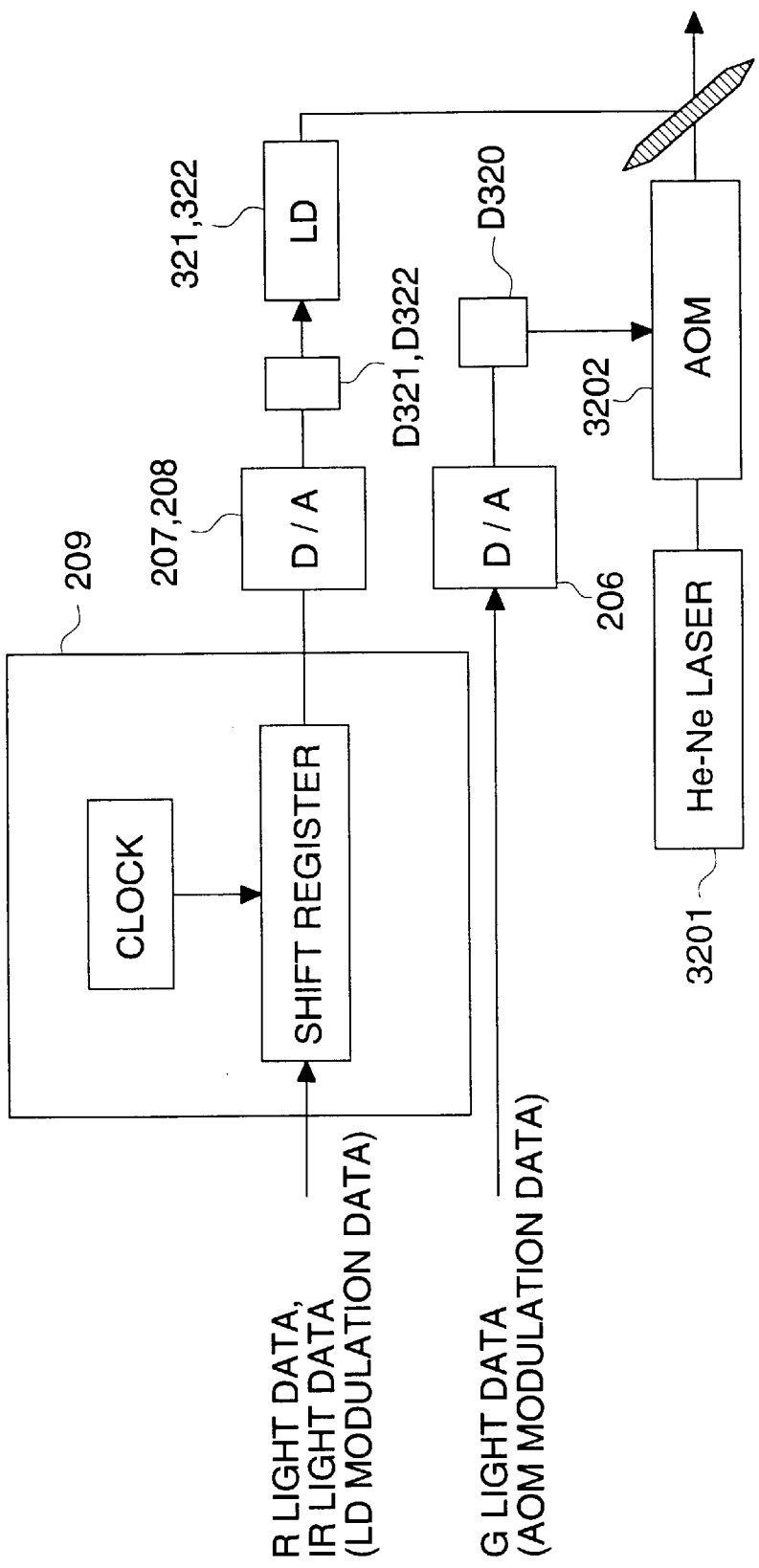
FIG. 18 is a block diagram showing a delay circuit.

In the example shown in FIG. 18, G light data (AOM modulation data) for modulating AOM 3202, R light data and IR light data (LD modulation data) for modulating semiconductor lasers 321 and 322 are respectively subjected to D/A conversion by D/A converters 206, 207 and 208 and are amplified respectively by drivers D320, D321 and D322 to be given respectively to AOM 3202 and semiconductor lasers 321 and 322 for modulation, and in that case, R light data and IR light data (LD modulation data) are delayed by delay correction circuit 209 by an amount equivalent to response delay of AOM 3202.

In the arrangement stated above, semiconductor lasers 321 and 322 are modulated directly in accordance with delayed modulation data, but when a laser beam after modulation in terms of a quantity of light is emitted from AOM 3202, a laser beam modulated by modulation data of the same timing is used for exposure, because there is delay in modulation in terms of a quantity of light by AOM 3202 based on preceding modulation data.

Incidentally, in the example explained above, one laser beam is used for exposure scanning for each wavelength, but in the present example, plural laser beams are actually used for exposure scanning for each wavelength as shown in FIG. 19.

An optical system of optical unit 400 will be explained as follows, referring to FIG. 19 which shows a part the optical system of optical unit 400.

On red laser light source (LD) 321, there are provided ten red laser diodes 351–360 in a way that their emission surfaces form an arc. Each of the red laser diodes 351–360 emits a laser beam modulated in terms of a quantity of light in accordance with image signals. Then, the emitted laser beam enters incident optical system 324 equipped with cylindrical lens group 362 which is composed of lens group 361 and two cylindrical lenses, then, the lens group 361 makes ten beams to be in parallel with each other, and the cylindrical lens group 362 arranges a beam shape of each of ten beams which have been made to be in parallel with each other by the lens group 361, and emits it to dichroic reflection mirror 326. Namely, the cylindrical lens group 362 changes an elliptical beam shape of a laser beam from semiconductor laser (LD) to a circular shape.

Infrared laser light source 322 is substantially the same as the red laser light source 321 in terms of the structure, and green laser light source 320 has the same structure as in the aforesaid example and only different point is that a beam is split into ten green lasers.

On the green laser light source 320 and IR laser light source 322, there are respectively provided incident optical systems 323 and 327 which are the same as the indent optical system 324 of the red laser light source 321. Ten green lasers and ten infrared lasers emitted respectively from the incident optical systems 323 and 327 are reflected respectively on reflection mirrors 325 and 328.

Dichroic reflection mirror 326 is a mirror which transmits green light and reflects red light, and it transmits ten green lasers reflected on the reflection mirror 325 and reflects ten red lasers emitted from the incident optical system 324 to lead to dichroic reflection mirror 330.

The dichroic reflection mirror 330 is a mirror which transmits green light and red light, and reflects infrared light, and it transmits ten green lasers and ten red lasers from the dichroic reflection mirror 326 and reflects ten infrared lasers emitted from incident optical system 327 and reflected on reflection mirror 328 to lead to reduction optical system 331.

The reduction optical system 331 reduces beam intervals for each ten of green lasers, red lasers and IR lasers and leads them to image forming lens 334. The image forming lens 334 makes each ten of green lasers, red lasers and IR lasers wherein beam intervals have been reduced by reduction optical system 331 but each beam diameter has been increased to form images on the photosensitive surface of a photosensitive material which is in close contact with the outer circumferential surface of drum 30.

By using the image forming lens 334 like this, it is possible to prevent that a laser beam diameter used for exposure on photosensitive material P, even when the distance between the image forming lens 334 and the photosensitive surface of photosensitive material P is varied by eccentric movement of drum 30.

With regard to the laser beam used for exposing photosensitive material P, it is preferable that beam diameter fluctuation for the beam diameter on the photosensitive surface of photosensitive material P is within ±50% for the range of ±30 μm on the photosensitive surface of photosensitive material P. In the present example, it is kept within ±30%. Incidentally, this beam diameter is a half-value breadth.

The image forming lens 334 reduces collectively and simultaneously the laser beams for each wavelength arranged to be of the same beam intervals to the same beam intervals, and projects each laser beam on the photosensitive surface of photosensitive material P as a collimated beam.

Figure 20:
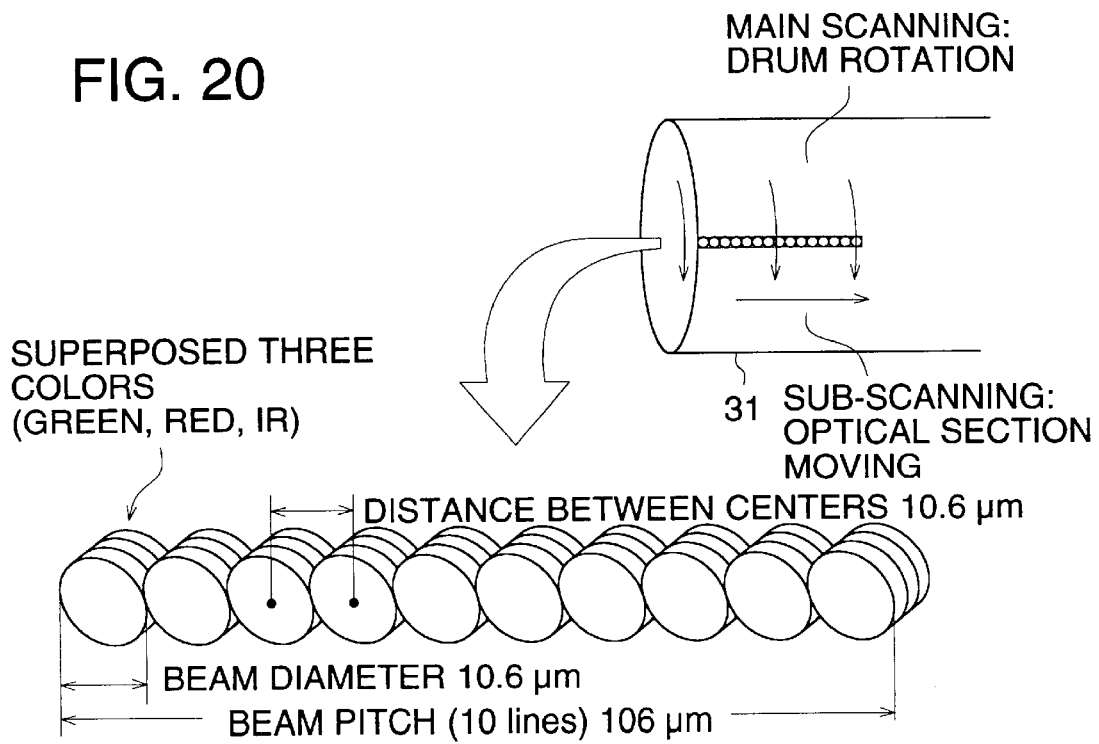
FIG. 20 is an illustration showing superimposed dots on the drum.

Based on FIG. 20 which indicates arrangement and forms showing laser beams for each wavelength projected on the photosensitive surface of photosensitive material P, there will be explained arrangement and forms showing laser beams for each wavelength projected on the photosensitive surface of photosensitive material P. With regard to laser beams for three wavelengths, ten each are projected on the photosensitive surface of photosensitive material P, and ten beam irradiation areas where laser beams for three wavelengths are irradiated to be of the same size and same center position are arranged at regular intervals in the sub-scanning direction so that their positions in the main scanning direction may be exactly the same. Incidentally, though ten laser beams for each wavelength are shown in FIG. 20, the number of beams for each wavelength in the invention is not limited to ten.

Incidentally, when a laser light source is a laser diode (LD), it is preferable from the viewpoint of the better response for signals and better reproducibility of fine points and fine lines that the laser diode is constantly kept to be on for the period when an image recording area on photosensitive material P is at the laser beam irradiating position, by applying bias (bias current or bias voltage) constantly, or by inputting constantly data values which make the laser diode to be lit. Due to this, it is possible to prevent that a void character on delicate background color is not reproduced or is colored. Incidentally, the reason why the laser diode kept to be on constantly contributes to better response to signals is that it takes some time to change from the state of LED emission to the desired state of laser emission, even when voltage or current is impressed suddenly on the laser diode which is not lit.

On the contrary, for the period when photosensitive material P is not at the laser beam irradiating position, it is preferable that light is not projected on drum 30 from optical unit 400, because it is possible to prevent exposure of a pseudo image caused by light reflected on drum 30. For the period when photosensitive material P is not at the laser beam irradiating position, it is preferable that no light emission is made by a laser light source, because specific member such as a shutter does not need to be provided.

When a laser light source is a laser diode, switching between impression of bias and non-impression of bias is conducted depending on whether the period is one when an image recording area on photosensitive material P is at the laser beam irradiating position, or the other when an image recording area on photosensitive material P is not at the laser beam irradiating position, and thereby two merits stated above are given.

When a channel means that light is projected on a different position on photosensitive material P for each color and each light emission is controlled independently, the apparatus of the present embodiment has ten channels for each color, because the apparatus of the present embodiment is provided with ten laser diodes controlled independently in terms of light emission for three colors of green, red and infrared, and laser beams emitted from ten laser diodes are projected to different positions on photosensitive material P.

Figure 21:
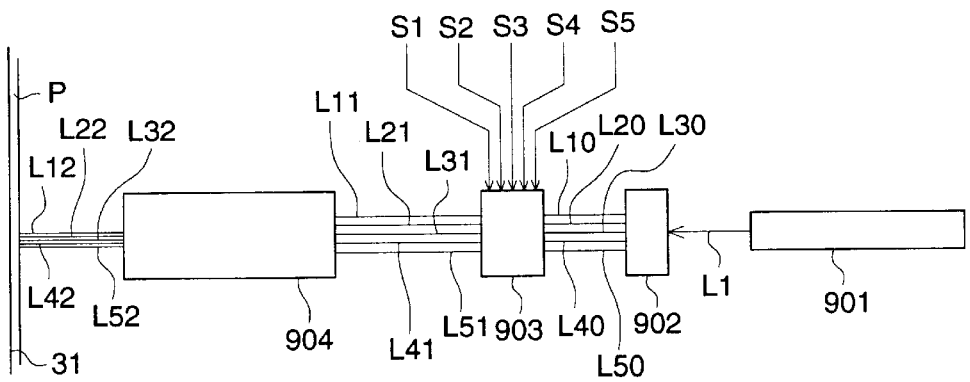
FIG. 21 is an illustration showing an arrangement of optical devices in another embodiment.

This concept of a channel will further be explained based on a variation of the exposure optical system. The first variation is an exposure optical system having therein, as shown in FIG. 21, gas laser 901 such as He—Ne laser which emits one laser beam L1, beam splitter 902 which splits laser beam L1 emitted by the gas laser 901 into five laser beams L10, L20, L30, L40 and L50, optical modulation element 903 such as an acousto-optic element which adjusts intensity of five laser beams L10, L20, L30, L40 and L50 split by the laser beam splitter 902 with each corresponding input signals S1, S2, S3, S4 and S5, and emits intensity-adjusted laser beams L11, L21, L31, L41 and L51, and lens optical system 904 makes the intensity-adjusted laser beams L11, L21, L31, L41 and L51 to be reduced and to form images on photosensitive material P held on drum 30. In this first variation, five laser beams controlled in terms of light emission independently of each other are projected at different positions on photosensitive material P, which means five channels.

Figure 22:
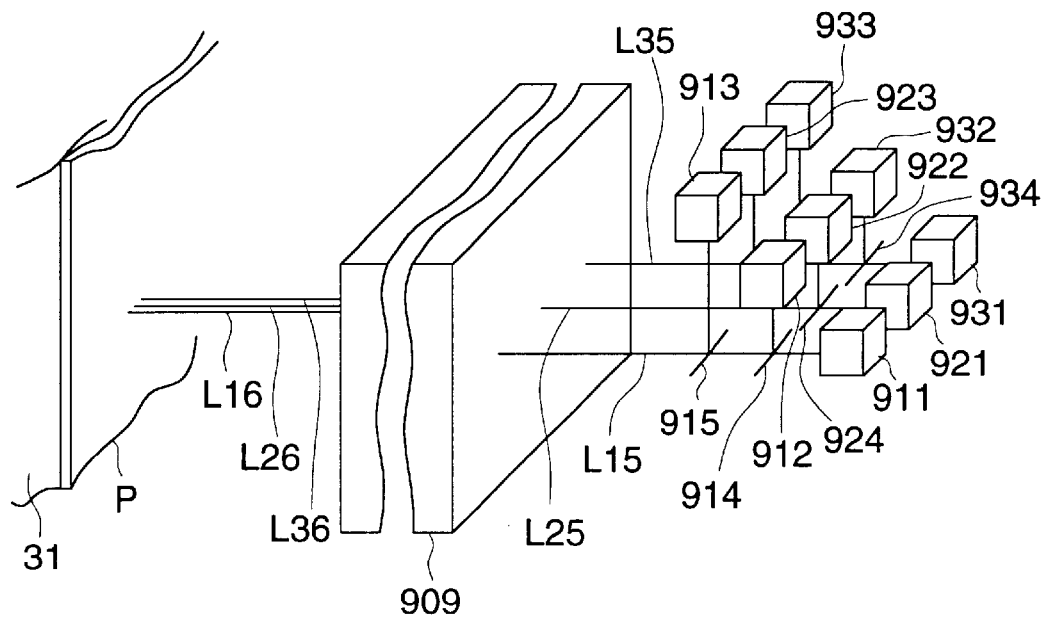
FIG. 22 is an illustration showing an arrangement of optical devices in another embodiment.
Figure 23:
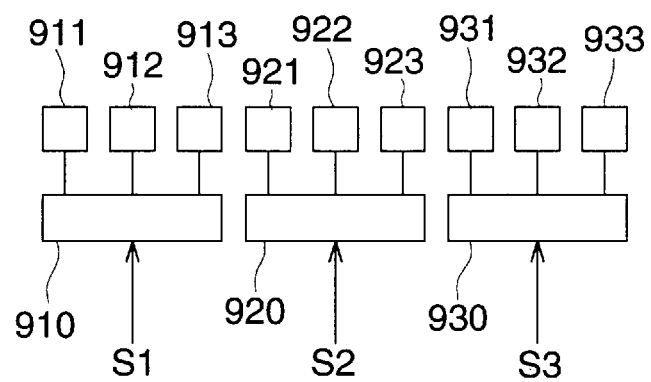
FIG. 23 is a block diagram showing light emission control sections 910, 920 and 930.

The second variation is an exposure optical system having therein, as shown in FIGS. 22 and 23, laser diodes 911, 912, 913, 921, 922, 923, 931, 932 and 933 each emitting one laser beam, half mirrors 914 and 915 each wave-combining laser beams emitted from laser diodes 911, 912 and 913, half mirrors 924 and 925 each wave-combining laser beams emitted from laser diodes 921, 922 and 923, half mirrors 923 and 935 each wave-combining laser beams emitted from laser diodes 923, 932 and 933, lens optical system 909 which makes the wave-combined three laser beams L15, L25 and L35 to be reduced and to form images on photosensitive material P held on drum 30, the first light emission control section 1000 which controls laser diodes 911, 912 and 913 in terms of light emission with input signals S1, the second light emission control section 920 which controls laser diodes 921, 922 and 923 in terms of light emission with input signals S2, and the third light emission control section 930 which controls laser diodes 931, 932 and 933 in terms of light emission with input signals S3. In this second variation, three laser beams controlled in terms of light emission independently of each other are projected at different positions on photosensitive material P, which means three channels.

However, the number of channels is not limited to these, and it is preferable to be two or more channels for each color (in particular, five channels or more for each color) from the viewpoint of the image recording speed (exposure speed), and it is preferable to be 100 channels or less for each color (in particular, 40 channels or less for each color) from the viewpoint of manufacturing cost, easy adjustment, simplicity, easy manufacturing and simplicity and stability of exposure control.

Further, the number of colors for exposure light is not limited to three in the apparatus in the present embodiment, and three or more is preferable from the viewpoint of making a color proof, and it is preferable to be ten or less (in particular, four or less) from the viewpoint of apparatus cost and simplicity of control even if the special feature is taken into consideration. When the number of colors for exposure light is four, it is preferable that they respectively correspond to printing plates of Y plate, M plate, C plate and K plate.

Though the number of light sources per one channel is one in the present embodiment, the invention is not limited to this, and it is also possible to employ a system wherein light from one light source is split into plural beams to be controlled respectively and plural channels share one light source, or to employ a system wherein one channel is irradiated by light from plural LEDs and one channel has plural light sources, on the contrary. In either case, the number of light sources of 0.01 or more (in particular, 0.1 or more) is preferable from the points of view of simplicity of a spectral optical system, exposure speed and exposure control, and the number of light sources of 100 or less (in particular, 10 or less) is preferable from the points of view of simplicity of a wave-combining optical system and easy production.

In the apparatus of the present embodiment, beam center positions for three wavelengths mostly agree with each other. In this case, it is preferable that deviation of the beam center position caused by a wavelength is 0.2 times the distance between beam centers of adjoining channels or smaller than that, and is 0.1 times or less the distance between beam centers of adjoining channels for excellent image recording, in particular.

It is preferable that a distance between irradiation beam centers of adjoining channels used for exposure for a photosensitive material simultaneously is 1 μm or more (in particular, 5 μm or more). Due to this, it is possible to make optical systems, mechanism systems and driving circuits to be low in cost, and image recording can be carried out at high speed under the simple structure. Further the distance between irradiation beam centers of adjoining channels is preferably 1 mm or less (in particular, 100 μm or less, further, 20 μm or less). This makes highly detailed and high speed image recording to be possible. Incidentally, in the apparatus of the present embodiment, laser-beam-irradiated images for each color on the photosensitive surface of a photosensitive material wound around drum 30 are arranged in the direction which is in parallel with the rotation axis of the drum 30, and a distance between beam centers is 10.6 μm.

It is preferable that the coefficient of linear expansion R2 (/K) of a base board of optical unit 400 satisfies size of optical base board (the longest distance between corners among combinations of all corners) L cm and the following expression.

$$R2 \times L \leq 0.01$$

It is especially preferable that the following expression is satisfied.

$$R2 \times L \leq 0.001$$

Due to this, it is possible to control deterioration of resolution and sharpness of images to be exposed caused by temperature fluctuation and to control that an amount of exposure varies.

In the apparatus of the present embodiment, the base board of optical unit 400 is made of aluminum, the coefficient of thermal expansion of the base board of optical unit 400 is about 0.0002/K, the size of the optical base board (the longest distance between corners among combinations of all corners) is about 40 cm, and R2×L is about 0.0008.

Further, the maximum power consumption per one light source such as a laser diode is preferably 10 W or less (in particular, 3 W or less, further 1 W or less). Due to this, the maximum power consumption is easily made to be low, calorific value is low, temperature of laser diode can easily be made constant, and a wave length of emitted light and a quantity of light for light emission can easily be made constant. Since the calorific value is low, it is possible to control fluctuation of irradiation position to a photosensitive material, a quantity of irradiated light, a beam shape and a focus position all caused by fluctuation of arrangement relation of each optical element caused by generation of heat of a light source, to control blurred images and variation of exposure amount, and to control fluctuation of wavelength of emitted light and light emission intensity caused by temperature variation when a light source is diode. The maximum power consumption per one light source is preferably 10 μW or more (in particular, 20 μW or more). Due to this, sufficient amount of exposure can be obtained. The maximum power consumption per one light source in the apparatus of the present embodiment is 100 mW.

The maximum rated light output per one light source such as a laser diode is preferably 150 mW or less (in particular, 50 mW or less, further 5 mW or less. Due to this, the maximum power consumption can be made small. When it is 50 mW or less, in particular, safety is high, which is preferable. The maximum rated light output per one light source is preferably 1 μW or more (in particular, 0.5 mW or more). Due to this, a quantity of light used for exposure to a photosensitive material can easily be made sufficient. Incidentally, the maximum rated light output per one light source in the apparatus of the present embodiment is 3 mW.

It is further preferable that driving frequency (MHz) of each light source such as laser diode is 0.5 MHz or more (in particular, 1 MHz or more) from the viewpoint of exposure speed or the like, and it is preferable, from the viewpoint of stability of exposure driving circuits, stability of a quantity of exposure light and an exposure position related to generation of heat, to be 100 MHz or less (in particular, 50 MHz or less, further 20 MHz or less. It is 2.8 MHz in the apparatus of the present embodiment.

From the viewpoint of reproducibility of gradation of halftone dot images, image recording density of images recorded on photosensitive material P is preferably 600 dpi (in particular, 1000 dpi or more, further 1200 dpi or more) both in the main scanning direction and sub-scanning direction, and from the viewpoint of saturation of reproducibility of gradation of halftone dot images, image recording speed and apparatus cost, the image recording density is preferably 10000 dpi or less (in particular, 5000 dpi or less) both in the main scanning direction and sub-scanning direction. The image recording density of the image recorded on a photosensitive material in the apparatus of the present example as stated above is 2400 dpi both in the main scanning direction and sub-scanning direction. Incidentally, the image recording density in the main scanning direction and the sub-scanning direction is naturally indicated by a unit of dpi which shows the number of pixels subjected to image recording arranged in a length of one inch in the main scanning direction or in the sub-scanning direction.

It is preferable that one halftone dot is recorded with 100 or more (in particular, 200 or more) pixels because it realizes reproduction which is close to a halftone dot for actual printing. It is further preferable that one halftone dot is recorded with 5000 or less (in particular, 2000 or less) pixels because it handling of image data is easy and image data can be processed at high speed.

It is preferable that the number of pixels recorded per one second for each color of exposure light is 3 million pixels/sec or more (in particular, 10 million pixels/sec or more). Due to this, it is possible to make the high speed image recording to be compatible with highly detailed image recording. It is further preferable that the number of pixels recorded per one second for each color of exposure light is 4 billion pixels or less (in particular, 0.5 billion pixels or less). Due to this, driving circuits are stabilized, image recording is stabilized, exposure intensity and exposure position are stabilized, cost is low, and adjustment is easy. The number of pixels recorded per one second for each color of exposure light in the apparatus of the present example is about 30 million pixels/sec.

(Sheet Ejection of the Image Recording Apparatus)

Figure 24:
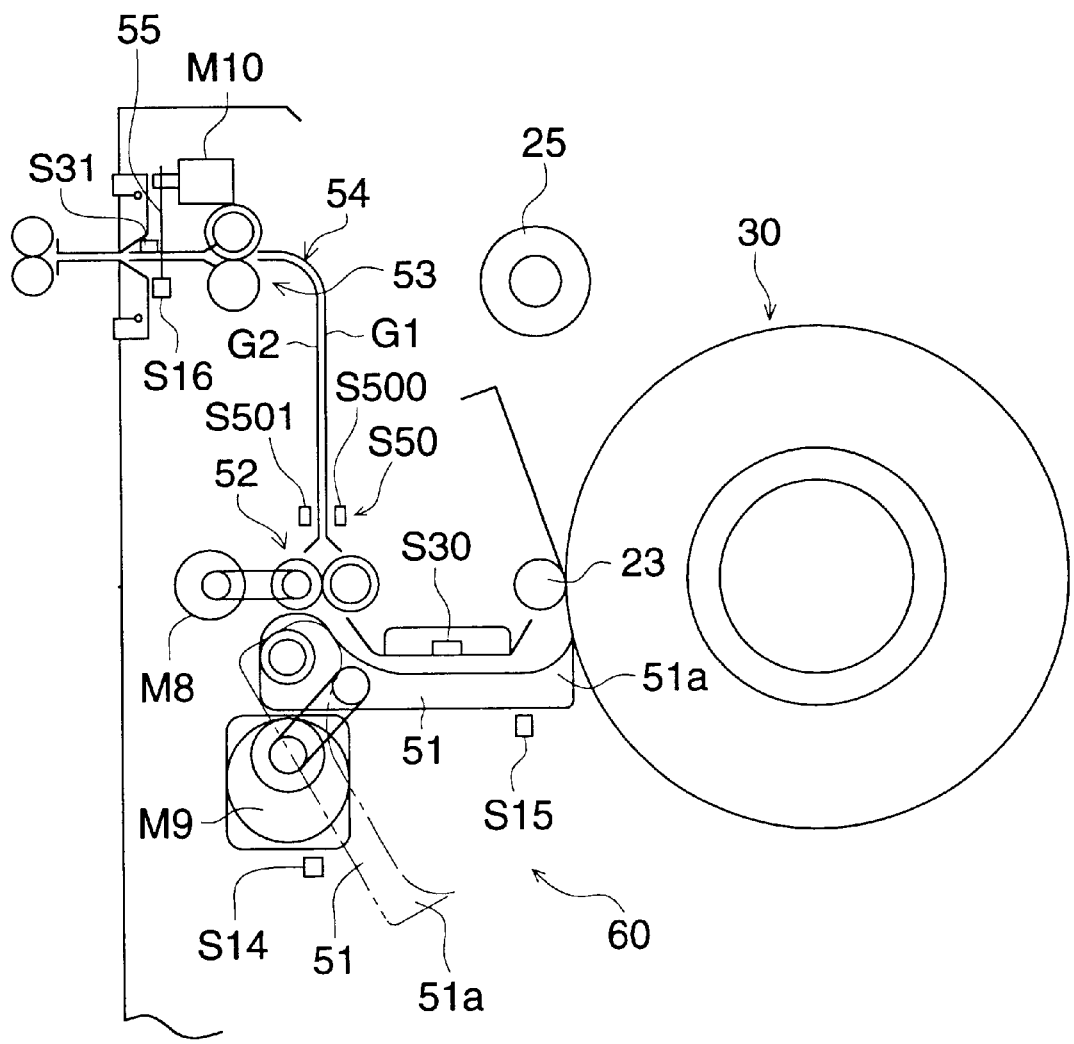
FIG. 24 is a cross sectional view showing a sheet ejection section.

As shown in FIG. 24, sheet ejection section 50 is provided with paired conveyance rollers 52 and 53 driven by feed-out motor M8, exfoliation guide 51 moved up and down (rotation on the center of a fulcrum in the example) by exfoliation guide moving up and down motor M9, conveyance guide 54 composed of paired guide plates G1 and G2 and with outlet shutter 55 driven by outlet shutter motor M10.

The exfoliation guide 51 has functions to exfoliate, at the upper position, a photosensitive material located on the drum, and to position the photosensitive material to accumulator section 60, at the lower position. Exfoliation guide open detection sensor S14 detects that exfoliation guide 51 is opened. Exfoliation guide close detection sensor S15 detects that exfoliation guide 51 is closed.

Conveyance guide 54 is arranged between paired conveyance rollers 52 which nip a photosensitive material exfoliated from drum 30 by the exfoliation guide 51 and moves along a guide section (not shown in the diagram) provided at the central portion of the exfoliation guide, and further convey the photosensitive material forward, and paired rollers 53 which nip the photosensitive material conveyed by the rotations of the paired rollers 52 and convey it in the same way.

Conveyance guide 54 forms a conveyance path which is mostly L-shaped totally and extends upwards almost vertically from the portion to face the paired conveyance rollers 52 and changes its direction at its curved portion to extend in the horizontal direction. Guide plates 52 and 53 constituting the conveyance guide 54 are made of stainless steel and their surfaces serving as a conveyance path are made to be a smooth surface.

Incidentally, the portion to enter paired rollers 52 from the exfoliation guide 51 is formed to be a curved conveyance path. For a photosensitive material, however, this conveyance path is a tough one wherein the photosensitive material is guided horizontally and then is forced to make a sharp turn upwards vertically and to make a further sharp turn to the horizontal direction. The reason for this is to achieve a small-sized apparatus, and if there is no necessity for the small-sized apparatus, it is possible to make the conveyance path to be more gentle in forms.

Guide plate G1 is arranged to be capable of rotating for a prescribed angle (capable of moving in terms of position) with an upper portion in the diagram serving as a fulcrum, and it solidly has photoreceptor element 500 composed of a photodiode on the side of the paired rollers 52.

Guide plate G2 solidly has light emission means 501 composed of LED (infrared) at the position to face the photoreceptor element 500, under the state where both guide plates face each other at their regular positions as shown in the diagram.

The photoreceptor element 500 has roles to detect whether or not the photosensitive material has passed the position within prescribed time in a series of image recording operation time in exposure unit 3, for example, namely to detect the state of conveyance of the photosensitive material, and to detect whether or not both guide plates G1 and G2 are at their regular positions (position for opening and closing) within a time zone before the photosensitive material is conveyed (before the start of a series of image recording operations).

Then, the output information is used together with timing information of a timer provided separately to judge whether a recording sheet is jammed or not.

When CPU 100 judges that a jam has been caused, the driving system on the part of the exposure unit including feed-out motor M8 is suspended, and liquid crystal panel 11 displays warning. Even in the case of judgment that both guide members are not at their regular positions, the same warning is displayed.

Output shutter open detecting sensor S16 detects opening and closing of outlet shutter 55. The outlet shutter 55 determines the timing to feed the photosensitive material into developing unit 4. S31 is an outlet sensor which detects that the photosensitive material is fed into the developing unit 4.

Accumulator section 60 is provided below sheet ejection section 50, and it provides, when exfoliation guide 51 moves downward, a space which allows a photosensitive material to hang down.

The combination of the light emission means and the photoreceptor means each provided to be solid with each guide plate (guide means) may also be opposite, and both guides may also be structured to be capable of moving positions, and it is possible not to provide a light emission means or a photoreceptor means on the guide plate whose position is fixed, to use other members on the apparatus.

Further, the state of position movement does not necessarily need to be rotation, but it may be horizontal movement. The degree of freedom within a range without departing from the spirit and scope of the invention is broad.

(Electrical Structure of the Halftone Dot Image Recording Apparatus)

Figure 25:
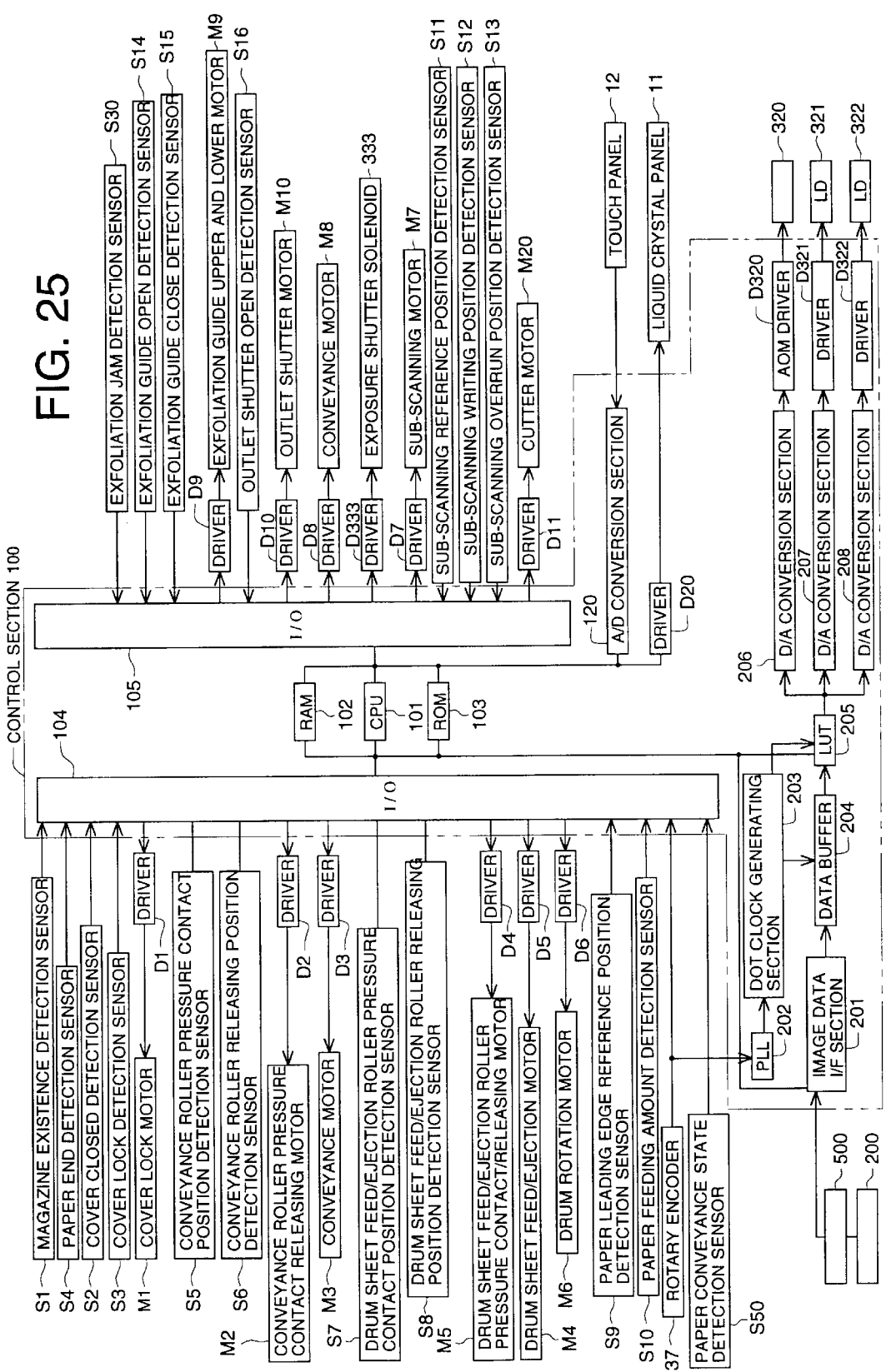
FIG. 25 is a block diagram showing an electrical structure.

As shown in FIG. 25 which represents an electrical structure, control section 100 has therein CPU 101, RAM 102 and ROM 103, and it is connected to sensors and actuators through I/O Ports 104 and 105 to control the actuators based on information from the sensors.

Sensors are connected to magazine existence detection sensor S1, cover close detection sensor S2, cover lock detection sensor S3, paper end detection sensor S4, conveyance roller pressure contact detection sensor S5, conveyance roller releasing position detection sensor S6, drum sheet feeding/ejection roller pressure contact detection sensor S7, drum sheet feeding/ejection roller releasing position detection sensor S8, paper leading edge reference position detection sensor S9, paper feeding amount detection sensor S10, rotary encoder 37, sub-scanning reference position detection sensor S11, sub-scanning writing position detection sensor S12, sub-scanning overrun position detection sensor S13, exfoliation guide open detection sensor S14, exfoliation guide close detection sensor S15, outlet shutter open detection sensor S16, exfoliation jam detection sensor S30, paper conveyance state detection sensor S50, and outlet sensor S31 which is not shown in the diagram.

Actuators are connected to cover lock motor M1, conveyance roller pressure contact releasing motor M2, conveyance motor M3, cutter motor M20, drum sheet feeding/ejection motor M4, drum sheet feeding/ejection roller pressure contact releasing motor M5, drum rotation motor M6, sub-scanning motor M7, exposure shutter solenoid 333, feed-out motor M8, exfoliation guide upper and lower motor M9, and outlet shutter motor M10, and these are driven through drivers D1–D11 and D333.

With regard to operation section 10, liquid crystal panel 11 is driven by driver D20 to display the state of operation of a color proof making apparatus. A command through operation of touch panel 12 is sent to CPU 101 as digital L1 information by A/D converting section 120.

halftone dot image data are sent to a data buffer from halftone dot image data storing apparatus 500 through image data I/F section 201.

On the other hand, in synchronization with output of PLL202 based on photosensitive material feeding information from rotary encoder 37, dot clock of dot clock generating section 203 supplies digital image information to driver D320, AOM driver D321 and driver D 322 from data buffer 204 through LUT (look-up table) 205 and D/A converting sections 206–208, and these drivers drive laser light sources 320–322.

Incidentally, the data buffer 204 is structured with paired line memories composed of the first memory and the second memory and with a bi-directional buffer. Since this bi-directional buffer is capable of writing and reading image data simultaneously, a switching section for memories is not needed and circuit structure can be simplified. Then, based on signals relating to light modulation control data address inputted from control section 100 and on signals relating to light modulation data, the bi-directional buffer operates. Image data stored in the bi-directional buffer are transmitted to LUT 205 so that images may be recorded.

As a variation of the data buffer 204, there may be provided FIFO (first in first out) buffer in place of paired line memories. Due to this, since the FIFO buffer is provided in place of paired line memories, it is possible to read or write image data voluntarily, if an address for writing or reading is identified based on writing clock signals and reading clock signals. Therefore, it is sufficient to arrange so that writing clock signals, reading clock signals and clear signals for reading and writing may be outputted, and this makes its structure to be simplified.

An arrangement is made so that halftone dot image data for each color (Y, M, C and BK) produced by the halftone dot image data producing apparatus 200 are transmitted to image data I/F section 201 where RIP format is converted into the format for exposure to be accumulated in data buffer 204. After image data equivalent to one sheet are accumulated in the data buffer 204, simultaneous exposures for all colors are carried out.

In that case, corresponding to the laser minimum printing dot (which is called a pixel) in the course of exposure, data for Y, M, C and BK plates of printed matter are given in 16 combinations as shown in FIG. 26, and then are converted into combinations of laser intensity of R, G and IR (infrared) designated by LUT 205 as shown in the diagram, thus, exposure is conducted with a pixel unit wherein lasers for three wavelengths are superposed.

In the case of digital modulation wherein laser driving is only for on and off, laser intensity is either one of 0 (laser is not lit) and 100 (laser is lit with optimum quantity of light emission for a photosensitive material). Therefore, it is not necessary that LUT 205 can be set by a user. In that case, however, color forming densities for Y, M, C and BK of a photosensitive material are fixed, and a photosensitive material which matches the standard ink density needs to be used, thereby, it is not possible to adapt to dispersion of printing conditions such as ink and to density difference caused by different ink makers.

On the contrary, the present apparatus employs analog modulation having gradation in laser driving and has LUT 205 which makes it possible to set freely the laser intensity for R, G and IR corresponding to data of Y, M, C and BK plates of printed matter transmitted in 16 combinations, so that color forming may have optimum density. Incidentally, when a BK Plate is in data, color forming is for black entirely, so, reproduction colors which can be changed by LUT are in 9 combinations. When correcting dispersion in printing conditions such as ink and density difference caused by different ink makers, it is preferable to use a photosensitive material having color forming density higher than the standard ink density, from the viewpoint of broadening a range of adaptation.

It is possible to display contents of LUT 205 on liquid crystal panel 11 through CPU 101, by operating touch panel 12. It is also possible to change contents of LUT 205 freely on the display screen by operating touch panel 12.

In LUT 205, there are stored data which stipulates relationship between standard colors for printing represented by Y (yellow), M (magenta), C (cyan), B (blue), G (green), R (red), BK (black), GY (gray) and W (white) and intensity constitution of light from a light source used when a photosensitive material is exposed to the aforesaid standard colors representing, namely, R (red), G (green) and IE (infrared), as shown, for example, in FIG. 27.

In FIG. 27, there is shown an example of how standard colors Y–W correspond to intensity constitution of lasers R, G and IR for a photosensitive material of a direct positive type. For a photosensitive material of a negative type, the numerical values in the table represent complement numbers of 100. Though the photosensitive material of a direct positive type is explained in the following example, the contents are the same also for the photosensitive material of a negative type, except that numerical values are complement numbers of 100.

A tone of color for ink of Y, M, C and BK of printed matter varies depending on a brand of ink to be used for printing. In the present apparatus, therefore, intensity constitution of lasers R, G and IR corresponding to standard colors Y–W can be set in accordance with ink or user's taste. This is what is called color correction in this specification. A brand of ink corresponds to each channel stated below.

In the combination of halftone dots for standard colors of Y, M, C and BK for printing ink, with regard to the specific color such as pink, for example, which is difficult to form due to turbidity in color, ink is sometimes prepared peculiarly and a plate for exclusive use is used for printing. In that case, laser intensity constitution a, b and c for R, G and IR corresponding to specific color SP are set as shown in FIG. 28. Since silver halide photosensitive materials are used, it is possible to prepare an approximate color by mixing colors.

When a desired key is pressed through touch panel 12 on the initial menu screen of liquid crystal panel 11, a color correction setting screen as shown in FIG. 29, for example, is displayed. Namely, a screen including LUT data 112 of one channel, for example, channel 1 and ten-key 113 is displayed. The numerical value of LUT data 112 is a standard value under the default state. Incidentally, LUT data 112 is shown with an example including no specific color.

The desired standard color is touched on the screen, and intensity constitution value for the laser corresponding to the desired standard color is changed by the use of ten key 113. Determination of the numerical value is conducted by enter key 114. An error of the numerical value is corrected by clearing with clear key 115.

As an example, when amending the color of standard color Y to a reddish color, intensity constitution for laser G is changed to, for example, 95% and exposure is conducted. Thus, it is possible to prepare Y to which M color forming is mixed slightly, when complete yellow would have been prepared. When amending color forming of standard color M to a bluish color, intensity constitution for laser R is changed to 92%, for example, and when amending color forming of standard color C to a greenish color, intensity constitution for laser IR is changed to 97%, for example. For other standard colors, intensity constitution for laser is adjusted in the same way when necessary. Incidentally, as a photosensitive material, the one having a photosensitive layer capable of forming color having higher density than printing ink for each color is used. Due to this, it is possible to obtain color tone which is faithful to the ink color.

When a ground color of a medium for printing, namely of a sheet for printing is different from a ground color of a photosensitive material, a change is made by making the color of standard color W to match it. For example, when a ground color of a sheet for printing is milk white, intensity constitutions for lasers R, G and IR are established so that such tone of color may be obtained. In that case, R-, G- and IR-components of the ground color are also added to R-, G- and IR-components of all other standard colors. In this way, it is possible to make a color proof which is adapted to a tone of color of ink and to a ground color of a sheet for printing.

After completion of adjustment of all standard colors for one channel, color correction for the next channel becomes possible to be made. Therefore, color correction is made in the same way even for the next channel, as occasion demands. If color correction is entirely finished, menu key 116 is pressed to return to the initial menu screen.

When making a color proof, there is used LUT which corresponds to ink and a sheet used for printing. For that reason, a screen for designating color correction channel is made to be displayed on liquid crystal panel 11 by operating a prescribed key on the menu screen. Thereby, the screen shown in FIG. 30 is displayed.

Figure 30:
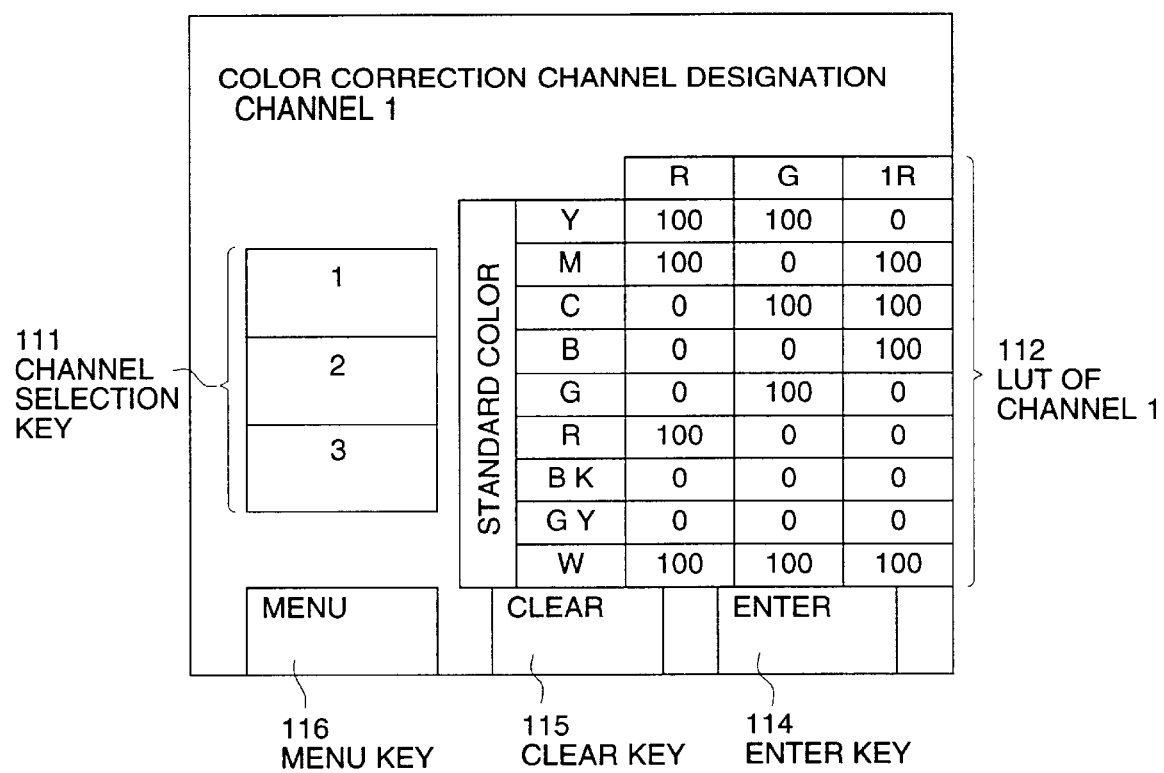
FIG. 30 is an illustration showing a color correction setting screen.

As shown in FIG. 30, channel selection key 111 as well as contents of LUT 112 for one channel, for example, for channel 1 are displayed on the screen. By selecting the desired channel with the channel selection key 111 on this screen, LUT of the corresponding channel is displayed. Then, the contents of the displayed LUT are confirmed, and LUT used for making a color proof is determined by pressing enter key 115.

On the printing machine, there occurs the so-called dot gain which means that the printed dot is larger than the dot on a halftone plate. The dot gain is also dependent on ink and a sheet for printing. Therefore, halftone dot image data in pixel data I/F section 201 are modified through CPU 101 by using liquid crystal panel 11 and touch panel 12 to give dot gain corresponding to that in printing. Incidentally, with regard to modification of halftone dot image data, it is also possible to employ a method wherein the modification is directly conducted from an operation section of halftone dot image data producing apparatus 200 main body, and the corresponding curve is stored in the present apparatus so that a channel may be called.

Figure 31:
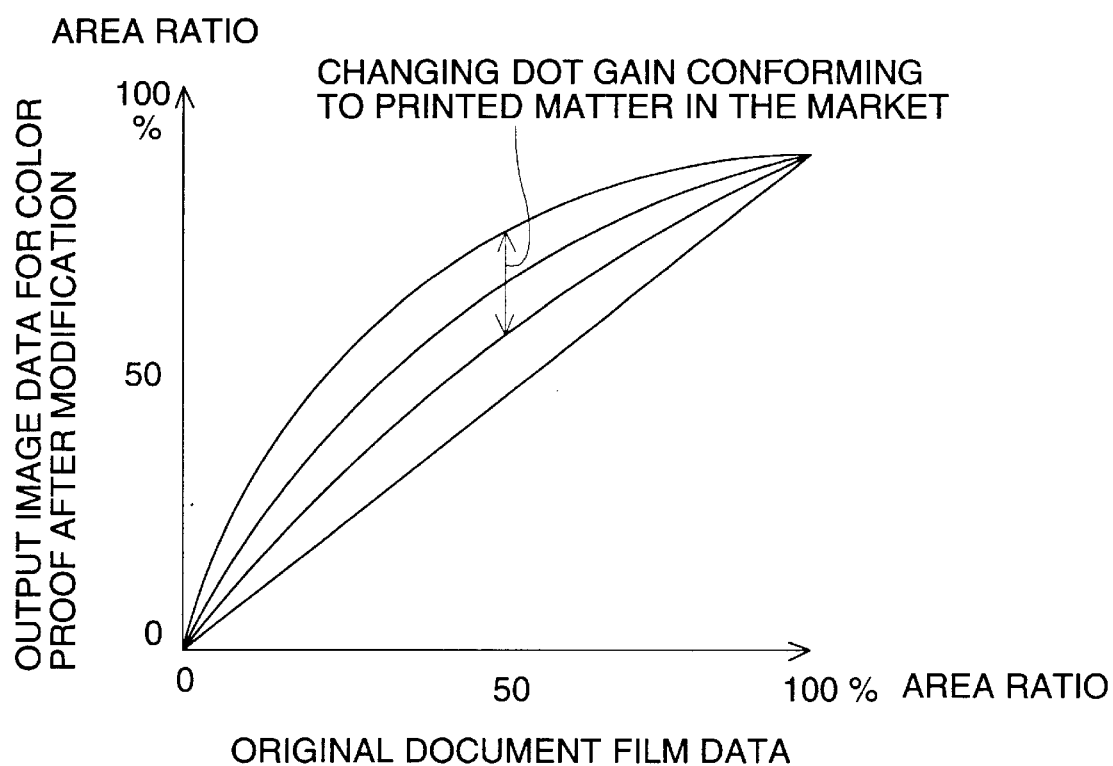
FIG. 31 is a diagram showing plural dot gain curves.

To be concrete, as shown in FIG. 31, plural dot gain curves are displayed as candidates, and appropriate ones are selected from them to conduct modification. Or, it is also possible to draw optional dot gain curves through a touch panel.

When making a color proof, it is preferable, from the viewpoint of obtaining a color proof which is faithful to the printed matter, that a photosensitive material having the state of surface matching the state of surface of a sheet for printing such as a mat surface or a glossy surface is used after selection.

Figure 32:
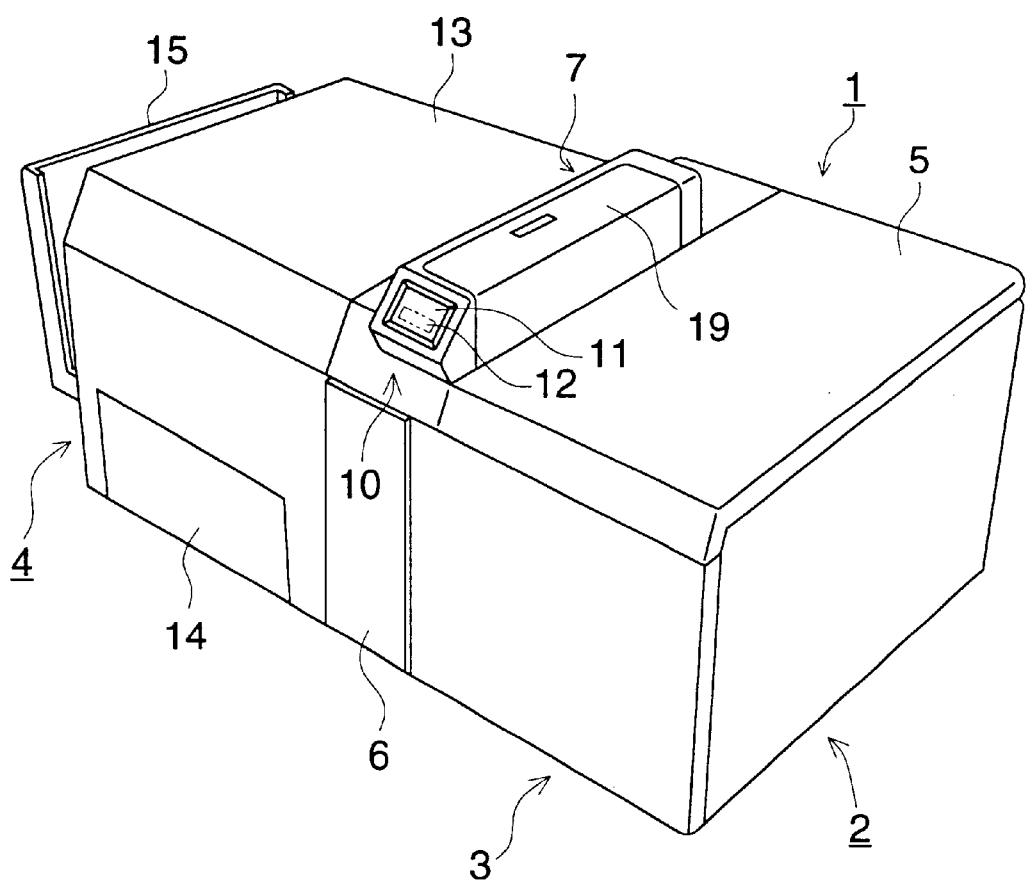
FIG. 32 is a perspective view showing a halftone dot image recording apparatus.
Figure 33:
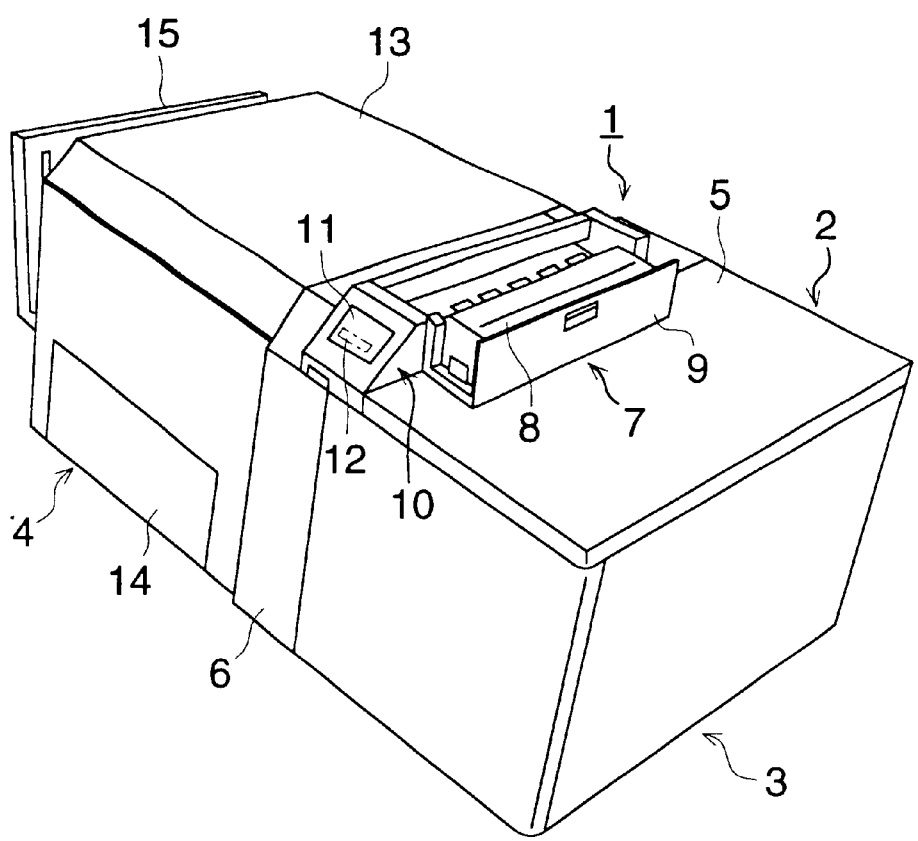
FIG. 33 is a perspective view showing the halftone dot image recording apparatus.

Liquid crystal panel 11 and touch panel 12 both serving as operation display means 10 shown in FIGS. 32 and 33 are an inputting means which is provided on the outer surface of apparatus main body 2 and inputs information for various setting and operations, and are a display means which displays the state of the apparatus and various pieces of information. This operation display means may also be composed of a display means composed of another LED and of an inputting means composed of an inputting key. In the arrangement, when an operator inputs from this operation display means, the first standard pressure value Vb1 and the second standard pressure value Vb2 can be established or changed.

RAM 102 is a means to store various types of information inputted with operation display means 10, and its example is a nonvolatile memory. Incidentally, in the present embodiment, as information to be stored in RAM 102, there are stored in RAM 102 blower standard pressure value Vb which ought to be obtained with pressure gauge 31e if suction blower A is demonstrating its prescribed power, first standard pressure value Vb1 which ought to be obtained with pressure gauge 31e if a sheet is in close contact with a circumferential surface of drum 30 when drum 30 is not rotating (in other words, a reference value for judging whether or not a sheet is in close contact with a circumferential surface of drum 30 when drum 30 is not rotating), and second standard pressure value Vb2 which ought to be obtained with pressure gauge 31e if a sheet is in close contact with a circumferential surface of drum 30 when drum 30 is rotating (in other words, a reference value for judging whether or not a sheet is in close contact with a circumferential surface of drum 30 when drum 30 is rotating). These blower standard pressure value Vb, first standard pressure value Vb1 and second standard pressure value Vb2 can be established or changed from the operation display means 11 and 12. The first standard pressure value Vb1 is established to be higher than the second standard pressure value Vb2 in terms of pressure value (to be closer to atmospheric pressure). Incidentally, it is preferable that these first standard pressure value Vb1 and second standard pressure value Vb2 are set for each size of a sheet, and the first standard pressure value Vb1 and the second standard pressure value Vb2 corresponding to the size of a sheet for image recording are stored in a storage means.

(Operations of the Image Recording Apparatus)

Figure 34:
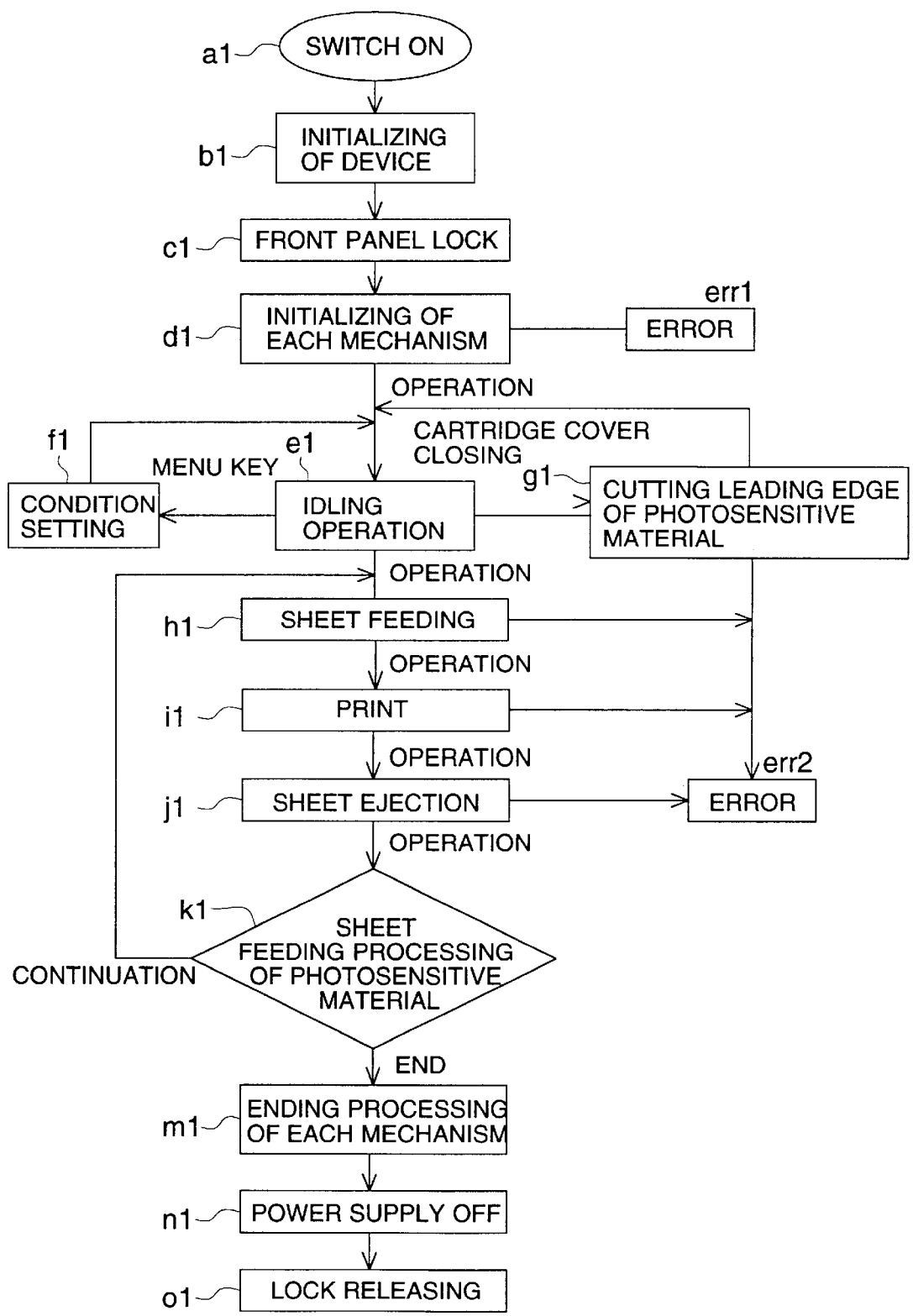
FIG. 34 is a main flow chart of the image forming apparatus.
Figure 35:
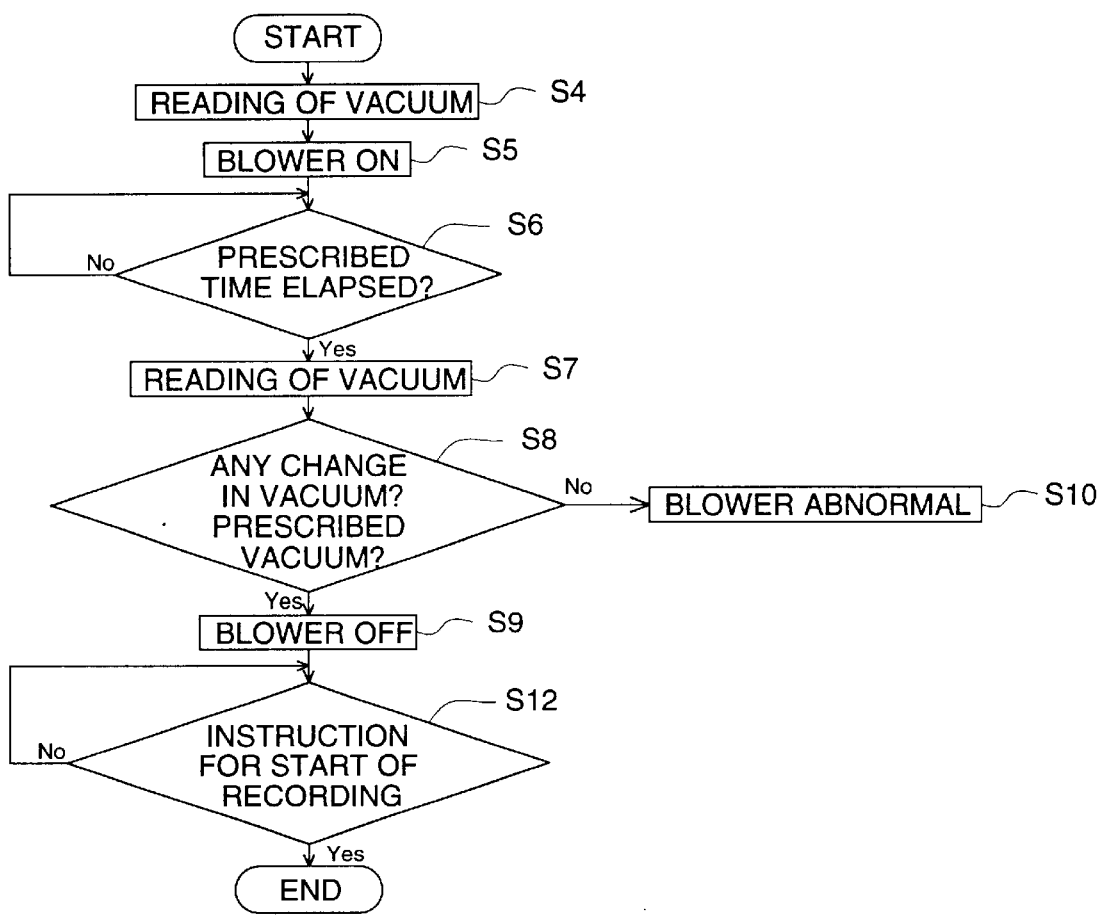
FIG. 35 is a flow chart of idle operation.
Figure 36:
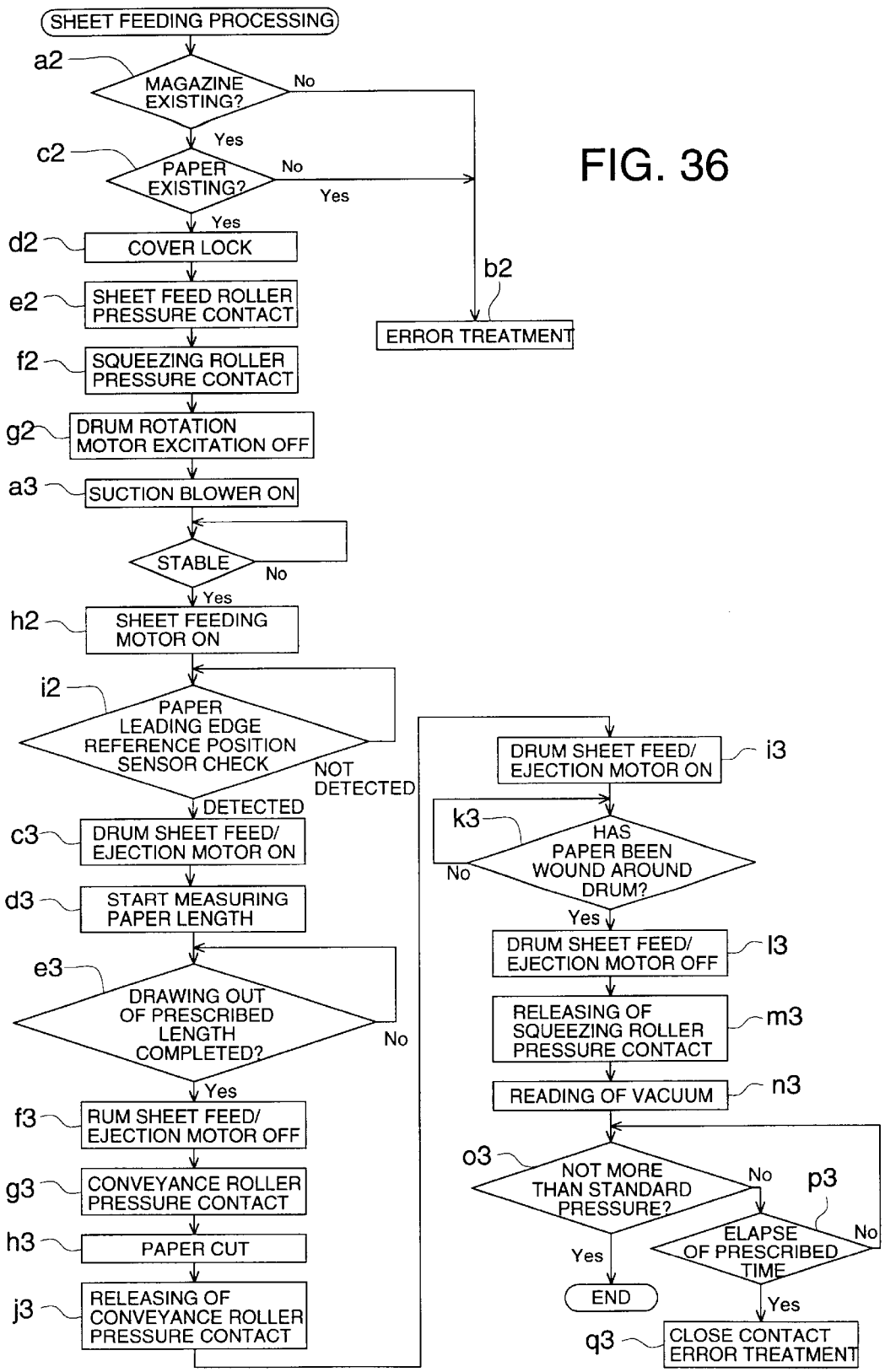
FIG. 36 is a flow chart of sheet-feeding processing.
Figure 37:
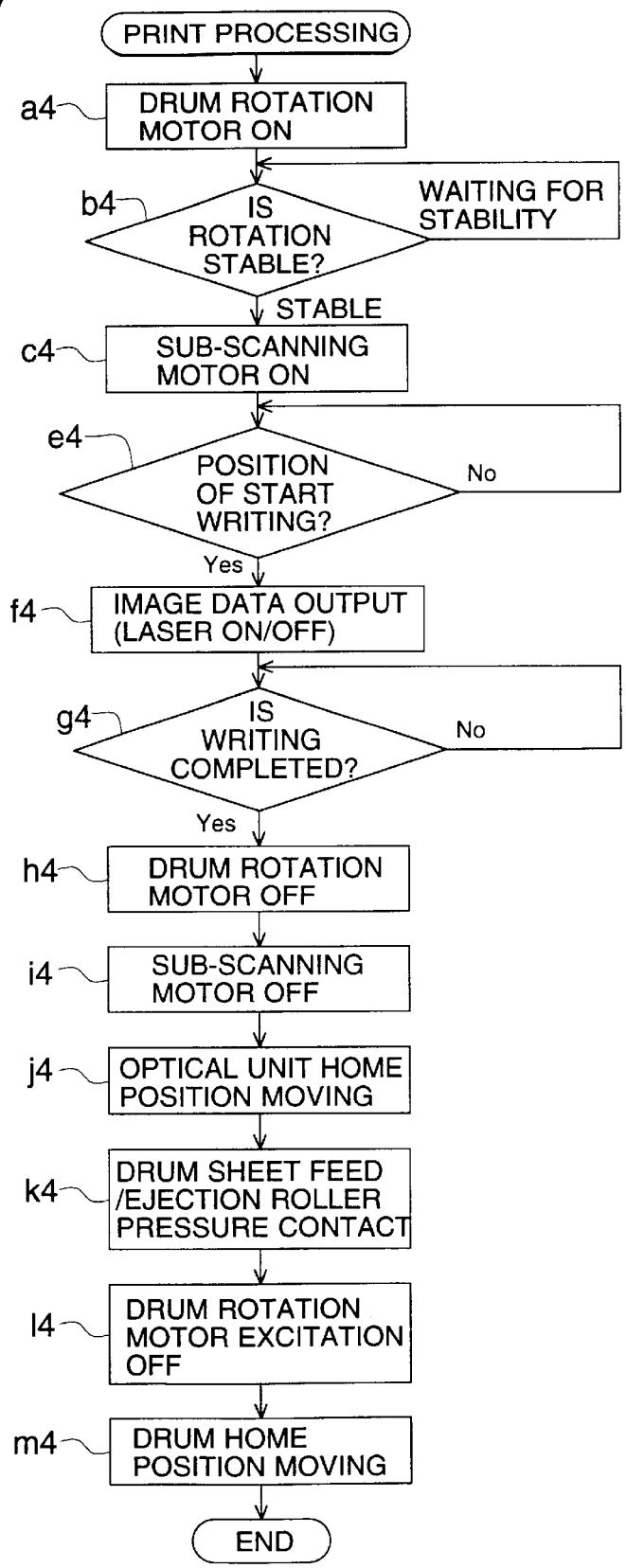
FIG. 37 is a flow chart of print processing.
Figure 38:
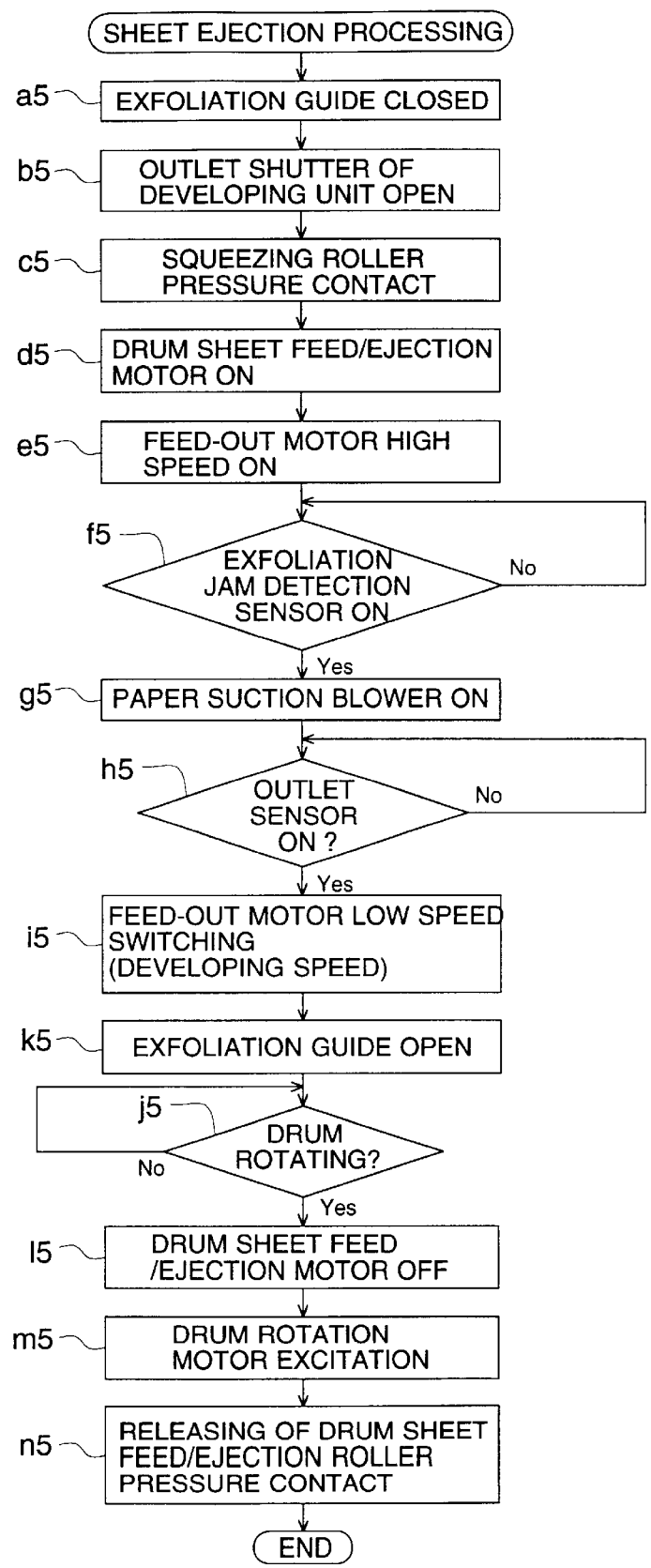
FIG. 38 is a flow chart of sheet ejection processing.
Figure 39:
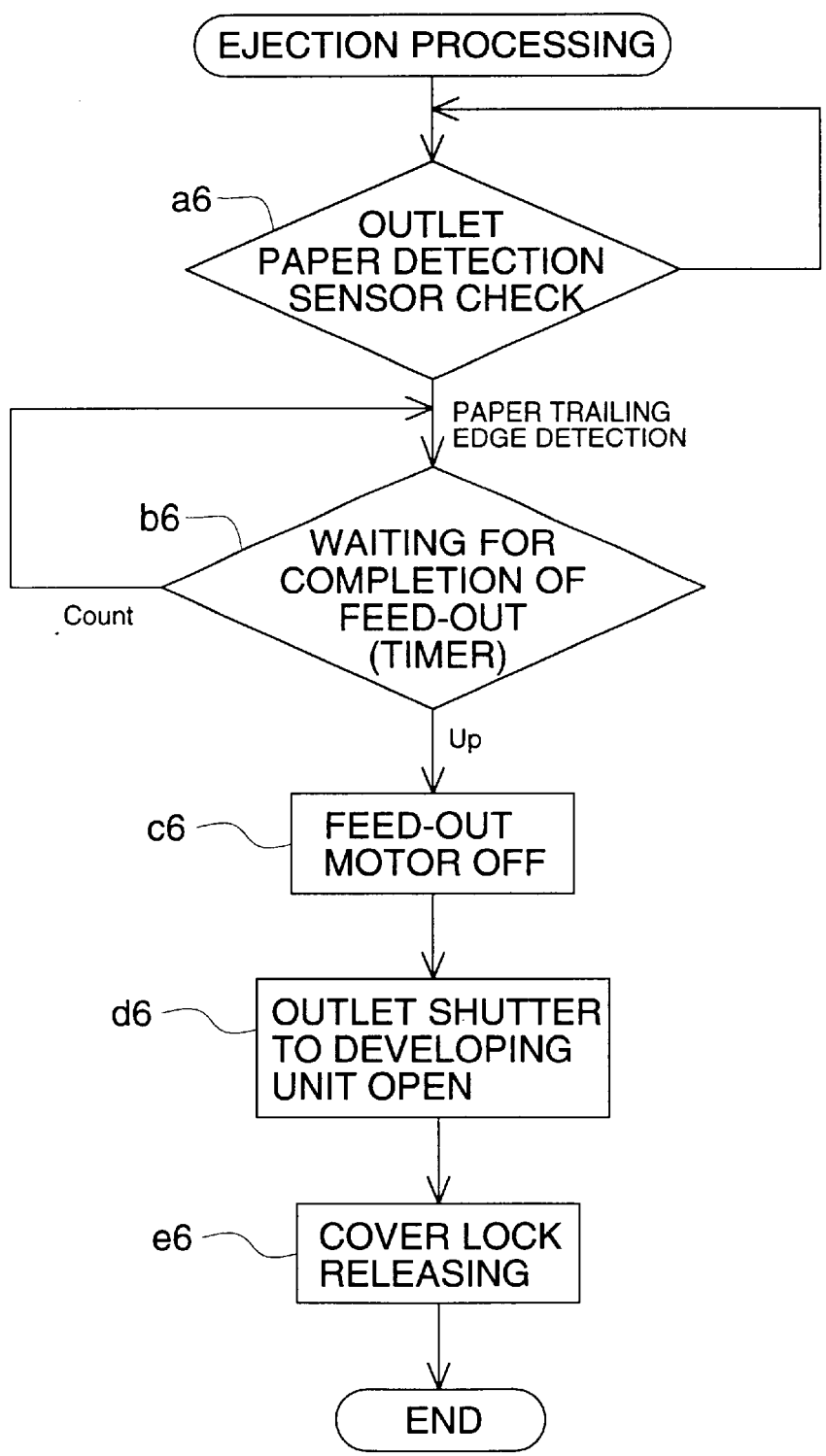
FIG. 39 is a flow chart of sheet ejection processing.

Next, operations of the image forming apparatus will be explained as follows, referring to FIG. 34–FIG. 39. FIG. 34 is a main flow chart of operations of the image forming apparatus, FIG. 35 is a flow chart of idle operation, FIG. 36 is a flow chart of sheet-feeding processing, FIG. 37 is a flow chart of print processing, FIG. 38 is a flow chart of sheet ejection processing, and FIG. 39 is a flow chart of sheet ejection processing.

The main flow of operations of the image forming apparatus will be explained first. In FIG. 34, when a main switch is turned on in step a1, initial processing for the electrical device is conducted in step b1. Here, program to RAM 102 and data loading are executed. These are operations to create the state wherein images are recorded by apparatus 1, and they include returning optical unit 400 of exposure section 3 to the sub-scanning standard position, replenishing water to each processing solution in processing section 4, and heating up to the processing temperature. Then, when the initial processing in step b1 is completed, front panel 6 is locked by locking mechanism 29 in step c1. When locking by locking mechanism 29 is confirmed, initial processing for each mechanism section is conducted in step d1. In the initial processing in step d1, drum 30 and optical unit 400 are returned to their initial positions. When an error (err 1) is caused in the initial processing for each mechanism section in step d1, functions are suspended.

When initial setting is completed, idling operation of apparatus 1 is conducted in step e1. This idling operation of apparatus 1 receives images outputted from halftone dot image data producing apparatus 200 in the course of the idling operation.

Further, in the course of the idling operation in step e1, when a menu key of touch panel 12 of operation section 8 is operated by an operator, conditions are set in step f1 in accordance with the operation of the menu key of touch panel 12 by the operator.

Next, writing operations following the idling operations in step e1 will be explained. In the writing operations, sheet-feeding processing (step h1), print processing (step i1), sheet ejection processing (step j1) are successively conducted in this order. When this writing processing is completed, a selection is made in step k1 whether or not the following photosensitive material is fed, and when the selection is made to feed the following photosensitive material, the sequence returns to the sheet-feeding processing (step h1), while when the selection is made not to feed, there comes the state wherein operation of a stop button on touch panel 12 of operation section 8 is accepted. When a command for the following print is received under the state where operation of a stop button is accepted, the sequence returns to the sheet-feeding processing (step h1). Further, when a stop button is operated under the state where operation of a stop button is accepted, operation of each mechanism section in step m1 is completed.

In completion of operation of each mechanism section in step m1, operation of each mechanism section such as sheet-feeding section 20, main scanning section 30, sub-scanning section 40, first sheet ejection section 50, accumulator section 60, feeding path 80, developing section 42, fixing section 43, stabilizing section 44, drying section 45 and second sheet ejection section 15 is completed, then main power supply is turned off in step n1, and locking by locking mechanism 29 is released by operation of front panel locking solenoid 29a (stated later) in step o1.

Next, the main flow of idle operation in step e1 in main flow of operations shown in FIG. 34 will be explained in detail, referring to FIG. 35 which represents a main flow chart of idle operations. First, pressure (the degree of vacuum) inside drum 30 is read from pressure gauge 38 (S4). Namely, a pressure under the state that blower 371 is turned off (is not driven) is read, and pressure value V1 thus read is stored in RAM 103. Then, blower 371 is turned on (driven) (S5), and after waiting the passage of prescribed time in which the operation of the blower 371 is stabilized (S6), a pressure (the degree of vacuum) in drum 30 is read from pressure gauge 38 (S7). Namely, the pressure under the state where the blower 371 is turned on (driven) is read, and pressure value V2 is stored in RAM 103.

Then, in S8, the pressure value V1 thus read is compared with that V2 to decide whether there was a change in pressure value or not (in detail, whether the pressure value V2 is smaller than the pressure value V1 (closer to vacuum) or not), and the pressure value V2 is compared with the blower standard pressure value Vb stored in RAM 102 to decide whether the prescribed degree of vacuum is attained or not (in detail, whether the pressure value V2 is smaller than the blower standard pressure value Vb or not). Namely, if there is no change in the pressure values V1 and V2 between the state where the blower 371 is driven and the state where the blower 371 is not driven after comparison between the pressure values V1 and V2, it is possible to detect that abnormality is caused on an air suction means which sucks air with blower 371 from suction holes 31c of drum 30.

As such abnormality of the air suction means, there are given troubles of blower 371, a clogged hose and a twisted hose. In particular, the abnormality is to forget to turn on the power supply of the blower 371, because the blower 371 is provided separately from apparatus 1 and the power supply for the blower 371 is provided in the different system from that for the power supply for apparatus 1.

By utilizing that the prescribed value (blower standard pressure value Vb) is obtained if the blower 371 is demonstrating its desired power after comparison between pressure value V2 and blower standard pressure value Vb, it is possible to detect abnormality of an air suction means which sucks air with blower 371 from suction holes 31c on drum 30 by judging that the blower 371 is not demonstrating the desired power, if the degree of vacuum V2 under the state where the blower 371 is driven does not arrive at the blower standard pressure value Vb.

Then, in S8, when judging that no abnormality is caused on the air suction means, the sequence advances to S9 and the blower 371 is turned off. In S8, on the other hand, if abnormality is judged to be on the air suction means, the sequence advances to S10 and abnormality of the air suction means is displayed on liquid crystal panel 11.

After the blower is turned off in step S9, it is judged whether or not the instruction for start recording is received from touch panel 12 or RIP 200. Then, when the instruction for start recording is received in S12, this idling processing (step e1) is completed. After completion of idling processing (step e1), the sequence moves to sheet-feeding processing (step h1).

Next, sheet-feeding processing of the image forming apparatus in step h1 in main flow of operations shown in FIG. 34 will be explained in detail, based on FIG. 36 which is a flow chart of sheet-feeding processing, first. After entering the flow of sheet-feeding, existence of cartridge 10 is judged in step a2, and when there is no cartridge 10, error processing is conducted in step b2, while when there is cartridge 10, detection of an end of photosensitive material P is conducted in step c2.

When the trailing edge of photosensitive material is detected in step c2 based on detection signals from end detection sensor S4, error processing is conducted in step b2 to stop driving of paired rollers 21 and to display and warn that a photosensitive material is gone. When the trailing edge of the photosensitive material is not detected in step d2, sheet-feeding cover 9 is locked.

When the sheet-feeding cover 9 is locked in step d2, sheet-feeding roller 21b is brought into pressure contact in step e2, and further, squeeze roller 23 is brought into pressure contact in step f2. Then, excitation of drum rotating motor M6 is turned off in step g2 to make drum 30 to be capable of rotating, and suction blower 371 is turned on in step a3 to wait stabilization of the suction blower 371 in step b3. As a method to wait stabilization of the suction blower 371, the method to wait for the prescribed time period which is longer than the time required usually for the stabilization, is simple. In addition to that, there are also given the method to wait until the degree of vacuum created by suction blower 371 reaches the prescribed value, and the method to wait until the level of a noise generated by suction blower 371 is lowered to be not more than the prescribed value. Then, after the noise level is stabilized, sheet-feeding motor M3 is rotated in step h2, and a photosensitive material is fed by sheet-feeding rollers 21a and 21b, and there is set a standard pressure data value to be compared with pressure data obtained through measurement by vacuum degree measuring means 711.

Then, the leading edge of the photosensitive material is detected by leading edge position sensor S9 in step i2, and after the leading edge of the photosensitive material is detected, pressure contact of conveyance roller 21b is released in step c3, and drum sheet feeding/ejection motor M4 is turned on, and simultaneously with this, measurement of a length of the photosensitive material is started by output pulse of encoder roller 37 with the leading edge of the photosensitive material detected in step d3 serving as a reference. Due to this, photosensitive material P is wound around the outer circumferential surface of drum 30 while the photosensitive material P is being sucked to and brought into close contact with the drum 30.

It is preferable that the peripheral speed of drum 30 in the course of sheet feeding is 2 m/sec or lower (in particular, 1 m/sec or lower). Owing to this, it is possible to feed to drum 30 stably, close contact with drum 30 is improved, and holding capability by suction is improved. The peripheral speed of drum 30 in the course of sheet feeding is preferably 2 cm/sec or more (in particular, 5 cm/sec or more). Due to this, the feeding time can be shortened, and it is possible to shorten the image recording time and intervals thereof. When the peripheral speed is less than 2 cm/sec, an effect for close contact with the drum is saturated. It is 0.1 m/sec in the apparatus of the present embodiment.

When it is known that a photosensitive material has been drawn out by the prescribed length by counting the length of the photosensitive-material from the count of output pulses of encoder roller 37 in step e3, sheet feeding motor M3 and drum sheet feeding/ejection motor M4 are turned off in step f3 to stop the rotation of drum 30.

Conveyance roller 21b is brought into pressure contact in step g3, and a photosensitive material is cut to the prescribed length in step h3. In this sheet cutting, cutter 22 located at its initial position is driven to rotate by cutter motor M20 and is moved forward in the lateral direction of the photosensitive material so that the photosensitive material may be cut from one side thereof. After completion of cutting, power transmission is suspended to stop the rotation and movement of the cutter.

If the cutter 22 is allowed to continue moving backward, a cut face of the cut photosensitive material on the upstream side in the conveyance direction comes in contact with the cutter 22, resulting in occurrence of sheet chips. A phenomenon of this kind is also observed in the case of other cutters including a guillotine cutter. Therefore, drum sheet feeding/ejection motor M4 is turned on in step i3, and paired rollers 21 are rotated reversely against their regular rotation for the prescribed time after completion of cutting. Due to this, a free end of photosensitive material P nipped by the conveyance means is returned toward a container by a prescribed amount. In this case, an end of the sheet is nipped by conveyance rollers 21a and 21b. Then, the cutter 22 which is out of rotation is moved backward in the lateral direction of the photosensitive material by cutter motor M20 to be returned to the initial position of the cutter 22. After that, the paired rollers 21 are rotated again to feed out the photosensitive material by a prescribed amount in the conveyance direction.

Due to this, it is possible to prevent that sheet chips are produced from the cut face of the photosensitive material when the cutter 22 moves forward, even when the cutter 22 cuts the photosensitive material stably and satisfactorily with an optimum contact angle of the cutter 22 to the photosensitive material when the cutter 22 moves forward, and the cutter 22 which is out of rotation is returned to its initial position after the photosensitive material is cut.

Incidentally, the prescribed amount related to returning of the photosensitive material or feeding out in the direction of reconveyance may either be the same or be different because no measurement is started in the present embodiment, but when considering occurrence of creases, the amount of reconveyance which is the same as or more than the amount of returning is preferable. With regard to the amount of returning stated above, 1 mm or more is preferable and 10 mm or less is preferable when occurrence of creases is considered, because the purpose of the returning is just to prevent that the cutter comes in contact again.

Then, pressure contact of conveyance rollers 21a and 21b is released in step j3. When winding around the drum is completed in step k3, drum sheet feeding/ejection motor M4 is turned off in step l3 and pressure contact of the squeeze roller is released in step m3.

Incidentally, in the apparatus of the present embodiment, a period of time from the start of contact of photosensitive material P to drum 30 to the entire contact wherein winding around drum 30 is completed is 10×LP sec for the length LP (m) of the photosensitive material. For example, the period of time for the photosensitive material having the greatest sheet length (sheet length is about 0.96 m) is about 9.6 sec, but the period of time from the start of contact of photosensitive material P to drum 30 to the entire contact wherein winding around drum 30 is completed is not limited to this, and it preferably is 0.5×LP sec or more (in particular, 2×LP sec or more) for the length LP (m) of a photosensitive material from the viewpoint of close contact of photosensitive material P to drum 30, and it is preferable to be 50×LP sec or less for the length LP (m) of a photosensitive material from the viewpoint of efficiency of sheet feeding.

Then, pressure (the degree of vacuum) inside drum 30 is read from pressure gauge 38 in step n3, and the pressure value V3 thus read is stored in RAM 103. Then, the pressure value V3 thus read is compared with the first standard pressure value Vb1 stored in RAM 102 in step o3 to judge whether the pressure value V3 has reached the first standard pressure value Vb1 or not.

Then, in step p3, judgment is made whether the prescribed time has passed or not, and the sequence returns to step o3 until the prescribed time passes, and when the prescribed time has passed, the sequence advances to step q3 wherein error in close contact is displayed on liquid crystal panel 11 as error in close contact which means that photosensitive material P is not in close contact with drum 30 because the pressure value V3 does not reach the first standard pressure value Vb1 after the passage of the prescribed time, and processing for error in close contact for ejecting photosensitive material P is conducted. A basis for this is that it is possible to estimate the condition to impede the close contact for some reasons, because the pressure value V3 read each time does not reach the first standard pressure value Vb1 even when the prescribed time has passed in such a case.

When the pressure value V3 read has reached the first standard pressure value Vb1 in step o3, photosensitive material P is regarded to be in close contact with drum 30, and sheet feeding processing is finished to move to the following print processing step.

Next, print processing will be explained in detail based on FIG. 37 showing a flow chart of print processing. Drum rotating motor M6 is turned on in step a4, and stabilization of the rotation of drum 30 is waited in step b4. As a method to wait stabilization of the rotation of drum 30, the method to wait for the prescribed time period which is longer than the time required usually for the stabilization, is simple. In addition to that, there is given the method to measure the speed of rotation of drum 30 and to wait until the fluctuation of the speed of rotation thus measured is lowered to the prescribed value or lower. Pressure detector 32 detects the pressure inside drum 30 around which a photosensitive material is wound.

When the number of rotations reaches the prescribed value, judgment is made whether photosensitive material P is in close contact with drum 30 or not even when the drum 30 is rotating. For that purpose, the pressure (the degree of vacuum) inside drum 30 is read from pressure gauge 38 first, and the pressure value V4 thus read is stored in RAM 103. Then, the pressure value V4 thus read is compared with the second standard pressure value Vb2 stored in RAM 102 to judge whether the pressure value V4 has reached the second standard pressure value Vb2 (small) or not. When the pressure value V4 read each time does not reach the second standard pressure value Vb2 even after the passage of the prescribed time, error processing is conducted as an error of close contact which means that photosensitive material P is not in close contact with drum 30. Namely, drum rotating motor M6 is turned off and blower 371 is turned off to release close contact of photosensitive material P. Due to this operation, not only the rotation of drum 30 is stopped but also the operation of blower 371 is suspended. Therefore, photosensitive material P is not held on drum 30 which is rotating with inertia, thus, damage on surrounding members is inhibited, and returning work can be made easy. Further release valve 39 is opened and the inside of drum 30 is restored to atmospheric pressure. Therefore, photosensitive material P held on drum 30 can immediately be released from the state of holding, and a display showing an error of close contact appears on liquid crystal panel 11.

On the other hand, when the pressure value V3 thus read has reached the first standard pressure value Vb1, photosensitive material P is regarded to be in close contact with drum 30 surely, and the sequence moves to the following recording step.

Next, sub-scanning motor M7 is turned on in step c4, and optical unit 400 starts moving in the direction (sub-scanning direction) which is in parallel with a drum axis. When a sub-scanning writing position is detected in step e4, exposure shutter 332 is opened and image data are outputted in step f4.

In this case, red laser light source 320, blue laser light source 321 and infrared laser light source 322 emit light based on LUT data for established channels, and images having the colors corresponding to the color of ink for printing and/or the color of a sheet for printing are used for exposure.

It is preferable that the speed of rotation of drum 30 in the course of image recording is 300 rpm or more (in particular, 700 rpm or more, further 1200 rpm or more). Due to this, it is possible to record images at high speed. Further, 5000 rpm or less (in particular, 4000 rpm or less) is preferable. Due to this, the rotation of drum 30 is stabilized, the time required for the speed of rotation to be stabilized can be shortened, the apparatus cost can be made low, safety is high, specific mechanical strength is not needed, low cost is realized, machine weight can be limited, and the machine can be installed at a convenient place without being restricted in terms of location of installation. The speed of rotation of drum 30 in the course of image recording in the apparatus of the present embodiment is 2000 rpm.

The peripheral speed of drum 30 in the course of image recording is preferably 3 m/sec or more (in particular, 5 m/sec or more, further 10 m/sec or more). Due to this, the image recording time can be shortened. The peripheral speed of drum 30 in the course of image recording is preferably 70 m/sec or less (in particular, 50 m/sec or less). Due to this, the peripheral speed of drum 30 is stabilized, the time required for the peripheral speed to be stabilized is shortened, apparatus cost is low, and safety is realized. Incidentally, the peripheral speed of drum 30 in the course of image recording in the apparatus of the present embodiment is about 30 (m/sec).

When writing of image data is completed in step g4, exposure shutter 332 is closed, drum rotating motor M6 is turned off in step h4, sub-scanning motor M7 is turned off in step i4, and optical unit 400 is moved to its home position in step j4.

In the apparatus of the present embodiment, a period of time from the moment when the drum 30 is released from its rotation to the moment when the drum 30 stops rotating is 2 sec–15 sec, but the period of time from the moment when the drum is released from its rotation to the moment when the drum stops rotating is not limited to this, and 1 sec or more is preferable from the viewpoint of stable speed reduction of drum 30 and control of exfoliation of photosensitive material P, and 1 min. or less (in particular, 30 sec or less) is preferable from the viewpoint of efficiency of exfoliation.

Then, squeeze roller 23 is brought into pressure contact with drum 30 in step k4, and excitation of drum rotating motor M7 is turned off in step 14, so that drum 30 may be moved to its home position in step m4 by the rotation of squeeze roller Next, sheet ejection processing will be explained in detail based on FIG. 38 which is a flow chart of sheet ejection processing. Exfoliation guide 51 is closed to be set at exfoliation position in step a5, and outlet shutter 55 to developing section 4 is opened in step b5.

Then, drum sheet feeding/ejection motor M4 is turned on in step d5 to rotate squeeze roller 23, and photosensitive material P is exfoliated by exfoliation guide 51 while drum 30 is rotating, and the exfoliated photosensitive material P is guided along the exfoliation guide 51. Feed-out motor M8 is turned on in step e5 so that paired conveyance rollers 52 may convey photosensitive material P at high speed with the peripheral speed which is mostly the same as that of squeeze roller 23.

When sensor S31 detects the leading edge of photosensitive material P, feed-out motor M8 is topped under the condition that the leading edge of photosensitive material P is nipped by conveyance roller 53. Then, exfoliation guide 51 is opened so that photosensitive material P may be housed in an accumulator section.

Exfoliation jam detection sensor S30 judges whether a photosensitive material jam is caused or not in step f5, and when no jam is caused, operation of suction blower 371 is stopped and suction of a photosensitive material is released in step g5.

Ejection of a photosensitive material is detected by outlet sensor S31 in step h5, and feed-out motor M8 is switched to low speed so that is may match processing at developing section 4.

Then, drum 30 is made to make one turn in step j5, and exfoliation guide 51 is opened in step k5.

Drum sheet feeding/ejection motor M4 is turned off in step 15, then, excitation of drum rotating motor M6 is conducted in step m5 so that drum 30 may not rotate freely, and pressure contact of squeeze roller 23 is released in step n5 to end sheet ejection processing.

The time from the start of exfoliation from drum 30 to the finish of exfoliation for photosensitive material P is preferably 0.5×LP sec or more (in particular, 2×LP sec or more) for length LP of the photosensitive material from the viewpoint of stable exfoliation and control of jam occurrence, and it is preferably 100×LP sec or less (in particular, 50×LP sec or less) from the viewpoint of efficiency of exfoliation. In the apparatus of the present embodiment, the time from the start of exfoliation from drum 30 to the finish of exfoliation for photosensitive material P is about 15×LP sec–20×LP sec for length LP of the photosensitive material, and it is about 15 sec for the photosensitive material having the greatest sheet length (sheet length of 0.96 m).

The peripheral speed of drum 30 from which a photosensitive material is exfoliated is preferably 2 m/sec or less from the viewpoint of stable exfoliation and prevention of folded tip of the photosensitive material, and it is preferably 0.01 m/sec or more from the viewpoint of efficiency of exfoliation. In the apparatus of the present embodiment, the peripheral speed of drum 30 from which a photosensitive material is exfoliated is about 0.05–0.1 m/sec.

Next, ejection processing will be explained in detail based on FIG. 39 which is a flow chart of ejection processing. Ejection of a photosensitive material is detected by outlet sensor S31 in step a6, and after the trailing edge of the photosensitive material is detected, completion of ejection of the photosensitive material is waited for the prescribed time period in step b6, then feed-out motor M8 is turned off in step c6, then, outlet shutter 55 to developing section 4 is closed in step d6, and locking of cover 9 is released in step e6 to finish ejection processing for the photosensitive material.

Incidentally, it is possible to arrange as follows. Namely, a transmission type sensor like end detection sensor S4, for example, is provided at the position close to a conveyance means on each of the upstream side and the downstream side of paired rollers 21 in the direction of conveyance of a photosensitive material, and when both sensors detect no photosensitive material, pressure contact of the conveyance means is automatically released based on the aforesaid information.

In that case, erroneous operations to release pressure contact carelessly and to drop a piece of photosensitive material in a conveyance path can surely be avoided, because the detection mentioned above means that the photosensitive material having the detected trailing edge has been removed for certain, and an improvement in operation including easy loading of a fresh photosensitive material can be expected.

(First Example of the Halftone Dot Image Data Storing Apparatus)

Next, the first example of the halftone dot image data storing apparatus in the example will be explained as follows, referring to FIG. 40 and thereafter.

Figure 40:
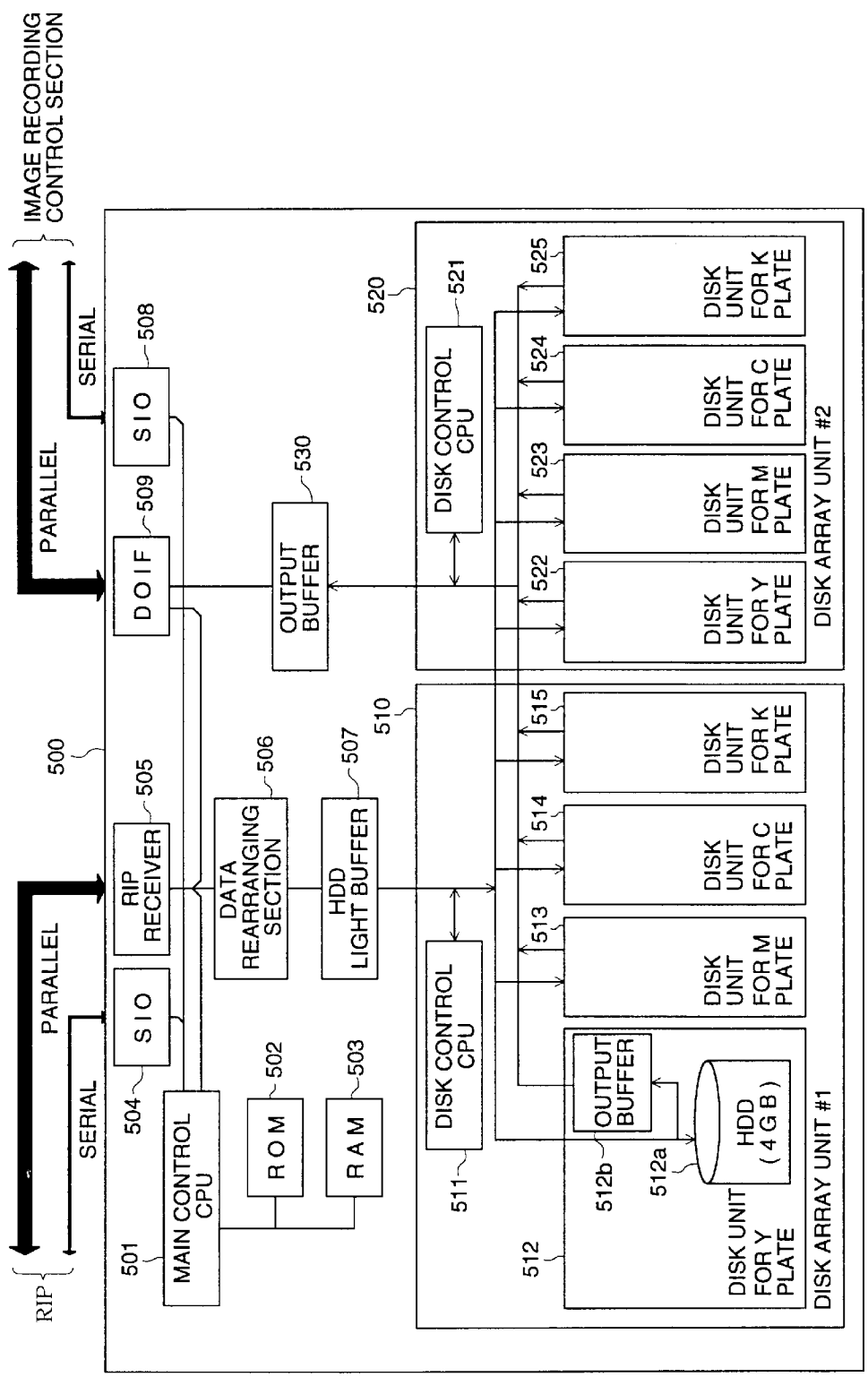
FIG. 40 is a block diagram showing the first example of the halftone dot image data storing apparatus 500.
Figure 41:
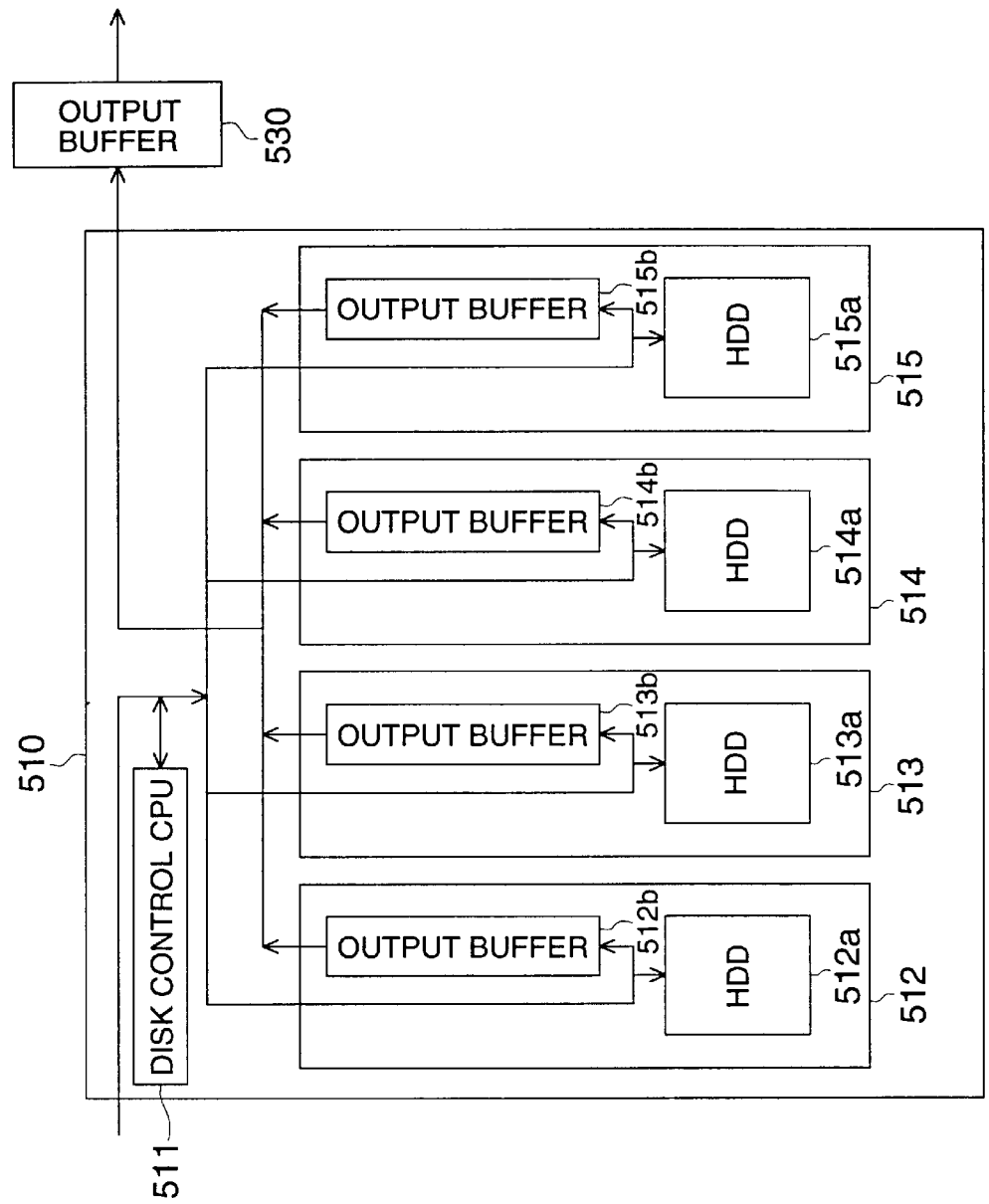
FIG. 41 is a block diagram showing how the main portions of the halftone dot image data storing apparatus 500 are structured.

FIG. 40 is a block diagram showing the schematic structure of halftone dot image data storing apparatus 500 representing the example of the halftone dot image data storing apparatus of the invention. FIG. 41 is a block diagram showing how the main portions of the halftone dot image data storing apparatus 500 are structured.

Main control CPU 501 entirely controls halftone dot image data storing apparatus 500. In ROM 502, there are recorded a program to control main control CPU 501 and various types of data. RAM 503 is used by main control CPU 501 when it executes the program. Serial input/output section (hereinafter referred to as SIO) 504 is I/O for inputting and outputting various types of control data as serial data with halftone dot image data producing apparatus 200 which is out of the diagram.

RIP receiver 505 is I/O into which halftone dot image data from the halftone dot image data producing apparatus 200 are inputted. Data rearranging section 506 divides halftone dot image data inputted from RIP receiver 505 into each group of scanning lines in quantity of n which is convenient for optical unit 400 to record simultaneously n scanning lines, and rearranges halftone dot image data of n scanning lines to be in the order with which halftone dot image recording apparatus 1 records. HDD light buffer 507 is a buffer composed of FIFO buffer elements which temporarily store halftone dot image data rearranged by the data rearranging section 506 and output them in succession, and it adjusts a difference between an outputting speed for image data of the data rearranging section 506 and a writing speed for image data of a hard disk drives (hereinafter referred to as HDD) 512a–515a and 522a–525a representing an external storing apparatus, for outputting.

First disk array unit 510 is composed of four disk units 512–515 provided respectively for four colors Y, M, C and BK and of disk control CPU 511. Namely, when writing halftone dot image data coming from the halftone dot image data producing apparatus 200, they are written and stored in disk units 512–515 each being exclusive for each color, and when reading them out, halftone dot image data are simultaneously read out of four disk units 512–515 in parallel.

Second disk array unit 520 is composed of four disk units 522–525 provided respectively for four colors Y, M, C and BK and of disk control CPU 521. Namely, when writing halftone dot image data coming from the halftone dot image data producing apparatus 200, they are written and stored in disk units 522–525 each being exclusive for each color, and when reading them out, halftone dot image data are simultaneously read out of four disk units 522–525 in parallel.

Incidentally, with regard to the first disk array unit 510 and the second disk array unit 520, when either one of them is accumulating data from the halftone dot image data producing apparatus 200, the other one conducts outputting to image recording control section 100, thereby continuous processing can be carried out.

Disk unit 512 for a plate for Y is composed of HDD 512a to store halftone dot image data for a plate for Y and of output buffer 512b to temporarily store halftone dot image data read out of HDD 512a. Incidentally, as shown in FIG. 41, each of all disk units 512–515 each being exclusive for each color is provided with the same HDD and output buffer. Each of disk units 522–525 is also provided with HDD and output buffer in the same way.

Output buffer 530 is a buffer which temporarily stores and outputs halftone dot image data for each color which are read out of the first disk array unit 510 and the second disk array unit 520.

In HDD 512a–515a and 525a–525a in disk units 512–515 and 522–525 each being exclusive for each color, there are stored halftone dot image data in the order in which they are outputted from HDD light buffer 507, and disk control CPU 511 and 521 control so that halftone dot image data may be read out in the order of inputting mentioned above.

Output buffers 512b–515b and 522b–525b in disk units 512–515 and 522–525 each being exclusive for each color are buffers which temporarily store and output halftone dot image data which are read out of HDD 512a–515a and 525a–525a in succession, in the order in which they were read out.

Though there is dispersion of the reading speed for image data in HDDs 512a–515a and 525a–525a, this dispersion of the reading speed for image data in four HDDs is adjusted for outputting, because each HDD is provided with output buffers 512b–515b and 522b–525b. Therefore, the relationship between image data read out of four HDDs can be made to be the prescribed relationship, just like outputting data for plural colors belonging to the same pixel in the same timing.

Incidentally, output buffers 512b–525b and output buffer 530 in disk units each being exclusive for each color are composed of FIFO buffer elements. With regard to HDD 512a–525a, either one of SCSI connection and IDE connection can be used.

Output buffer 530 is composed of plural FIFO buffer elements and it temporarily stores image data outputted from output buffers 512b–515b and 522b–525b each provided for each color in the order in which they are outputted, and outputs them in the same order. This output buffer 530 is one which adjusts a difference between the speed of outputting image data from output buffers 512b–515b and 522b–525b provided for each color and the speed of outputting image data to halftone dot image recording apparatus 1, for outputting.

It is also possible to make some of FIFO buffer elements used for output buffer 530 to be one which stores data with one FIFO buffer element covering plural colors, and to make the number of FIFO buffer elements to be used to be small. The basis for this is that one FIFO buffer element can store data of plural colors, because output buffers 512b–515b and 522b–525b output data of plural colors belonging to the same pixel in the same timing.

SIO 508 is I/O which receives and sends various types of control data as serial data with image recording control section 100. DOIF 509 is I/F which outputs halftone dot image data for each color outputted from output buffer 530 to image recording control section 100 as parallel data.

Next, operations of halftone dot image data storing apparatus 500 in the present embodiment will be explained.

Incidentally, operations of the first disk array unit 510 are shown here to simplify the explanation, but operations of the second disk array unit 520 are also the same.

In the halftone dot image data storing apparatus 500 having the structure stated above, surface-sequential halftone dot image data (data divided respectively into Y, M, C and BK corresponding to printing plates) prepared by halftone dot image data producing apparatus 200 are inputted with RIP receiver 505, and then are converted to an arrangement of data equivalent to one scanning of plural beams of an exposure apparatus by image rearranging section 506. Then, the converted halftone dot image data equivalent to one screen in quantity are accumulated by disk control CPU 511 in each of disk units 512–515 each being for each color.

Then, at a point of time when accumulation of halftone dot image data for each color is completed, disk control CPU 511 simultaneously reads halftone dot image data in parallel out of disk units 512–514 each being exclusive for each color. Halftone dot image data for each color are read out under the state wherein constant amount of them are stored by each of output buffers 512*b*–515*b*. Halftone dot image data for each color which have been simultaneously read out in parallel are further outputted to image recording control section 100 as parallel data through DOIF 509 under the state wherein constant amount of them are stored with output buffer 530.

In the present example, fluctuation of the reading speed of HDD 512*a*–515*a* in each disk unit is absorbed when halftone dot image data read out of disk units 512–515 each being for each color are stored temporarily by each of output buffers 512*b*–515*b*. Therefore, it is possible to improve productivity in the case of recording images for plural colors simultaneously by receiving surface-sequential image data for plural colors.

Further, in the present example, a difference or fluctuation between the total reading speed of the first disk array unit 510 and the exposure speed of exposure section 3 (data outputting speed of image recording control section 100) is absorbed when halftone dot image data read out of disk units 512–515 each being for each color are collectively stored by output buffer 530. Therefore, it is possible to improve productivity in the case of recording images for plural colors simultaneously by receiving surface-sequential image data for plural colors.

Since output buffer 530 is provided behind each of output buffers 512*b*–515*b* in each disk unit, fluctuation of the reading speed of HDD 512*a*–515*a* in each disk unit is absorbed, and a difference or fluctuation between the total reading speed of the first disk array unit 510 and the exposure speed of exposure section 3. (data outputting speed of image recording control section 100) is absorbed. Therefore, further excellent results are obtained.

Incidentally, in recent years, a capacity of HDD has been made larger. Therefore, when accumulating halftone dot image data for each color, it is possible to accumulate halftone dot image data for plural screens. For example, when it is assumed that an amount of halftone dot image data for one sheet for each color is 500 M byte and a capacity of HDD to be used is 4G byte, halftone dot image data for 8 sheets can be accumulated.

On the contrary, when processing is made with default of an operating system, halftone dot image data are stored in HDD at random, and data are stored in the track on an outer circumference end after they are stored in the track on the center end of hard disk HD, or data are sometimes stored in the order opposite to the foregoing, thereby head H of HDD sometimes needs to move by the maximum moving distance L max in the radial direction Ra. Therefore, there has been a high possibility that an interval for data reading is extended suddenly to be long extremely.

Figure 42:
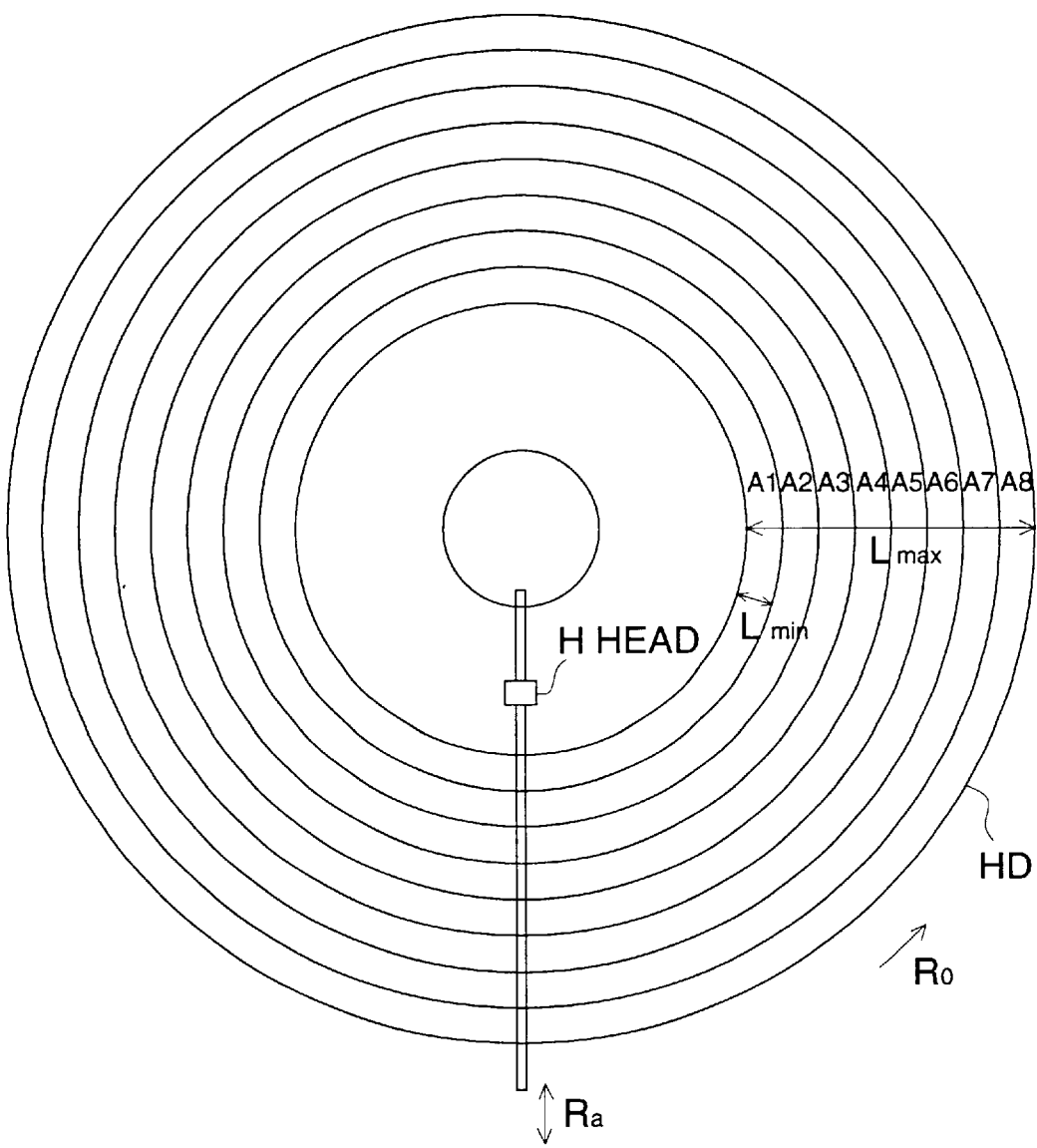
FIG. 42 is an illustration showing an example wherein HDD is divided into 8 areas of physical storage areas A1–A8.

In halftone dot image data storing apparatus 500 of the present example, HDD is physically divided in advance into a physical storage area for the number of sheets which can be recorded based on the capacity of HDD to be used and an amount of halftone dot image data. In FIG. 42, there is shown an example wherein HDD is divided into 8 areas of physical storage areas A1–A8. Halftone dot image data for one sheet are substantially stored physically and continuously only in one physical storage area. Therefore, head H of HDD hardly moves, and its longest distance to move is width L min in the radial direction Ra of one physical storage area. Accordingly, there hardly is a risk that an interval for data reading or data writing is extended suddenly to be long extremely. Further, since storage is substantially conducted physically and continuously, data to be stored in succession are seldom stored by skipping to the remote position in the rotation direction Ro of hard disk HD, and a risk that an interval for data reading or data writing is extended suddenly to be long which is caused by the storage in the remote position through skipping, is low. Incidentally, a sector of defective writing is sometimes caused by aging change. In that case, data are stored in the remote position by skipping the sector.

In the explanation above, when accumulating halftone dot image data for each color, the area which has been used is controlled by disk controls CPU 511 and 521, and there is conducted a control to use physical storage areas A1–A8 of each HDD in the order. Owing to the rotational use like this, the total areas of HDD are used uniformly, and occurrence of wear and defects of a magnetic disk can be controlled to the minimum. Therefore, stable image recording can be realized.

Incidentally, in the course of usage of HDD, a physical storage area which can not be used normally sometimes appears on the magnetic disk. Therefore, disk control CPU 511 and 521 execute a defect detection program to detect the defects on physical storage areas of each HDD. With regard to the physical storage area on which the defect is detected, the control is conducted not to use that physical storage area. In this case, it is preferable to skip the physical storage area on which the defect is detected in the rotational usage.

It is also possible to detect the defect from the reading speed for reading the actual halftone dot image data without executing the defect detection program stated above. In this case, defects can be detected based on dispersion of the reading speed in various colors, aging change of the reading speed, and the absolute value of the reading speed lowered to the prescribed value or lower. Even in this case, the control not to use the physical storage area having the detected defect can be conducted. Incidentally, with regard to the detection of the defective reading speed, disk control CPU can directly monitor, and a flag showing that either one of output buffers 512*b*–515*b* and 522*b*–525*b* is empty is used to control so that a physical storage area wherein the image data of HDD connected to the output buffer relating to the flag are stored may not be used.

Incidentally, in the explanation mentioned above, there is shown the state of image system wherein halftone dot image data storing apparatus 500 is housed in halftone dot image recording apparatus 1. However, the same effect as in the aforesaid explanation can also be obtained in the image system wherein halftone dot image data storing apparatus 500 is housed in halftone dot image data producing apparatus 200. Further, the same effect as in the aforesaid explanation can also be obtained even when halftone dot image data storing apparatus 500 is provided independently between halftone dot image data producing apparatus 200 and halftone dot image recording apparatus 1.

In this example, two disk controllers 511 and 521 are provided, and when image data on one side are being read, image data can be written in the disk controller on the other side, thus, productivity of image recording can be improved.

The foregoing is the first example of a halftone dot image data storing apparatus.

(Second Example of the Halftone Dot Image Data Storing Apparatus)

Next, the second example of the halftone dot image data storing apparatus will be explained.

Figure 43:
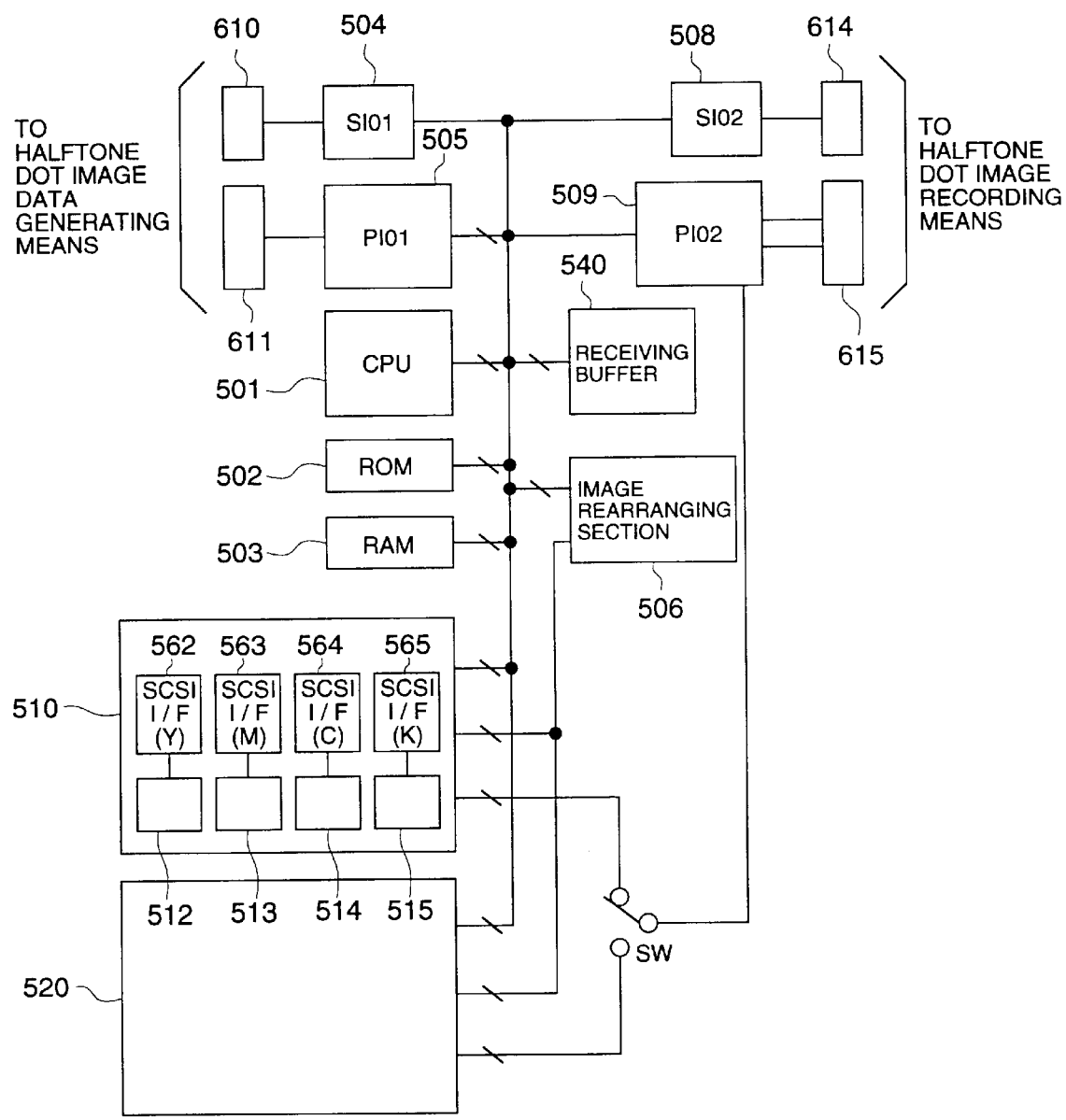
FIG. 43 is a diagram showing the second example of halftone dot image data storing apparatus 500.

FIG. 43 is a diagram showing the second example of halftone dot image data storing apparatus 500. In the halftone dot image data storing apparatus 500 in this example, halftone dot image data producing apparatus 200 and halftone dot image recording apparatus 1 are connected to each other through RIP receivers 505 (PIO1) and DOIF 509 (PIO2) composed respectively of interface for control data communication SIO 504 (SIO1) and SIO508 (SIO2) and interface for image data receiving. Connectors 610, 611, 614 and 615 are connected respectively to the halftone dot image data producing apparatus 200 and the halftone dot image recording apparatus 1.

CPU 501 serving as a main controller conducts relay of control information, and delivers instructions for writing or reading to two disk array units 510 and 520 arranged concerning preservation instruction of halftone dot image data. Each of disk array units 510 and 520 is composed of four SCSI disks 512–515. SCSI interface 562 corresponds to disk 512 for Y (yellow). SCSI interface 563 corresponds to disk 513 for M (magenta). SCSI interface 564 corresponds to disk 514 for C (cyan). SCSI interface 565 corresponds to disk 515 for K (black).

Figure 44:
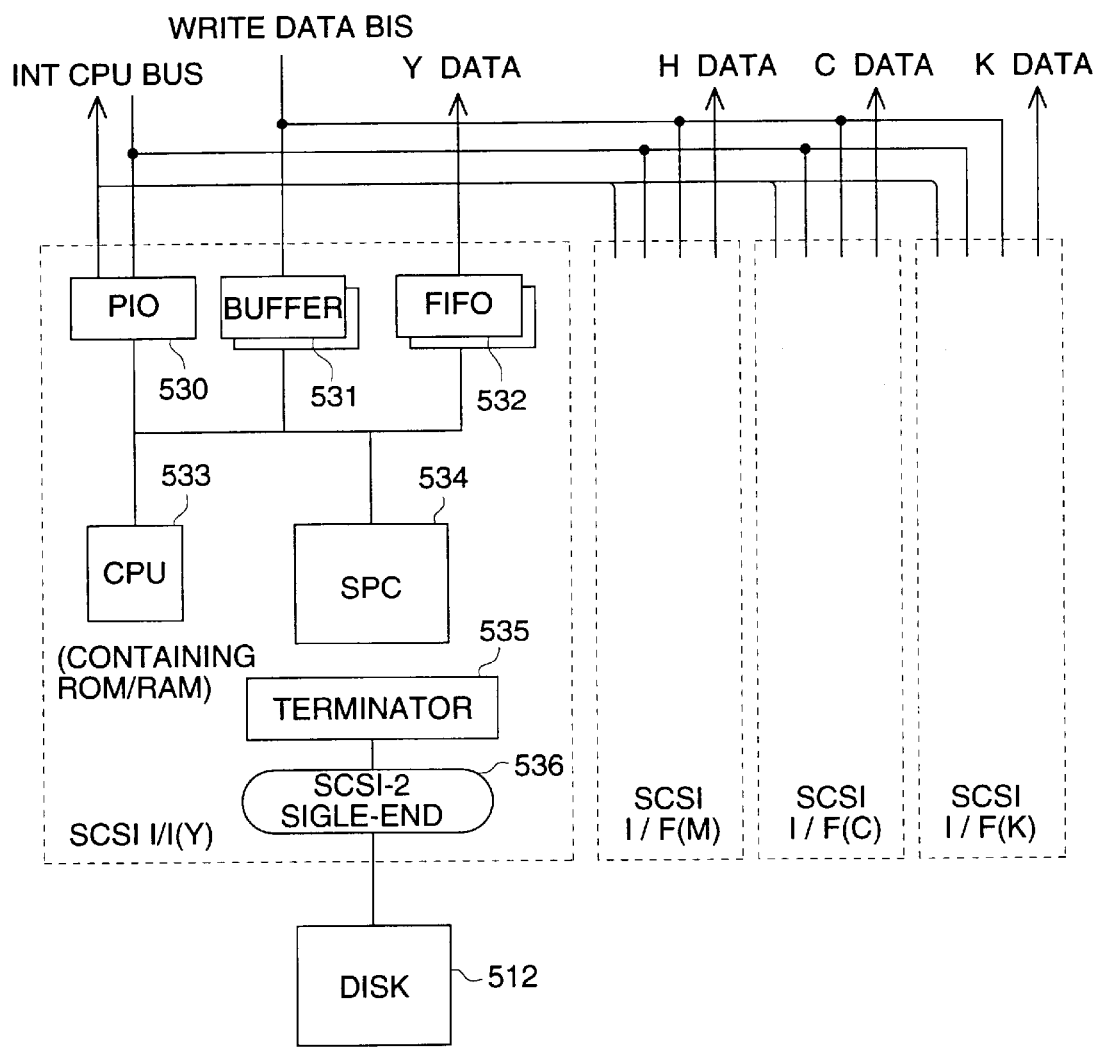
FIG. 44 is a diagram showing concrete embodiment of a disk controller unit.

Incidentally, as shown in FIG. 44, each disk is provided with CPU 533 which conducts writing or reading while directly instructing the writing position to each disk, reading position, writing amount and reading amount through SCSI command. Incidentally, since the halftone dot image recording apparatus is of a point-sequential recording system (recording system with one dot for each color), transmission is conducted by synchronizing on DOIF 509 (PIO2) while reading in parallel from each of disks 512–515.

Image data inputted from halftone dot image data producing apparatus 200 are stored temporarily in receiving buffer 540, and then are read out of the receiving buffer 540 to enter image rearranging section 506 where the image data are rearranged and then are stored in each of disks 512–515 for each color.

In ROM 502, there is stored a program, and RAM 503 functions as a work area. Switch SW is one to switch disk controller units 510 and 520, and these disk controller units 510 and 520 are switched to be used. Namely, when one of them is writing image data, the other is controlled to conduct reading of image data. Image rearranging section 506 rearranges image data for simultaneous recording, for example, of ten lines.

FIG. 44 is a diagram showing a concrete embodiment of a disk controller unit. In the diagram, interface for image data communication 530 is an interface for conducting sending and receiving of control signals with CPU 501. Buffer 531 is a buffer wherein inputted halftone dot image data are temporarily stored. Buffer for FIFO (first-in first-out) 532 is a buffer for temporal storage for outputting halftone dot image data read out of the disk. Functions of these buffers have already been explained in the explanation of the invention. CPU 533 controls writing/reading of disks. First Wide SCSI 534 connects these buffers 531 and 532 with terminator 535. SCSI 2 single end interface 536 is connected to the terminator 535. Disk 512 stores image data. The structure mentioned above is commonly used also for M, C and K.

Figure 45:
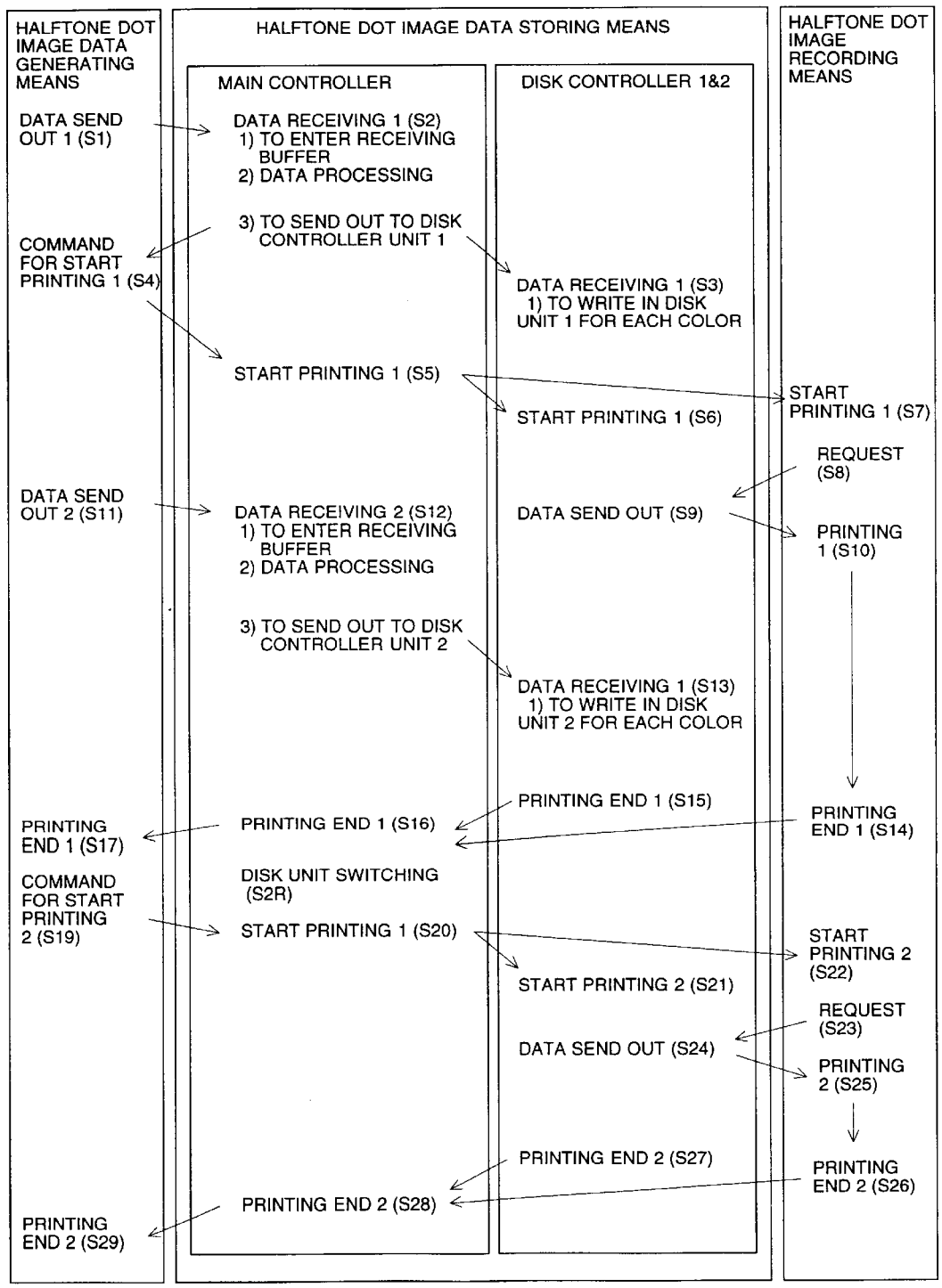
FIG. 45 is a sequence diagram showing the total operations of the present invention.

FIG. 45 is a sequence diagram showing the total operations of the present example. This diagram shows data sending and data receiving conducted by halftone dot image data producing apparatus 200, halftone dot image data storing apparatus 500 and halftone dot image recording apparatus 1.

Data transmission 1 is sent out from halftone dot image data producing apparatus 1 (S1). Main controller (CPU 18) accepts this data transmission 1 and receives data 1. Then, the received data are preserved in receiving buffer 19, and image rearranging (data processing) is conducted in image rearranging section 21. After completion of the aforesaid processing, this information is notified to the halftone dot image data producing apparatus 200 and disk controller 30 or 40 (S2).

After receiving data receiving notification from main controller 18, the halftone dot image data producing apparatus 200 gives print starting command 1 to the main controller 18 (S4). On the other hand, the main controller 18 gives receiving data to disk controller unit 1, and disk controller 1 writes image data on disk unit for each color (S3). The main controller 18 receives print starting 1 from the halftone dot image data producing apparatus 200 (S5), and notifies print starting 1 to disk controller 1 and halftone dot image recording apparatus 1 (S6).

After receiving the print starting 1 (S7), the halftone dot image data recording apparatus 1 sends a data transmission request to disk controller 1 (S8). After receiving this request, the disk controller 1 transmits image data stored (S9). Then, the halftone dot image recording apparatus 1 executes printing 1 (S10).

In this period, on the other hand, the halftone dot image data producing apparatus 2 executes data transmission 2 to the main controller 18 (S11). After receiving data 2, the main controller 18 temporarily preserves received image data in receiving buffer 19 and rearranges image data with image rearranging section 21. Then, the rearranged image data are transmitted to disk controller 2 (S12).

In the disk controller 2, data 2 are received, and image data are written in disk unit 2 for each color (S13). In this period, the halftone dot image data recording apparatus 1 completes printing 1 (S14), and notifies printing end 1 to the main controller 18 (S15). The main controller 18 notifies printing end 1 to the halftone dot image data producing apparatus 200 (S16).

After receiving the printing end 1 (S17), the halftone dot image data producing apparatus 200 transmits following print starting command 2 (S19). On the other hand, after transmitting the printing end 1, the main controller 18 switches a disk controller from 1 to 2 (S18). As a result, image data of disk controller 2 are printed by the halftone dot image data recording apparatus 1.

The print starting command 2 from the halftone dot image data producing apparatus 200 is given to main controller 18 (S20), and the main controller 18 notifies print starting 2 to disk controller 2 and halftone dot image data recording apparatus 1 (S21). The halftone dot image data recording apparatus 1 sends an image data transmission request to the disk controller 2 (S23). Receiving this request, the disk controller 2 transmits image data (S24). The halftone dot image data recording apparatus 1 receives image data and enters printing 2 step (S25).

After completion of printing 2, the halftone dot image data recording apparatus 1 notifies completion of printing 2 to main controller 18 (S27). The completion of printing 2 is notified also from disk controller 2. After receiving the completion of printing 2, the main controller notifies completion of printing 2 to halftone dot image data producing apparatus 200. The halftone dot image data producing apparatus 200 receives notification of completion of printing 2 (S29).

In the constitution stated above, in addition to transmission of halftone dot image data, communication of control information (conveyance instruction for a color photosensitive material, instruction for exposure start/suspension, and responded to them) is sometimes conducted between halftone dot image data producing apparatus 200 and halftone dot image data recording apparatus 1. In this case, the control information is subjected to communication through halftone dot image data storing apparatus 500, and when relay of the control information and storage control for halftone dot image data are conducted by a single control means in the halftone dot image data storing apparatus 500, there are caused deterioration of response of the control information and speed reduction in R/W of halftone dot image data.

Therefore, by arranging SIO 504 and 508 representing a communication means and RIP receiver 505 and DOIF 509 representing input/output control means for halftone dot image data to be separated in halftone dot image data storing apparatus 200, it is possible to realize high speed and highly reliable data transmission. In the present example, it is possible to read and write (R/W) halftone dot image data to halftone dot image data storing apparatus 500 by the control means for input and output of halftone dot image data, while control information is sent or received by a communication means for the control information. Therefore, compared with an occasion where both processing works are conducted by a single CPU, high speed and highly reliable data transmission can be made possible.

On the other hand, when transmitting halftone dot image data already stored in halftone dot image data storing apparatus 500 to halftone dot image recording apparatus 1, while storing halftone dot image data transmitted from halftone dot image data producing apparatus 200 in halftone dot image data storing apparatus 500, I/O (input and output) speed is sometimes lowered. By arranging separately the control means for input and the control means for output, therefore, high speed and highly reliable preparation of a color proof is made possible. Incidentally, it is more effective if plural input control means and output control means corresponding to the number of storing apparatuses are provided.

(Hard Disk Array of the Halftone Dot Image Data Storing Apparatus)

Figure 48:
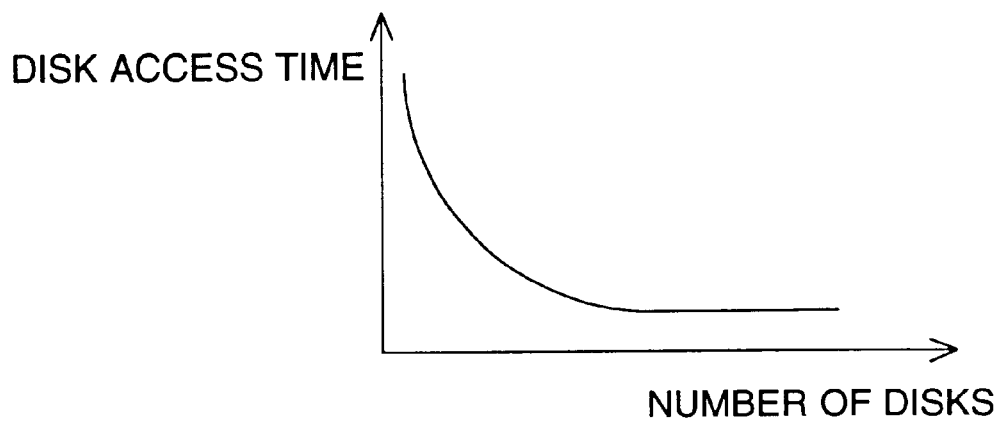
FIG. 48 is a diagram showing relationship between the number of disks and disk access time.

A hard disk array which is common to two examples of the aforesaid halftone dot image data storing apparatus will be explained. When using a hard disk (HD), it is effective to employ a disk array structure wherein plural HDs are driven in parallel. In this case, halftone dot data can be read/written (R/W) in parallel for plural HDs. Therefore, disk access time is shortened theoretically in inverse proportion to the number of HDs. FIG. 48 is a diagram showing the relationship between the number of hard disks and disk access time. The axis of ordinates represents disk access time and the axis of abscissas represents the number of disks. The disk access time t is in the relation of t=1/(the number of disks).

Namely, the larger the number of HDs is, the better the disk access time is, but in view of that the halftone dot image data used for color proof is composed of four colors of Y (yellow), M (magenta), C (cyan) and K (black), it is effective to constitute with four HDs.

Figure 49:
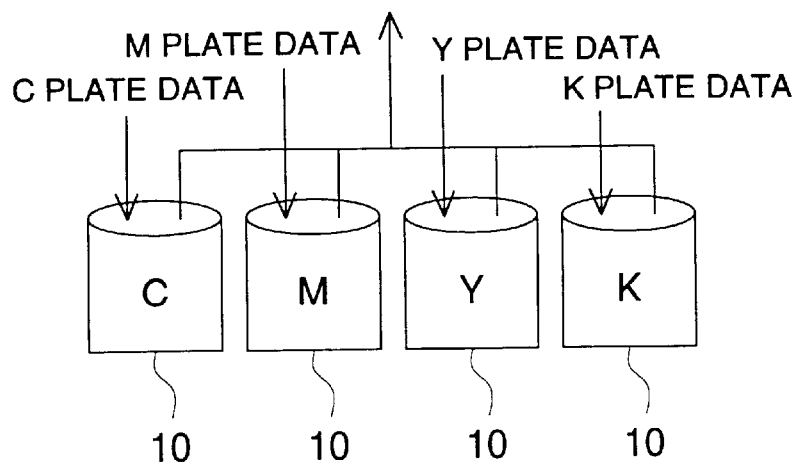
FIG. 49 is an illustration showing data writing in the disk or reading from the disk.

Namely, as shown in FIG. 49, when writing halftone dot image data, the data are written in HD exclusive for each color separately (10 in the diagram), and when reading the halftone dot image data, they are simultaneously read from four HDs in parallel. It is also naturally possible to read data of a plate of necessary color from each HD in succession.

Figure 50:
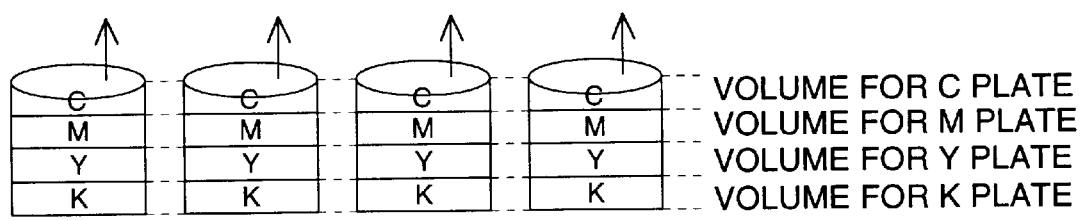
FIG. 50 is a diagram showing how data are stored in the disks.

Further, as an another arrangement, if there is made an arrangement wherein logical volumes are prepared for plural HDs in advance as shown in FIG. 50 so that reading and writing are conducted for them, simultaneous R/W for halftone dot image data is always possible. As stated above, an arrangement of disk array with plural HDs is especially effective in the system of making a color proof which requires high speed processing for outputting plural plates (disk reading speed).

In the embodiment explained above, it is possible to write in or read from each hard disk in halftone dot image data storing apparatus 500 simultaneously (in parallel), thus, it is possible to transmit data to halftone dot image recording apparatus 1 at high speed. Further, together with this, halftone dot image recording processing on a photosensitive material in the halftone dot image recording apparatus 1 can be speeded up, which makes improvement of synergistic output speed possible.

Incidentally, in a data storing medium represented by a magnetic recording medium such as the aforesaid HD, reading/writing of data are controlled by an operating system (OS) on a universal computer, and when writing data, data of a single block is divided to be written in physically random areas (vacant areas) on the medium, and when reading them, they are read by degrees after their positions are retrieved, which is the actual state.

Figure 51:
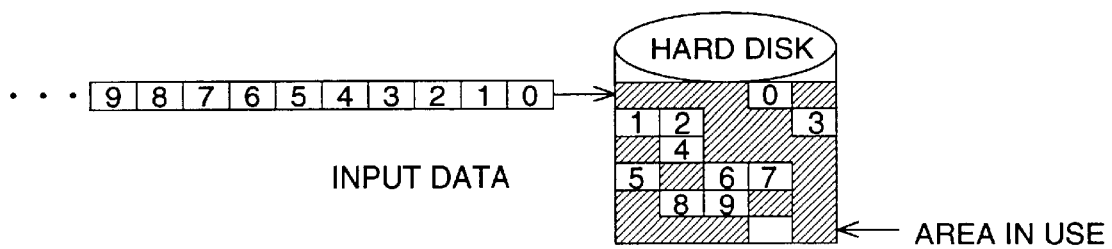
FIGS. 51(a) and 51(b) each is an illustration showing rearrangement of image data in the disk.
Figure 51:
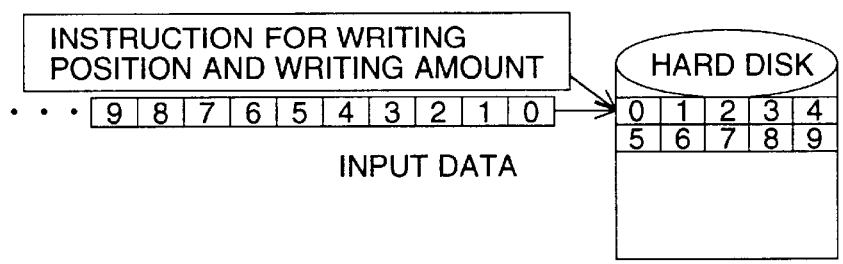
Figure 52:
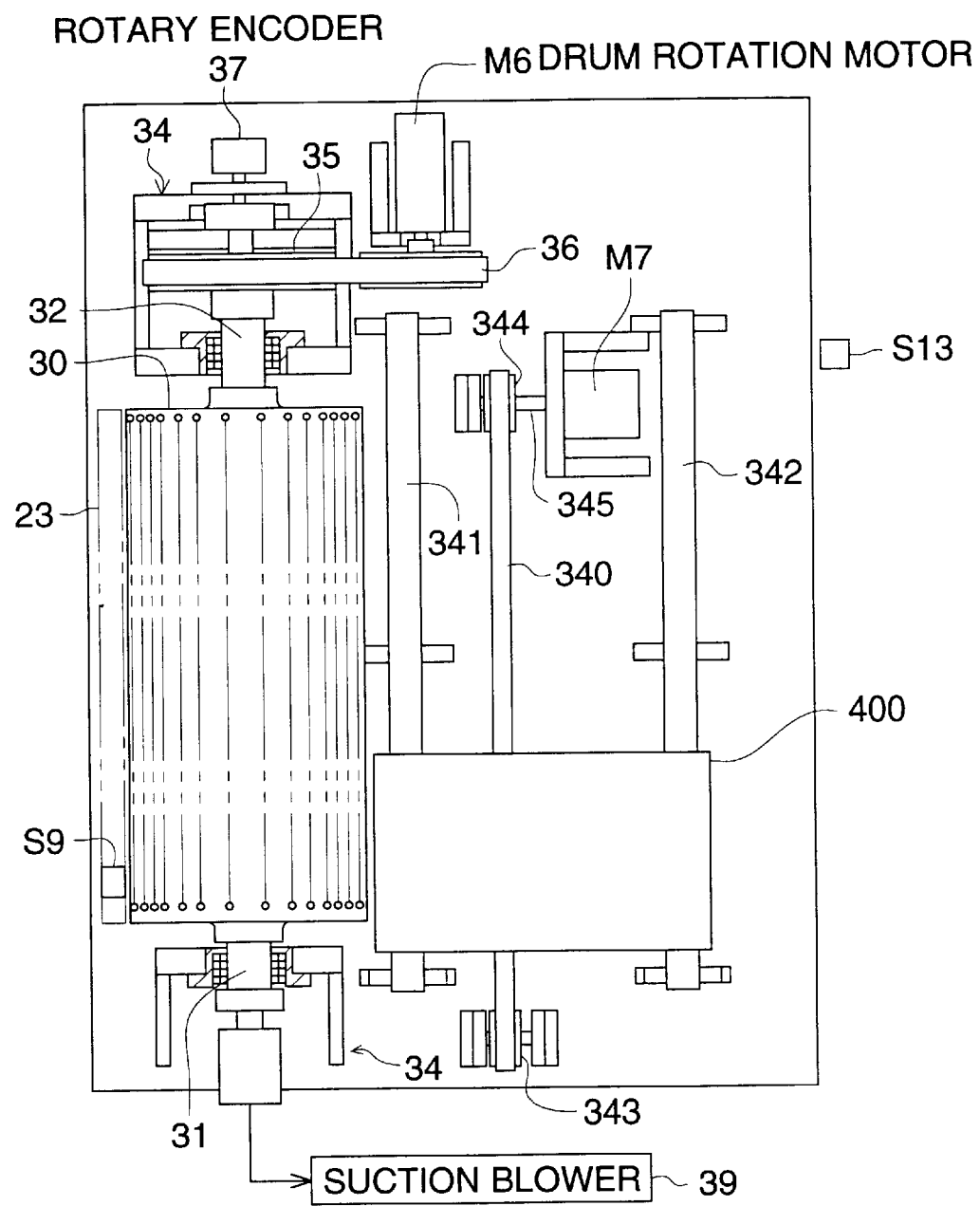
FIG. 52 is a top view showing the drum and the surrounding of optical unit.
Figure 53:
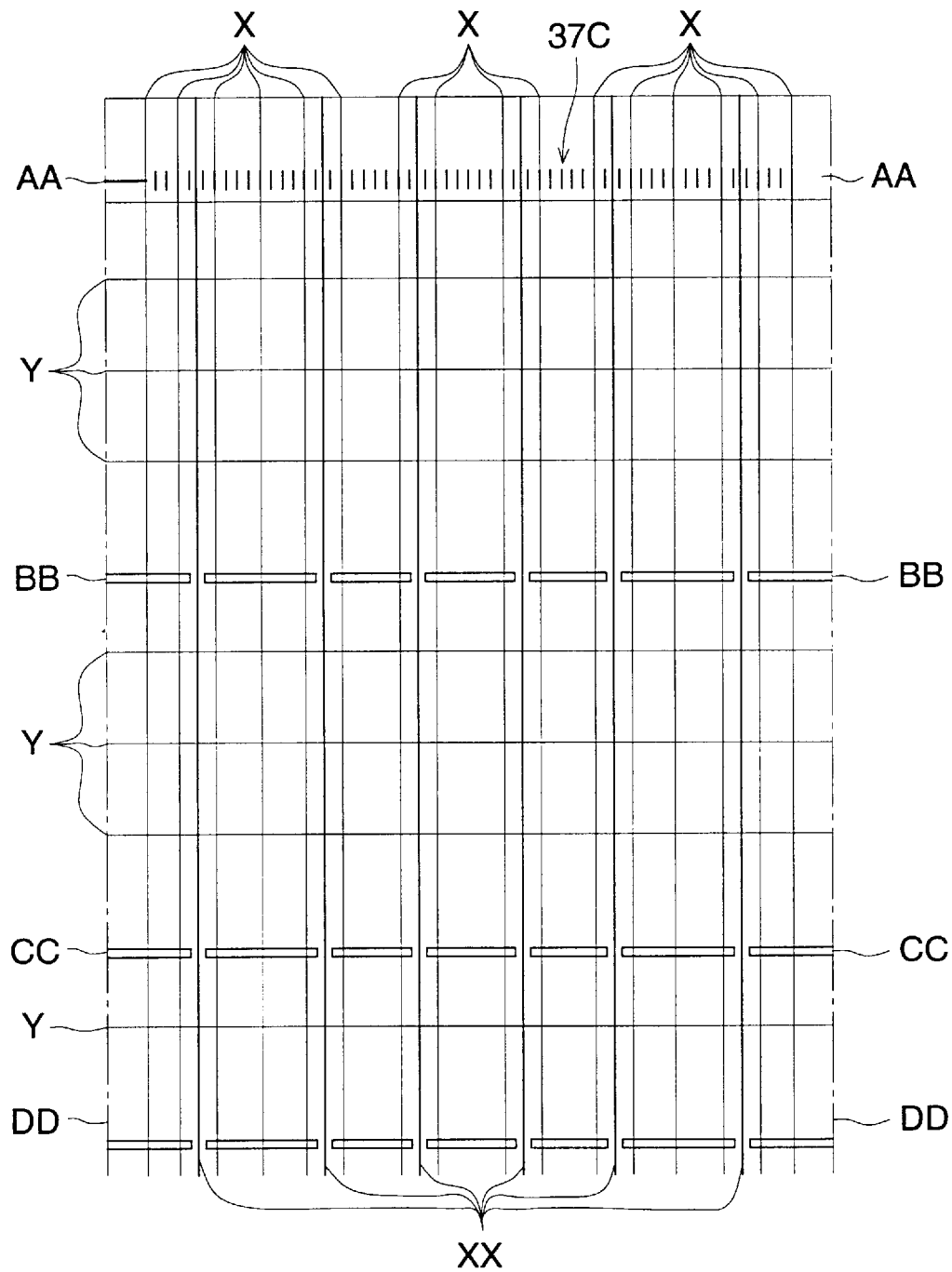
FIG. 53 is a development elevation view showing a circumferential surface of the drum.
Figure 54:
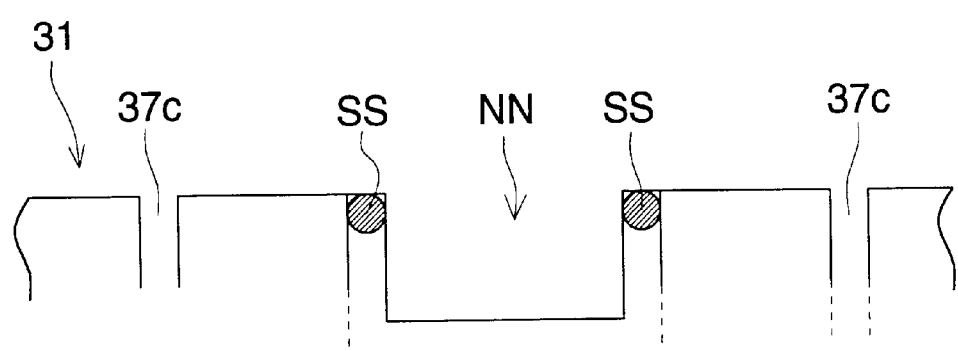
FIG. 54 is a cross sectional view showing a groove on the drum.

FIG. 51 is an illustration of rearrangement of image data on the disk. FIG. 44(*a*) shows how data of a single block are stored in random areas from 0 up to 9 on the storage hard disk. Input data are divided and stored in random areas from 0 up to 9 in the diagram. Therefore, when reading image data in image recording, it is necessary to read little by little after retrieving each position.

When writing and erasing are repeated under this condition, vacant areas each being small in size are distributed in a broad range on the storage medium. As a result, a distance of movement for a head to make physical access to the storage medium is very long, and delay of reading/writing time is caused.

Therefore, in the invention, there is given an instruction (SCSI command or the like) to directly control physical actions of the storage medium by skipping OS from the control means such as CPU on a universal computer, which makes it possible to write data on the storage medium in a manner which is almost continuous physically and to read almost continuously. FIG. 51(*b*) shows that vacant areas on the hard disk are put together, and image data are written continuously on the gathered area.

It is possible to realize the data reading speed of about 6–7 MB/sec·HD in the invention, while an average of the data reading speed through OS is 2–3 MB/sec·HD. Incidentally, the contents of the aforesaid instruction represent instruction information such as the starting position for writing and reading and writing/reading amount.

The starting position for writing does not always need to be the storage area starting position on the storage medium, and it may be determined in advance, or it may be an arbitrary storage position on the storage medium which is varied automatically in accordance with how the storage medium is used. In the halftone dot image recording apparatus 1 of a conventional system, recording on a photosensitive material is conducted while waiting the transmission of halftone dot data for output from a superordinate apparatus, and thereby, improvement in accuracy of the waiting mechanism has required complicated structure and high cost of the total system. However, due to realization of high speed R/W in the invention, the waiting structure is not needed and low cost of the total system can be realized.

In the present embodiment, as stated above, when reading halftone dot image data from halftone dot image data storing apparatus 500, reading processing which is almost continuous physically is possible, which makes the access time on the hard disk to be reduced greatly, and makes the speed of transmission to halftone dot image recording apparatus 1 (the speed of making a color proof) to be improved greatly. As a result, the data waiting mechanism which has been needed on halftone dot image recording apparatus 1 is not necessary and low cost of the total system can be realized.

(Data Rearrangement on the Halftone Dot Image Data Storing Apparatus)

Next, operations of data rearrangement will be explained, referring to the illustration of operations in FIG. 46 and a time chart in FIG. 47.

Image data representing multivalued gradation data subjected to editorial processing in an external image processing apparatus (not shown) are taken in halftone dot image data producing apparatus 200 ((1)). Incidentally, image data on which editorial processing has been conducted are in the state of description of page description languages of various types. These image data are subjected to processing for halftone dots by halftone dot image data producing apparatus 200, and pixels of halftone dot image data are produced. Further, in parallel with the processing for halftone dots, line control signals which are turned on for each line and page control signals which are turned on for each page are produced ((2)).

Then, the halftone dot image data producing apparatus 200 outputs halftone dot image data, line control signals and page control signals to halftone dot image data storing apparatus 500. Incidentally, with regard to this output, it is preferable that line control signals and page control signals are sent out in synchronization with the halftone dot image data. In this case, the halftone dot image data storing apparatus 500 stores halftone dot image data equivalent to one unit (halftone dot image data for one sheet for all colors necessary to make one sheet of color proof) ((3)).

CPU 501 of the halftone dot image data storing apparatus 500 counts the number of pixels of halftone dots for halftone dot image data sent from the halftone dot image data producing apparatus 200 ((4)). This count is conducted continuously for pixels of halftone dot image data for one line or one page, for example. In this case, it is possible to count the number of pixels equivalent to one line or one page, utilizing that halftone dot image data equivalent to one line or one page are sent from the halftone dot image data producing apparatus 200 almost continuously as shown in FIG. 47 (FIGS. 47(*b*) and (*d*)). Or, it is also possible to count pixels of halftone dots equivalent to one line or one page by utilizing line control signals or page control signals.

Further, the CPU 501 counts the number of lines (the number of dots in the sub-scanning direction) for line control signals sent from the halftone dot image data producing apparatus 200 ((5)). This count is conducted continuously for halftone dot image data equivalent to one page. In this case, it is possible to count line control signals equivalent to one page by utilizing that halftone dot image data equivalent to one page are sent from the halftone dot image data producing apparatus 200 almost continuously as shown in FIG. 47 (FIG. 47) (*b*)). Or, it is also possible to count line control signals equivalent to one page by utilizing page control signals.

Incidentally, in the example shown in FIG. 47, page control signals (FIG. 47(*a*)) are made to be active (to be H level in this case) under the state of synchronization with transmission of halftone dot image data from the halftone dot image data producing apparatus 200. Further, line control signals (FIG. 47(*b*)) are made to be active (to be H level in this case) under the state of synchronization with transmission of halftone dot image data equivalent to one line from the halftone dot image data producing apparatus 200. Incidentally, when one line of line control signals is enlarged to be shown (FIG. 47(*c*)), halftone dot image data DB are transmitted during the period of line control signals at H level (FIG. 47(*d*)).

In the example shown in FIG. 47, there is shown an illustration wherein halftone dot image data of y dots in the main scanning direction are arranged to be in quantity equivalent to x lines in the sub-scanning direction.

CPU 501 of the halftone dot image data storing apparatus 500 transmits the stored halftone dot image data, the counted value for the halftone dot image data and the counted value for line control signals to halftone dot image recording apparatus 1. Incidentally, when halftone dot image data are being produced by halftone dot image data producing apparatus 200, the halftone dot image data are outputted while they are stored in halftone dot image data storing apparatus 500. In this case, both line control signals and page control signals are also outputted as they are to halftone dot image recording apparatus 1.

After accumulating temporarily in the halftone dot image data storing apparatus 500, namely, in the case of the second output and thereafter, the stored halftone dot image data, the counted value for the halftone dot image data and the counted value for line control signals are outputted to halftone dot image recording apparatus 1.

Figure 46:
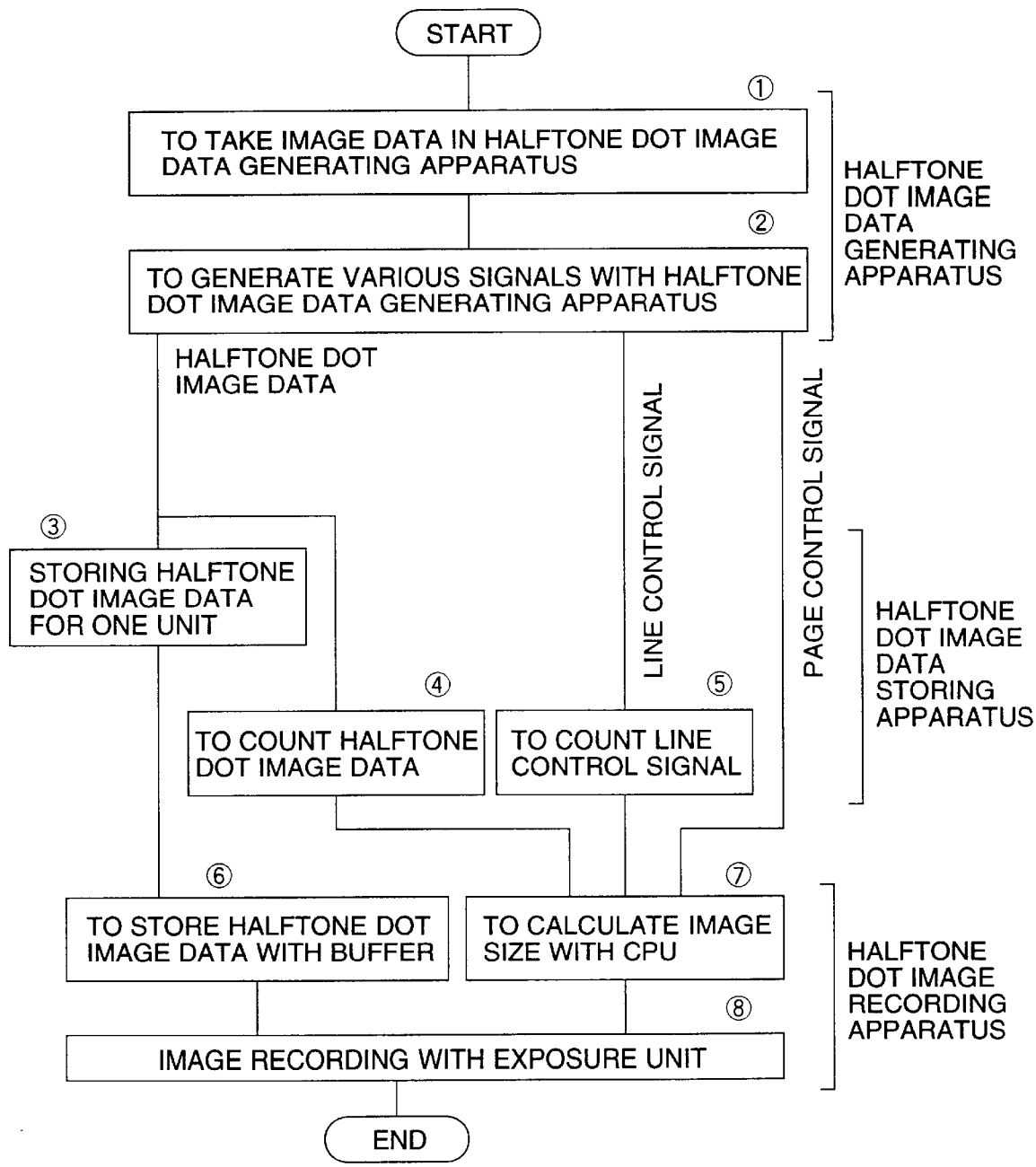
FIG. 46 is an illustration showing operations of data rearrangement.

In the halftone dot image recording apparatus 1, halftone dot image data from the halftone dot image data storing apparatus 500 are accumulated in buffer 204 (FIG. 46 (6)). Line control signals, page control signals, the counted value for halftone dot image data and the counted value for line control signals are received by CPU 100. In this case, when halftone dot image data are produced by halftone dot image data producing apparatus 200, and are outputted while they are stored in the halftone dot image data storing apparatus 500, CPU 100 controls image recording while determining image sizes in the main scanning direction and the sub-scanning direction by line control signals and page control signals.

When outputting after storing an amount equivalent to one page in the halftone dot image data storing apparatus 500, CPU 100 determines image sizes in the main scanning direction and the sub-scanning direction by the counted value for halftone dot image data and the counted value for line control signals (FIG. 46 (7)) and controls image recording (FIG. 46 (8)). Incidentally, in this case, it is possible for CPU 100 to conduct image recording at any position by comparing an image size with a recording medium size.

Due to the foregoing, following effects are obtained.

A size in the main scanning direction and that in the sub-scanning direction are determined by providing line control signals and page control signals. Therefore, the image size does not need to be detected at the halftone dot image data generating section, and image recording can be started simultaneously with the start of generation of halftone dot image data. As a result, preparation for transmission is simplified, and the total transmission time can be shortened.

By counting halftone dot image data and line control signals in the course of transmission of the halftone dot image data, it is possible to obtain data of image size necessary for the second image recording and thereafter in the course of the aforesaid first image recording.

Since an image size is obtained from the counted value for halftone dot image data and the counted value for line control signals in the second image recording and thereafter, it is possible to execute image recording by the use of the stored halftone dot image data.

Since the counting which is necessary for determination of an image size is conducted while halftone dot image data are transmitted from halftone dot image data producing apparatus 200, it is not necessary to provide a means (notification circuit, notification signal line) to notify the image size to halftone dot image recording apparatus 1 from halftone dot image data producing apparatus 200.

Even in the case where the number of screen lines in halftone dot image data producing apparatus 200 is changed, it is possible to know the accurate image size in halftone dot image recording apparatus 1, because data relating to the image size are obtained during transmission of halftone dot image data.

Incidentally, in the embodiment stated above, counting of pixels equivalent to one line and counting of the number of lines are conducted by CPU 501 of halftone dot image data storing apparatus 500, and an image size is determined by the CPU 501 based on the both counted values. In addition to this, the total number of pixels of halftone dot image data equivalent to one page can be counted by the CPU 501 of halftone dot image data storing apparatus 500. In that case, it is possible to obtain the number of pixels in one line when the total number of pixels is divided by the number of dots in the sub-scanning direction in CPU 501, and thereby to obtain the image size in the same way.

Though there is shown an occasion where page control signals are used in the explanation stated above, it is also possible to obtain the same effect by judging the change of page through the usage of the prescribed time generated at an end of each page in line control signals, without using page control signals. Therefore, when page control signals are not used, it is not necessary for halftone dot image data producing apparatus 200 to generate page control signals, which simplifies the constitution.

Next, photosensitive materials for use in the present apparatus will be described below. Preferably employed as photosensitive materials for use in the present invention are silver halide photosensitive photographic materials, however, the present invention is not limited to these.

Listed as silver halide emulsions for such silver halide photosensitive photographic materials may be a surface sensitive type silver halide emulsion which results in formation of a surface latent image, through image exposure, or an internal latent image forming emulsion such that employing an internal latent image forming silver halide emulsion in which the surface of grains is not prefogged, after image exposure, a direct positive image can be obtained by fogging development (nucleated development) followed by surface development, or an internal latent image forming emulsion such that after image exposure, a direct positive image can be obtained through surface development while carrying out fogging development. Further, the internal latent image forming emulsion described herein denotes an emulsion containing silver halide grains which have sensitivity specks primarily in the interior of crystal grains and thereby form a latent image in the interior of grains, after exposure.

One of preferred embodiments of silver halide photosensitive materials is a negative-working silver halide emulsion, and in particular, a silver halide emulsion, in which at least 90 mole percent is composed of silver chloride, is preferably employed. If the emulsion meets this criteron, it may have optional silver halide composition such as silver chloride, silver chlorobromide, silver chloroiodobromide, silver chloroiodide, and the like. However, silver halide emulsion comprising silver chlorobromide containing at least 95 mole percent of silver chloride, and of this a portion containing silver bromide at a high concentration is preferably employed. Furthermore, silver chloroiodide containing 0.05 to 0.5 mole percent of silver iodide near the surface is preferably employed. In a silver halide emulsion having a portion in which the concentration of silver bromide is high, said portion is commonly called a core/shell emulsion. A region of so-called epitaxy connection may be formed in which a perfect layer is not formed and regions simply having partially different compositions are present. The portion in which the concentration of silver bromide is high is most preferably formed on the apex of the crystal grain on the surface of silver halide grains. Furthermore, the composition may vary continuously or discontinuously.

Furthermore, heavy metal ions are advantageously incorporated into the negative-working silver halide emulsion composed of at least 90 mole percent of silver chloride which is preferably employed. By so doing, it is expected that the so-called reciprocity law failure is improved so that desensitization at high intensity exposure is minimized and a decrease in contrast at shadow portions is minimized. Heavy metal ions which may be employed to accomplish such objectives include each ion of metals in Groups 8 through 10, such as iron, iridium, platinum, palladium, nickel, rhodium, osmium, ruthenium, cobalt, and the like; ions of metals in Group 12 such as cadmium, zinc, mercury, and the like; as well as ions of lead, rhenium, molybdenum, tungsten, gallium, osmium, and chromium. Of these, metal ions of iron, iridium, platinum, ruthenium, gallium, and osmium are preferred. These metal ions may be added to a silver halide emulsion in the form of salts or of complexes. When heavy metal ions form complexes, preferred ligands are cyanide ions, thiocyanate ions, cyanate ions, chloride ions, bromide ions, iodide ions, carbonyl, ammonia, and the like. Of these, preferred are cyanide ions, thiocyanate ions, isothiocyanate ions, chloride ions, bromide ions, and the like. In order to incorporate heavy metal ions into a silver halide emulsion, a corresponding heavy metal compound may be added at an optional time before formation of the silver halide grains, during the formation of silver halide grains, or during each process of physical ripening after the formation of silver halide grains. In order to obtain the silver halide emulsion which satisfies the above-mentioned conditions, a heavy metal compound together with halide salts is dissolved and may be continually added over all or during a partial period of the grain forming process. Alternatively, fine silver halide grains containing these heavy metal compounds may be previously formed and an emulsion may be prepared by adding said grains. The added amount of heavy metal ions in a silver halide emulsion is preferably between $1\times10^{-9}$ and $1\times10^{-2}$ mole per mole of silver halide, and is more preferably between $1\times10^{-8}$ and $5\times10^{-5}$ mole.

Further, one preferred type of silver halide emulsion is an unprefogged internal latent image forming silver halide emulsion, and the internal latent image forming silver halide grains are those which have the most sensitivity specks in the interior of grains which are characterized in that a latent image is formed primarily in the interior of said grains. Compositions of silver halide grains include optional silver halides such as, for example, silver bromide, silver chloride, silver chlorobromide, silver chloroiodide, silver iodobromide, silver iodobromide, and the like.

A part of a sample, prepared by coating an emulsion onto a transparent support to obtain a coated silver amount of 1 to 3.5 g/m², is exposed employing light intensity scale exposure over a predetermined period from about 0.1 to about 1 second, and is developed at 20° C. for 4 minutes employing the Surface Developer A described below, which contains substantially no silver halide solvent and develops only the surface, and the maximum density is recorded. The other part of the same sample is exposed in the same manner as above, and is developed at 20° C. for 4 minutes employing the Inner Developer B, described below, which develops the image in the interior of said grains, and the maximum density is recorded. A particularly preferred emulsion is the one which results in the maximum density which is not more than ⅕ of the maximum density obtained by the Inner Developer B. More preferably, the maximum density obtained by the Surface Developer A is no more than ⅒ of the maximum density obtained by the Inner Developer B.

| (Surface Developer A) | |
| --- | --- |
| Metol | 2.5 g |
| L-Ascorbic acid | 10.0 g |
| Sodium metaborate (tetrahydrate) | 35.0 g |
| Potassium bromide | 1.0 g |
| Water to make | 1000 cc |
| (Inner Developer B) | |
| Metol | 2.0 g |
| Sodium sulfite (anhydride) | 90.0 g |
| Hydroquinone | 8.0 g |
| Sodium carbonate (monohydrate) | 52.5 g |
| Potassium bromide | 5.0 g |
| Potassium iodide | 0.5 g |
| Water to make | 1000 cc |

Further, the internal latent image forming silver halide emulsions preferably employed include those prepared by various methods. For example, there are a converted-halide sliver halide emulsion described in U.S. Pat. No. 2,592,250; a silver halide emulsion comprising silver halide grains subjected to internal chemical sensitization described in U.S. Pat. Nos. 3,206,316, 3,317,322 and 3,367,778; or an emulsion having silver halide grains comprising multivalent metal ions described in U.S. Pat. No. 3,271,157; a silver halide emulsion in which the grain surface of silver halide grains containing a dopant is subjected to weak chemical sensitization described in U.S. Pat. No. 3,761,276; a silver halide emulsion comprised of grains having a laminated structure described in Japanese Patent Publication Open to Public Inspection Nos. 50-8524, 50-38525, 53-2408, and the like; and the like such as silver halide emulsion described in Japanese Patent Publication Open to Public Inspection Nos. 52-156614, 55-127549.

The unfogged internal latent image forming silver halide emulsion as described above results in positive images through a surface fogging process without carrying out a reversal process. Said fogging process may be carried out employing overall exposure, may be chemically carried out employing a nucleating agent, may be carried out employing a highly active developer, or employing a further thermal process, and the like.

Said overall exposure is carried out in such a manner that a photosensitive material is exposed imagewise and is then immersed in a developer or another aqueous solution, or it is damped and is then subjected to uniform overall exposure. Employed as light sources used herein may be any of those which emit light having a wavelength region covering the spectral sensitivity of the above-mentioned photosensitive photographic materials. Further, high intensity light such as flash light may be exposed over a short period of time, or low intensity light may be exposed over a longer period of time. Further, the time of said overall exposure may vary widely depending on the above-mentioned photosensitive photographic materials, on the development process conditions, and on types of employed light sources so that the best positive images are ultimately obtained. Furthermore, regarding the said overall exposure amount, it is most preferred that the exposure amount within a predetermined range is given which corresponds to the combination with a photosensitive material. Generally speaking, when excessively exposed, an increase in minimum density or desensitization is caused and the image quality tends to deteriorate.

Further, preferably employed as the technique of nucleating agents employable in silver halide photosensitive photographic materials is the one described in Japanese Patent Publication Open to Public Inspection No. 6-95283 from the 39th line in the right column on page 18 to the 42nd line in the left column on page 19.

Optional shapes of silver halide grains may also be employed. One of these preferred is a cube having a (100) plain as the crystal surface. Further, grains in the shape of octahedron, tetradecahedron, dodecahedron, and the like may also be prepared by methods and the like, described in publications such as U.S. Pat. Nos. 4,183,756 and 4,225,666; Japanese Patent Publication Open to Public Inspection No. 55-26569; Japanese Patent Publication No. 55-42737, and Journal of Photographic Science, 21, 39 (1973), and the like, and employed. Furthermore, grains having a twin surface may also be employed.

Still further, silver halide grains comprised of monodispersed grains are preferably employed. However, it is particularly preferred to add at least two types of monodisperse silver halide emulsions to the same layer.

The diameter of silver halide grains is not particularly limited. However, the diameter is preferably between 0.1 and 1.2 µm in view of rapid processability, sensitivity, and other photographic properties, and is more preferably between 0.2 and 1.0 µm.

Such a grain diameter can be calculated employing the projection area of grains or the approximate value. When grains are substantially uniform shape, the fairly accurate grain size distribution may be expressed in terms of the diameter or projection area.

Preferred silver halide grains are those having a variation coefficient of a grain diameter distribution of no more than 0.22, and more preferred ones are monodispersed silver halide grains having the variation coefficient of no more than 0.15, and most preferably, are two types of monodisperse emulsions having a variation coefficient of no more than 0.15, are added to the same layer. The variation coefficient as described herein is a coefficient expressing the breadth of the grain diameter distribution, and is defined by the following formula:

Variation coefficient=$S/R$ wherein S represents standard deviation of the grain diameter distribution, and R represents the average grain diameter.

Employed as apparatuses and methods to produce silver halide emulsions can be those known in the art of this industry.

Silver halide emulsions may be prepared employing either an acid method, a neutral method, or an ammonia method. Said grains may be subjected to growth in one time or to growth employing seed grains. A method to prepare the seed grains and a method to allow grains to grow may be the same or different.

Furthermore, any of several methods may be employed to react water-soluble silver salts with water-soluble halides such as a normal mixing method, a reverse mixing method, a double-jet method, combinations thereof, and the like. However, the double-jet method is preferably employed. Employed as one type said double-jet method may be the controlled double-jet method described in Japanese Patent Publication Open to Public Inspection No. 54-48521, and the like.

Further, employed may be an apparatus described in Japanese Patent Publication Open to Public Inspection Nos. 57-92523, 57-92524, and the like, which supplies an aqueous water-soluble silver salt solution and an aqueous water-soluble halide solution from an addition apparatus arranged in a reaction mother solution; an apparatus described in German Patent Publication Open to Public Inspection No. 2921164 and the like which continually adds an aqueous water-soluble silver salt solution and an aqueous water-soluble halide solution while varying the concentration; an apparatus described in Japanese Patent Publication No. 56-501776, and the like, which places a reaction mother solution in the exterior of the reaction vessel and through concentrating it employing an ultrafiltration method, allows grains to form while maintaining the specified distance between silver halide grains.

If further required, silver halide solvents such as thioether and the like may be employed. Also, added and employed may be compounds having a mercapto group, nitrogen-containing heterocyclic compounds, or compounds like sensitizing dyes, added during formation of the silver halide is grains, or after completing of grain formation.

Applied to the preferably employed negative-working silver halide emulsion comprised of at least 90 mole percent a silver chloride may be a combination of a sensitization method employing gold compounds with a sensitization method employing chalcogen sensitizers. Employed as chalcogen sensitizers may be a sulfur sensitizer, a selenium sensitizer, a tellurium sensitizer, and the like, however, the sulfur sensitizers are preferred. Listed as sulfur sensitizers are thiosulfates, allylthiocarbamidothiourea, allylisothiocyanate, cystine, p-toluenethiosulfonate, rhodanine, inorganic sulfur, and the like.

The added amount of sulfur sensitizers preferably varies depending on the types of applied silver halide emulsions, the degree of expected sensitization, and the like, is in the range of $5\times10^{-10}$ to $5\times10^{-5}$ mole per mole of silver halide, and is preferably in the range of $5\times10^{-8}$ to $3\times10^{-5}$ mole.

Added as gold sensitizers may be various types of gold complexes in addition to chloroauric acid, gold sulfides, and the like. Listed as employed ligand compounds may be dimethylrhodanine, thiocyanic acid, mercaptotetrazole, mercaptotriazole, and the like. The employed amount of gold compounds varies depending on the types of silver halide emulsions, the types of employed compounds, ripening conditions, and the like, however it is preferably between $1\times10^{-4}$ and $1\times10^{-8}$ mole per mole of silver halide, and is more preferably between $1\times10^{-5}$ and $1\times10^{-8}$ mole.

Reduction sensitizing method may be employed as chemical sensitizing methods for preferably employed negative-working silver halide emulsions comprised of at least 90 mole percent of silver chloride.

In order to minimize formation of fog caused during the preparation of a silver halide photosensitive material, to minimize variation in performances during storage, and to minimize formation of fog caused during development, antifoggants and stabilizers known in the art may be incorporated into a silver halide emulsion. Listed as examples of preferred compounds which cn be employed to achieve these objects are compounds represented by general formula (II) described in the lower column on page 7 of Japanese Patent Publication Open to Public Inspection No. 2-146036, and listed as more preferable specific compounds are compounds represented by general formulas (IIa-1) through (IIa-8), (IIb-1) through (IIb-7), and 1-(3-methoxyphenyl)-5-mercaptotetrazole, 1-(4-ethoxyphenyl)-5-mercaptotetrazole, 1-(3-phenylacetamidophenyl)-5-mercaptotetrazole, and the like, which are described on page 8 of the same patent publication. Furthermore, tetraazaindene based compounds are preferably employed in emulsions having a high silver bromide content. In response to each purpose, these compounds are added during processes such as the preparation of silver halide grains, chemical sensitization, at the completion of chemical sensitization, or during a process for preparing a coating solution. When chemical sensitization is carried out in the presence of these compounds, they are preferably added in an amount of about $1\times10^{-5}$ to about $5\times10^{-4}$ mole per mole of silver halide. When added at the completion of chemical sensitization, the added amount is preferably between about $1\times10^{-6}$ and about $1\times10^{-2}$ mole per mole of silver halide, and is more preferably between $1\times10^{-5}$ and $5\times10^{-3}$ mole. When added to a layer other than the silver halide emulsion layer, the amount in the coated layer is preferably between $1\times10^{-6}$ and $1\times10^{-1}$ per $m^2$.

With the purposes of minimizing irradiation as well as halation, dyes exhibiting absorption at various wavelengths may be employed in silver halide photosensitive photographic materials. To achieve these purposes, any appropriate compound known in the art may be employed. Preferably employed as dyes particularly those exhibiting absorption in the visible region, may be dyes of AI-1 through 11 described on page 308 of Japanese Patent Publication Open to Public Inspection No. 3-251840, and dyes described in Japanese Patent Publication Open to Public Inspection No. 6-3770. As infrared light absorbing dyes, are the preferable compounds represented by general formulas (I), (II), and (III) in the left column on page 2 of Japanese Patent Publication Open to Public Inspection No. 1-280750, which have preferable absorption characteristics, exhibit no adverse effect for photographic characteristics of silver halide photographic emulsions, and results in no staining due to residual color. Listed as specific examples of these generally preferred compounds can be exemplified compounds (1) through (45) in the left column on page 5 of the same patent publication.

As inorganic compounds, colloidal silver, colloidal manganese, and the like are appropriate, and the colloidal silver is particularly preferred. These colloidal metals are effective for the silver halide photosensitive material employed in the present invention because they are decolorized in the processing solutions. The employed amount of the colloidal silver varies depending on the silver shapes and purposes, however, it is preferably between 0.01 and 0.3 g/m$^2$, and is more preferably between 0.02 and 0.1 g/m$^2$. When the coated amount is excessive, one problem which occurs is that the white background becomes yellowish. From the viewpoint of the reproduction of whiteness, the employed amount of yellow colloid as well as black colloid is preferably minimal, while no addition is more preferable.

The above-mentioned colloidal silver, such as for example, gray colloidal silver is obtained in such a manner that silver nitrate in a gelatin solution is reduced by a reducing agent such as hydroquinone, phenidone, ascorbic acid, pyrogallol, or dextrin, while maintaining an alkaline condition, thereafter, neutralized and cooled so as to gel the resulting gelatin solution, and the reducing agent and unnecessary salts are removed employing a noodle wash method. When reduction is carried out in the presence of an azaindene compound or a mercapto compound under an alkaline condition, it is possible to obtain a colloidal silver dispersion comprised of uniform grains.

A silver halide photosensitive photographic material preferably comprises at least one colored hydrophilic colloid layer nearer the support than a silver halide emulsion layer which is nearest the support among silver halide emulsion layers, and said layer may comprise a white pigment. For example, employed can be rutile-type titanium dioxide, anatase-type titanium dioxide, barium sulfate, barium stearate, silica, alumina, zirconium oxide, kaolin, and the like. However, owing to various reasons, titanium dioxide is preferred. The white pigments are dispersed into a hydrophilic colloid solution comprising a binder such as, for example, gelatin and the like. The coated amount of white pigments is preferably in the range of 0.1 to 50 g/m$^2$, and is more preferably in the range of 0.2 to 5 g/m$^2$.

The average primary particle diameter of white pigments is preferably between 0.30 and 3.0 $\mu$m, and is more preferably between 0.32 and 1.0 $\mu$m. The primary particle diameter as described herein is obtained in such a manner that a group of white pigment particles are observed employing an electron microscope and the average diameter is obtained as the cube root of the particle volume so that the product of the grain volume by the frequency is maximized.

Such white pigments may be employed individually or in combination of a plurality of different ones. When a plurality of white pigments having different average particle diameters are employed in combination, acceptable average primary particle diameter of mixed particles is at least 0.30 $\mu$m. or prior to mixing, if the average primary particle diameter of either of pigments is at least 0.30 $\mu$m, they may be employed upon mixing. With the intent of enhancing sharpness, light absorbing materials, for example, colloidal silver, water-soluble dyes, solid dye dispersions, and the like, which minimize halation due to a support or white pigments, are preferably incorporated into the hydrophilic colloid layer comprising said white pigments.

In addition to the white pigment containing layer, if desired, provided may be a non-photosensitive hydrophilic colloid layer such as a sublayer between the silver halide emulsion layers nearest the support, or an interlayer at an optional position, and the like.

Fluorescent whitening agents are preferably incorporated into silver halide photosensitive photographic materials to further enhance whiteness. The fluorescent whitening agents are not particularly limited, as long as they emit visible light after absorbing ultraviolet rays. Preferred embodiments are compounds having at least one sulfonic acid group in the molecule and anther preferred embodiment is fine solid particles having a fluorescent whitening effect.

Listed as the preferred compounds among those having a sulfonic acid group in the molecule may be diaminostilbene based fluorescent whitening agents having at least four sulfonic acid groups in one molecule, that is, compounds represented by general formula II described in the upper right column on page 5 of Japanese Patent Publication Open to Public Inspection No. 4-1633. Listed as specific examples of such fluorescent whitening agents can be compounds 1 through 23 described in the lower right column on page 5 to the upper left column on page 7 of Japanese Patent Publication Open to Public Inspection No. 4-1633. Such fluorescent whitening agents may be incorporated into any of the silver halide emulsion layers and non-photosensitive layers, but are preferably incorporated into the non-photosensitive layer. The added amount of fluorescent whitening agents is preferably between 0.01 and 2 g/m$^2$, and is more preferably between 0.02 and 1 g/m$^2$.

Fine solid particle compounds are those which are substantially insoluble in water and exhibit a fluorescent whitening effect. Any kind of compounds may be employed if they are substantially insoluble in water and exhibit a fluorescent whitening effect at room temperature. Being substantially insoluble in water as described herein means that the solubility is no more tan 1.0 g per 100 g of deionized water at 25° C.

Employed as substantially water-insoluble compounds which exhibit a fluorescent whitening effect may be common fluorescent whitening agents which are insoluble in water.

Various sensitizing dyes known in the art are incorporated into silver halide photosensitive photographic materials so as to make them sensitive to light of various wavelengths. Preferably employed, individually or in combination, as blue-sensitive sensitizing dyes for such a purpose may be BS-1 through 8 described on page 28 of Japanese Patent Publication Open to Public Inspection No. 3-251840. Furthermore, when image exposure is carried out by infrared light employing a laser beam generated by a semiconductor, it is required to employ infrared-sensitive sensitizing dyes. Preferably employed as infrared-sensitive sensitizing dyes are dyes IRS-1 through 11 described on pages 6 to 8 of Japanese Patent Publication Open to Public Inspection No. 4-285950. In addition, these infrared-, red-, green-, and blue-sensitive sensitizing dyes are preferably employed in combination with supersensitizers SS-1 through SS-9 described on pages 8 and 9 of Japanese Patent Publication Open to Public Inspection No. 4-285950 and also with compounds S-1 through S-17 described on pages 15 to 17 of Japanese Patent Publication Open to Public Inspection No. 5-66515.

These sensitizing dyes may be added at any optional time, from the formation of silver halide grains to the completion of chemical sensitization.

Sensitizing dyes may be added in the form of a solution prepared by dissolving them in water-miscible organic solvents such as methanol, ethanol, fluorinated alcohol, acetone, dimethylformamide, and the like, as well as water, or in the form of a solid dispersion.

A silver halide emulsion may comprise one type of a sensitizing dye or at least two types of sensitizing dyes in combination.

Employed as couplers used for silver halide photosensitive photographic materials are any compounds which can form coupling products having a maximum spectral absorption wavelength in regions no shorter than 340 nm. However, as representative couplers are those which are known as yellow dye forming couplers having a maximum spectral absorption in the wavelength region of 350 to 500 nm, magenta dye forming couplers having a maximum spectral absorption wavelength in the region of 500 to 600 nm, and cyan dye forming couplers having a maximum spectral absorption wavelength in the region of 600 to 750 nm.

As magenta couplers employed in silver halide photosensitive photographic materials, preferably are compounds represented by general formula [M-1], cited in the right column on page 7 of Japanese Patent Publication Open to Public Inspection No. 6-95283, which form dyes exhibiting good spectral absorption characteristics. Listed as specific examples of said preferred compounds are compounds M-1 through M-19 described on pages 8 to 11 of the same patent publication. Further, listed as other specific examples are compounds M-1 through M-61 described on pages 6 to 21 of European Patent Publication for Public Inspection No. 0273712, and compounds 1 through 223 described on pages 36 to 92 of European Patent Publication for Public Inspection No. 0235913, which are not included in the above-mentioned specific examples.

Said magenta couplers may be employed in combination with other types of magenta couplers, may be employed generally in an amount of $1 \times 10^{-3}$ to 1 mole per mole of silver halide, and preferably in an amount of $1 \times 10^{-2}$ to $8 \times 10^{-1}$ mole.

The $\lambda_{max}$ of the spectral absorption of magenta images formed in a sliver halide photosensitive photographic material is preferably between 530 and 560 nm, and $\lambda_{L0.2}$ is preferably between 580 and 635 nm.

The $\lambda_{L0.2}$ and $\lambda_{max}$ in the spectral absorption of images formed in a silver halide photosensitive photographic material, as described herein, are values measured by the methods described below.

(Measurement Method of $\lambda_{L0.2}$ and $\lambda_{max}$)

When a positive-working emulsion is employed in a silver halide photosensitive photographic material, a silver halide photosensitive color photographic material is uniformly exposed with a minimum amount of red light to obtain a minimum density of a cyan image, and is also uniformly exposed employing a minimum amount of blue light to obtain a minimum density of a yellow image. Thereafter, it is exposed employing a white light through an ND filter and then developed. At that time, a magenta image is prepared while adjusting the density of the ND filter so that when the spectral absorption of 500 to 700 nm is measured by a spectrophotometer attached with a integration sphere, while carrying out zero adjustment employing a magnesium oxide standard white plate, the maximum value of absorbance reaches 1.0. Furthermore, with said photosensitive material in which a negative-working emulsion is employed, when a magenta image is formed by exposing said photosensitive material to green light through the ND filter, and developing the exposed material, the density of the ND filter is adjusted so that the maximum absorbance is obtained, which is the same as the above-mentioned positive-working emulsion. The $\lambda_{L0.2}$ as described herein refers to a longer wavelength than that at which the maximum absorbance is 1.0 in the spectral absorbance graph of this magenta image and at which the absorbance is 0.2.

Preferably incorporated into the magenta image forming layer in a silver halide photosensitive photographic material, is a yellow coupler in addition to a magenta coupler. The pKa difference between these couplers is preferably within 2, and is more preferably within 1.5. The preferred yellow couplers which are incorporated into the magenta image forming layer of the present invention are those represented by general formula [Y-1a] described in the right column on page 12 of Japanese Patent Publication Open to Public Inspection No. 6-95283. Of couplers represented by general formula [M-1] described in the same patent publication, those which are particularly preferred, when employed in combination with magenta couplers represented by the general formula [M-1], are ones having a pKa which in not lower at least 3 than that a coupler represented by the general formula [M-1] in combination.

Preferably employed as specific example of compounds employed as said yellow couplers are those compounds such as Y-1, Y-2, and the like, described on pages 12 and 13 in Japanese Patent Publication Open to Public Inspection No. 6-95283, as well as compounds (Y-1) through (Y-58) described on pages 13 to 17 in Japanese Patent Publication Open to Public Inspection No. 2-139542, however, the present invention is not limited to these examples.

Employed as cyan couplers which are incorporated into a cyan image forming layer in a silver halide photosensitive photographic material may be phenol based, naphthol based, or imidazole based couplers known in the art. For example, representative couplers include phenol based couplers substituted with an alkyl group, an acylamino group, a ureido group, or the like, naphthol based couplers composed of a 5-aminonaphthol skeleton, two equivalent naphthol based couplers into which an oxygen atom is substituted as a split-off group. Of these, cited as preferred compounds are compounds represented by general formula [C-I] and [C-II] described on page 13 of Japanese Patent Publication Open to Public Inspection No. 6-95283.

In silver halide emulsions, said cyan couplers may be employed generally in an amount of $1 \times 10^{-2}$ to 1 mole per mole of silver halide, and preferably in an amount of $1 \times 10^{-2}$ to $8 \times 10^{-1}$ mole.

Preferably employed as yellow couplers which are incorporated into a yellow image forming layer in a silver halide photosensitive photographic material may be acylacetanilide based couplers and the like, commonly known in the art.

Listed as specific examples of said yellow couplers which are preferably employed may be, for example, compounds Y-I-1 through Y-I-55 described on pages 5 to 9 of Japanese Patent Publication Open to Public Inspection No. 3-241345, or compounds Y-1 through Y-30 described on pages 11 to 14 of Japanese Patent Publication Open to Public Inspection No. 3-209466. Further, listed may be couplers represented by general formula (Y-1) described on page 21 of Japanese Patent Publication Open to Public Inspection No. 6-95283.

The $\lambda_{max}$ of the spectral absorption of the yellow image formed by a silver halide photosensitive photographic material is preferably at least 425 nm, and the $\lambda_{L0.2}$ is preferably no longer than 515 nm.

The $\lambda_{L0.2}$ of the spectral absorption of said yellow image as described herein is a value defined based on the content described from the 1st line to the 24th line in the right column on page 21 of Japanese Patent Publication Open to Public Inspection No. 6-95283, and represents the magnitude of the unwanted absorption in the longer wavelength region in the spectral absorption characteristics of a yellow dye image.

In a silver halide emulsion layer, said yellow couplers may be generally employed in an amount of $1 \times 10^{-3}$ to 1 mole per mole of silver halide, and preferably in an amount of $1 \times 10^{-2}$ to $8 \times 10^{-1}$ mole.

In order to adjust spectral absorption characteristics of said magenta, cyan, and yellow images, compounds which exhibit color correcting functions are preferably incorporated. Preferred as such compounds are those represented by general formulas [HBS-I] and [HBS-II] described on page 22 of Japanese Patent Publication Open to Public Inspection No. 6-95283, and more preferred are those represented by general formula [HBS-II] described on page 22 of the same patent publication.

In silver halide photosensitive photographic materials, silver halide emulsion layers are subjected to multilayer coating, in which any coating order is permitted. In addition, interlayers, filter layers, protective layers, and the like, may be provided.

Each of the magenta, cyan, and yellow couplers may be employed in combination with anti-fading agents in order to minimize fading of formed dye images due to light, heat, moisture, and the like. Preferred are phenylether based compounds represented by general formulas I and II described on page 3 of Japanese Patent Publication Open to Public Inspection No. 2-66541; phenol based compounds represented by general formula IIIB described in Japanese Patent Publication Open to Public Inspection No. 3-174150; amine based compounds J represented by general formula A described in Japanese Patent Publication Open to Public Inspection No. 64-90445; and metal complexes represented by general formulas XII, XIII, XIV, and XV described in Japanese Patent Publication Open to Public Inspection No. 62-182741, which are particularly preferred for magenta dyes. Furthermore, preferred are compounds represented by general formula Ií described in Japanese Patent Publication Open to Public Inspection No. 1-196049 and compounds represented by general formula II described in Japanese Patent Publication Open to Public Inspection No. 5-11417, which are particularly preferred for yellow and cyan dyes.

When an oil-in-water type dispersion method is employed for incorporating couplers and other organic compounds into a silver halide photosensitive photographic material, such incorporation is carried out in such a manner that said couplers or compounds are dissolved in a water-insoluble high boiling point organic solvent, generally having a boiling point of at least 150° C., if desired, in combination with a low boiling point and/or water-soluble organic solvents, and the resulting solution is emulsify-dispersed into a hydrophilic binder such as an aqueous gelatin solution employing surface active agents. Employed as a dispersing means may be a stirrer, a homogenizer, a colloid mill, a flow jet mixer, an ultrasonic homogenizer, and the like. A process which removes low boiling point organic solvents after dispersion or during dispersion may be included. Preferably employed as high boiling point organic solvents which can be employed to dissolve and disperse couplers and the like are phthalic acid esters such as dioctyl phthalate, diisodecyl phthalate, dibutyl phthalate and the like; phosphoric acid esters such as tricresyl phosphate, trioctyl phosphate, and the like; and phosphine oxides such as trioctyl phosphine oxide and the like. Further, the dielectric constant of high boiling point organic solvents is preferably between 3.5 and 7.0. Two or more types of high boiling point organic solvents may be employed in combination.

Listed as preferred compounds as surface active agents which are employed for dispersing photographic additives employed in silver halide photosensitive photographic materials as well as for adjusting surface tension during coating are those which contain a hydrophobic group having from 8 to 30 carbon atoms per molecule, as well as a sulfonic acid group or salts thereof. Specifically listed are A-1 through A-11, described in Japanese Patent Publication Open to Public Inspection No. 64-268654. Further, surface active agents in which the alkyl group is substituted with fluorine atoms are preferably employed. These dispersions are generally added to a coating composition containing a silver halide emulsion. The shorter the time until being added to a coating composition after dispersion and until being coated after adding to the coating composition, the better; and each time is preferably within 10 hours, is more preferably within 3 hours and is most preferably within 20 minutes.

Compounds which react with oxidized developing agents are preferably incorporated into the layer between photosensitive layers in a silver halide photosensitive photographic material to minimize color contamination, and also into silver halide emulsion layers thereof to minimize fog. Compounds for these purposes are preferably hydroquinone derivatives, and are more preferably dialkylhydroquinones such as 2,5-di-t-octylhydroquinone. Particularly preferred compounds are those represented by general formula II described in Japanese Patent Publication Open to Public Inspection No. 4-133056, and specifically cited are compounds II-1 through II-14 described on pages 13 and 14, as well as compound I described in the same patent publication.

UV absorbers are preferably incorporated into a silver halide photosensitive photographic material to minimize static fog and to improve light fastness of dye images. Listed as preferred UV absorbers are benzotriazoles, and listed as particularly preferred compounds are compounds represented by general formula III-3 described in Japanese Patent Publication Open to Public Inspection No. 1-250944, compounds UV-1L through UV-27L described in Japanese Patent Publication Open to Public Inspection No. 63-187240, compounds represented by general formula I described in Japanese Patent Publication Open to Public Inspection No. 4-1633, and compounds represented by general formulas (I) and (II), described in Japanese Patent Publication Open to Public Inspection No. 5-165144.

Oil-soluble dyes and pigments are preferably incorporated into a silver halide photosensitive photographic material to enhance whiteness. Cited as specific representative examples of oil-soluble dyes are compounds 1 through 27, described on pages 8 and 9 of Japanese Patent Publication Open to Public Inspection No. 2-842.

Gelatin as a binder is advantageously incorporated into the silver halide photosensitive photographic material. Base on requirements, also employed may be other gelatin, gelatin derivatives, graft polymers of gelatin with another polymer, proteins besides gelatin, sugar derivatives, and hydrophilic colloid of synthetic hydrophilic high polymer materials such as individual or copolymers.

Preferably employed as hardeners for these binders are vinylsulfone type hardeners and chlorotriazine type hardeners individually or in combination. Preferably employed are compounds described in Japanese Patent Publication Open to Public Inspection Nos. 61-249054 and 61-245153. Furthermore, in order to minimize the propagation of mold and bacteria which may adversely affect photographic characteristics as well as image lasting quality, antiseptics and mildewcide as described in Japanese Patent Publication Open to Public Inspection No. 3-157646 are preferably incorporated into a colloid layer. Furthermore, in order to improve the surface physical properties of photosensitive materials or processed materials, friction decreasing agents and matting agents described in Japanese Patent Publication Open to Public Inspection Nos. 6-118543 and 2-73250 are preferably incorporated into the protective layer.

Usable as supports for photosensitive materials is any appropriate material and specifically employed may be polyethylene or polyethylene terephthalate laminated paper, paper supports comprised of natural pulp or synthetic pulp, vinyl chloride sheet, white pigment containing polypropylene, polyethylene terephthalate support, baryta paper, and the like. Of these, preferred are supports laminated with a water resistant resin layer on both sides. Preferred as water resistant resins are polyethylene and polyethylene terephthalate or copolymers thereof.

The employed support prepared by laminating paper with a water-resistant resin layer generally has a weight of 50 to 300 g/m² with a smooth surface. For the purpose of obtaining proof images, paper having a weight of no more than 130 g/m² is preferably employed so that it can be handled with the same feeling as print paper, and the paper having a weight of 70 to 120 g/m² is more preferably employed.

The support having a laminated water resistant resin layer on the surface of paper employed for photosensitive materials preferably has a Taber stiffness of 0.8 to 4.0. Taber stiffness is measured by a V-5 Model 150B Taber V-5 Stiffness Tester (TABER INSTRUMENT-A TELEDYNE COMPANY). Further, the stiffness in the longitudinal direction is generally different from that in the lateral direction, however, when the stiffness in either direction is within the above-mentioned range, the support is acceptable. When the Taber stiffness is no more than 0.8, practical problems may occur in which during continual processing, problems in transport and the like are likely to be caused in an automatic processor.

Preferably employed as supports which are employed for photosensitive materials may be those having an uneven surface or a smooth surface. The smooth surface preferably has no more than 2.9 μm which is obtained in such a manner that the unevenness of the support surface is continually measured, the measured signals are subjected to frequency analysis employing a high speed Fourier transformation, and the obtained power spectrum per spatial frequency is integrated in the range of 1 to 12.5 mm, and the obtained value is subjected to extraction of the square root (PY value). The PY value is more preferably no more than 1.8 μm, and is most preferably no more than 1.15 μm. The lowest limit of the PY value is 0.

The surface unevenness can be measured by a film thickness continual measurement meter (for example, a product manufactured by Anritsu Co.). The measured signals can be subjected to frequency analysis employing a frequency analysis apparatus (for example, VC-2403 manufactured by Hitachi Denshi Co.).

Employed as white pigments for use in supports may be inorganic and/or organic white pigments, but are preferably inorganic white pigments. For example, listed are sulfates of alkali earth metals such as barium sulfate and the like; carbonates of alkali earth metals such as calcium carbonate and the like; silicas such as fine silicic acid particles, synthetic silicates and the like; calcium silicate, alumina, alumina hydrates, titanium oxide, zinc oxide, talc, clay, and the like. The preferred white pigments are barium sulfate and titanium oxide.

The amount of white pigment contained in the water resistant resin layer on the surface of a support is preferably 13 percent by weight to improve sharpness, and is more preferably 15 percent by weight.

The dispersion degree of the white pigment in the water resistant resin layer on a paper support can be measured by a method described in Japanese Patent Publication Open to Public Inspection No. 2-28640. When measured using this method, the dispersion degree of the white pigment is to be no more than 0.20 as a variation coefficient described in the same patent publication, and is more preferably no more than 0.15.

The resin layer of the paper support having water resistant resin layers on both sides, which is employed for a photosensitive material, may be composed of one layer or a plurality of layers. When a plurality of layers are employed, sharpness is markedly improved by incorporating a white pigment in high concentration into the layer in contact with the emulsion layer and images for proof are preferably formed.

Furthermore, the value of the center surface average roughness of a support is preferably no more than 0.15 μm, and is more preferably no more than 0.12 μm because the glossiness improving effect is more realized.

After the surface of the support of a photosensitive material is subjected, if desired, to corona discharge, ultraviolet ray radiation, flame treatment, and the like, the resin layer may be applied directly onto the support or may be applied onto it via a sublayer (being one or at least two sublayers for improving the adhesion properties of the support surface, antistatic properties, dimensional stability, abrasion resistance, hardness, halation minimizing properties, friction properties and/or other properties).

During coating of a silver halide photosensitive photographic material, thickening agents may be employed to improve coating properties. As coating methods, extrusion coating and curtain coating are particularly advantageous because at least two types of layers can be simultaneously coated.

In the photographic processing of a silver halide photosensitive photographic material, preferred are those in which each process of color development, bleach-fixing, water washing or stabilizing is successively carried out, or each process of color development, bleaching, fixing, water washing or stabilizing is successively carried out. However, the present invention is not limited to these, and other processing methods may be employed.

Employed as primary aromatic amine developing agents used in such color development may be any of the several compounds known in the art. Cited as examples of these compounds may be those described below:

CD-1) N,N-diethyl-p-phenylenediamine
CD-2) 2-amino-5-diethylaminotoluene
CD-3) 2-amino-5-(N-ethyl-N-laurylamino)toluene
CD-4) 4-(N-ethyl-N-(β-hydroxyethyl)amino)aniline
CD-5) 2-methyl-4-(N-ethyl-N-(β-hydroxyethyl)amino) aniline
CD-6) 4-amino-3-methyl-N-ethyl-N-(β-(methanesulfonamido)ethyl)-aniline
CD-7) N-(2-amino-5-dietylaminophenylethyl) methanesulfonamido
CD-8) N,N-dimethyl-p-phenylenediamine
CD-9) 4-amino-3-methyl-N-ethyl-N-methoxyethylaniline
CD-10) 4-amino-3-methyl-N-ethyl-N-(β-ethoxyethyl) aniline
CD-11) 4-amino-3-methyl-N-ethyl-N-(γ-hydroxypropyl) aniline The above-mentioned color developers may be employed in an optional pH range, however, from the viewpoint of rapid processing, the color developer is preferably employed in the pH range of 9.5 to 13.0, and more preferably employed in the pH range of 9.8 to 12.0.

The processing temperature during color development is preferably between 35 and 70° C. As the temperature is raised, it is possible to shorten the processing time. However, from the viewpoint of the stability of the processing solution, the temperature is preferably not allowed to be at the higher limit, and thus, the processing is preferably carried out between 37 and 60° C.

Conventionally, color development time is usually about 3 minutes and 40 seconds. However, in the present invention, the color development time is preferably within 40 seconds, and is more preferably within 25 seconds.

Incorporated into the color developer may be known color developer component compounds in addition to the color developing agent. Generally employed are alkali agents exhibiting pH buffering action, development inhibitors such as chloride ions, benzotriazoles and the like, preserving agents, chelating agents, and the like.

After color development, silver halide photosensitive photographic materials are preferably subjected to a bleaching process and a fixing process. The bleaching process may be carried out at the same time as the fixing process. After the fixing process, generally, the water washing process is carried out. Furthermore, as an alternative to the water washing process, a stabilizing process may be carried out. Employed as development processing apparatuses which are employed to process silver halide photosensitive photographic materials may be either a roller transport type which transports photosensitive materials while placing them between rollers arranged in the processing tank, or it may be an endless belt system which holds photosensitive materials and transports them. In addition, employed may be a method in which a narrow slit-type processing tank is utilized and the photosensitive material is transported through said tank while the processing solution is supplied to said tank; a spray method in which a processing solution is supplied to a photosensitive material while being sprayed; a web method in which a photosensitive material is brought into contact with a member impregnated with a processing solution, a method employing a viscous processing solution; and the like. When processing a large amount of photosensitive materials, said materials are subjected to running processing, generally employing an automatic processor. At such time, the less the amount of replenisher used, the more preferred it is. From the viewpoint of the compatibility to the environment and the like, the most preferred processing embodiment is that as a replenishment method, processing agents are added in the form of tablets, and a method described in Kokai Gihou (Japanese Technical Disclosure) 94-16935 is most preferred.

EXPERIMENTAL EXAMPLES

Experimental Example 1

A silver halide photosensitive material was prepared employing an unfogged internal latent image forming-type direct positive silver halide emulsion.

<Preparation of Emulsion EM-P1>

Simultaneously added to an aqueous solution containing ossein gelatin, while kept at 40° C., were an aqueous solution containing ammonia as well as silver nitrate, and also an aqueous solution containing potassium bromide as well as sodium chloride (in a mole ratio of KBr:NaCl=95:5) employing a controlled double-jet method, by which a cubic silver chlorobromide core emulsion having a grain diameter of 0.30 μm was obtained. At the same time, the pH and pAg were controlled so that cubic grains were obtained as the particle shape.

Simultaneously added to the resulting core emulsion were an aqueous solution containing ammonia as well as silver nitrate, and an aqueous solution containing potassium bromide as well as sodium chloride (in a mole ratio of KBr:NaCl=40:60) employing a controlled double-jet method, so that a shell was formed having an average grain diameter of 0.42 μm. At the same time, the pH and pAg were controlled so that cubic grains were obtained as the particle shape.

After removing water-soluble salts employing water washing, gelatin was added to obtain EM-P1. The size diameter distribution width was 8 percent.

<Preparation of Emulsion EM-P2>

Simultaneously added to an aqueous solution containing ossein gelatin, while kept at 40° C., were an aqueous solution containing ammonia as well as silver nitrate, and an aqueous solution containing potassium bromide as well as sodium chloride (in mole ratio of KBr:NaCl=40:60) employing a controlled double-jet method, and cubic silver chlorobromide core emulsion having a grain diameter of 0.18 μm was obtained. At the same time, the pH and pAg were controlled so that cubic grains were obtained as the particle shape.

Further, simultaneously added to the resulting core emulsion were an aqueous solution containing ammonia as well as silver nitrate, and an aqueous solution containing potassium bromide as well as sodium chloride (in mole ratio of KBr:NaCl=40:60) employing a controlled double-jet method, and cubic silver chlorobromide core emulsion having a grain diameter of 0.18 μm was obtained. At the same time, the pH and pAg were controlled so that cubic grains were obtained as the particle shape.

After removing water-soluble salts employing water washing, gelatin was added to obtain EM-P2. The size diameter distribution width was 8 percent.

Emulsions EM-P1 and EM-P2 were coated onto a transparent cellulose triacetate support for a coated silver weight of 2 g/m², and part of the obtained samples was exposed for 0.5 second through an optical wedge and processed at 20° C. for 4 minutes employing Surface Developer A, while the other part of the samples was exposed in the same manner and processed at 20° C. for 4 minutes employing Inner Developer B. The maximum density obtained by the surface development was approximately $\frac{1}{12}$ of that obtained by the inner development. It was confirmed that both EM-P1 and EM-P2 were inner latent image-forming type silver halide emulsions.

<Preparation of Green-sensitive Silver Halide Emulsion>

After Emulsion EM-P1 was subjected to optimum spectral sensitization by the addition of Sensitizing Dye GS-1, green-sensitive Emulsion Em-G1 was prepared by the addition of T-1 (4-hydroxy-6-methyl-1,3, 3a,7-tetraazaindene).

<Preparation of Red-sensitive Silver Halide Emulsion>

Red-sensitive Emulsion Em-R1 was prepared in the same manner as green-sensitive Emulsion Em-G1, except that Emulsion EM-P2 was subjected to optimum spectral sensitization by the addition of Sensitizing Dye RS-1 and RS-2.

<Preparation of Infrared-sensitive Silver Halide Emulsion>

Infrared-sensitive Emulsion Em-IFR1 was prepared in the same manner as green-sensitive Emulsion Em-G1, except that Emulsion EM-P2 was subjected to optimum spectral sensitization by the addition of Sensitizing Dyes IRS-1 and IRS-2.

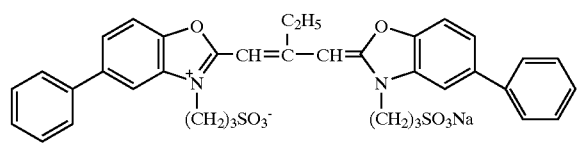

GS-1

-continued

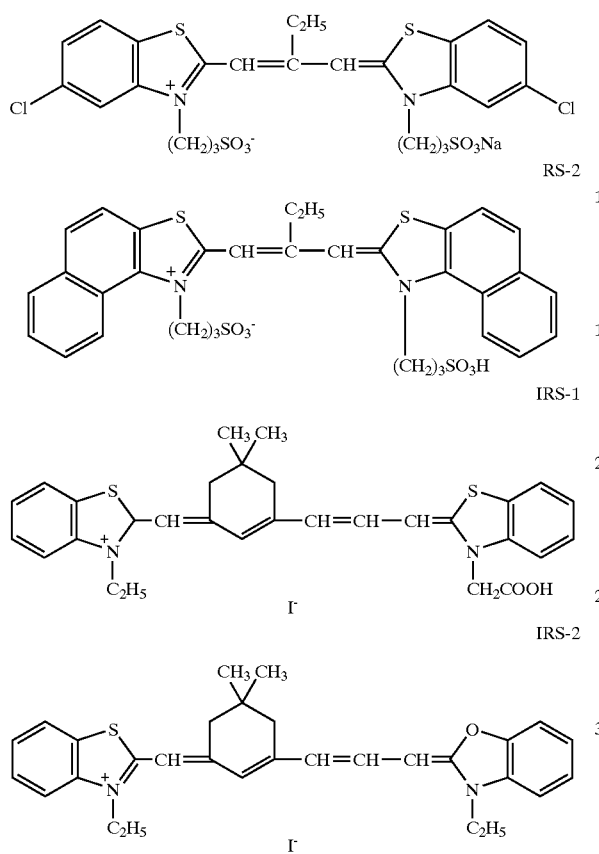

<Preparation of Multilayer Silver Halide Photosensitive Material Samples>

A polyethylene laminated paper reflection support (possessing a Taber stiffness of 3.5 and a PY value of 2.7 μm) having a weight of 115 g per m² was prepared by laminating high density polyethylene on one surface and laminating melted polyethylene containing 15 percent by weight of dispersed anatase-type titanium oxide on the other surface. Employing each of the above-mentioned Emulsion Em-G1, Emulsion Em-R1, and Emulsion Em-IFR1, each of the layer structures shown in Table 1, described below, was applied onto the surface of the titanium oxide containing polyethylene layer, and further, 6.00 g/m² of gelatin and 0.65 g/m² of a silica matting agent were applied onto the reverse surface, and thus, multilayer silver halide photosensitive material sample No. 101 was prepared. Further, added as hardeners were H-1 and H-2. Further, added as coating aids and dispersion aids were surface active agents SU-1, SU-2, and SU-3.

SU-1: sodium sulfosuccinate di(2-ethylhexyl)ester

SU-2: sodium sulfosuccinate di(2,2,3,3,4,4,5,5-octafluoropentyl)ester

SU-3: sodium tri-i-propylnaphthalenesulfonate

H-1: 2,4-dichloro-6-hydroxy-S-triazine sodium

H-2: tetrakis(vinylsulfonylmethyl)methane

TABLE 1

| Layer | Composition | Added Amount (g/m²) |
|---|---|---|
| 8th Layer (UV absorbing layer) | gelatin | 1.20 |
| | UV absorber (UV-1) | 0.075 |
| | UV absorber (UV-2) | 0.025 |
| | UV absorber (UV-3) | 0.100 |
| | silica matting agent | 0.01 |
| 7th Layer (red-sensitive layer) | gelatin | 1.20 |
| | red-sensitive silver halide emulsion (EM-R1) | 0.35 |
| | cyan coupler (C-1) | 0.40 |
| | antistaining agent (HQ-1) | 0.02 |
| | retarders T-1, T-2, and T-3 (in a mole ratio of 1:1:1) | 0.002 |
| | high boiling point organic solvent (SO-2) | 0.40 |
| 6th Layer (interlayer) | gelatin | 1.00 |
| | antistaining agents (HQ-2 and HQ-3 in equal weight parts) | 0.02 |
| 5th Layer (green-sensitive layer) | gelatin | 1.60 |
| | green-sensitive silver halide emulsion (Em-G1) | 0.40 |
| | magenta coupler (M-1) | 0.25 |
| | yellow coupler (Y-1) | 0.06 |
| | antistaining agent (HQ-1) | 0.035 |
| | retarders T-1, T-2, and T-3 (in a mole ratio of 1:1:1) | 0.004 |
| | high boiling point organic solvent (SO-1) | 0.38 |
| 4th Layer (interlayer) | gelatin | 1.00 |
| | antistaining agent HQ-3 and HQ-3 in equal weight parts | 0.02 |
| | antiirradiation dye (AI-1) | 0.035 |
| | antiirradiation dye (AI-2) | 0.030 |
| 3rd Layer (infrared-sensitive layer) | gelatin | 1.20 |
| | infrared-sensitive silver halide emulsion (Em-IFR1) | 0.48 |
| | yellow coupler (Y-1) | 0.20 |
| | yellow coupler (Y-2) | 0.20 |
| | antistaining agent (HQ-1) | 0.04 |
| | retarders (T-1, T-2, and T-3 in a mole ratio of 1:1:1) | 0.004 |
| | high boiling point organic solvent (SO-1) | 0.30 |

TABLE 2

| Layer | Composition | Added Amount (g/m²) |
|---|---|---|
| 2nd Layer (interlayer) | gelatin | 0.50 |
| | antistaining agents (HQ-2 and HQ-3 in equal weight parts) | 0.02 |
| | antiirradiation dye (AI-3) | 0.15 |
| 1st Layer (colored layer) | gelatin | 0.70 |
| | black colloidal silver | 0.05 |
| | styrene/n-butyl methacrylate/2-sulfoethyl methacrylate sodium salt | 0.35 |
| Support | polyethylene laminated paper (comprising minimal amount of colorants) | |

The added amount of silver halide emulsions is described in terms of silver.

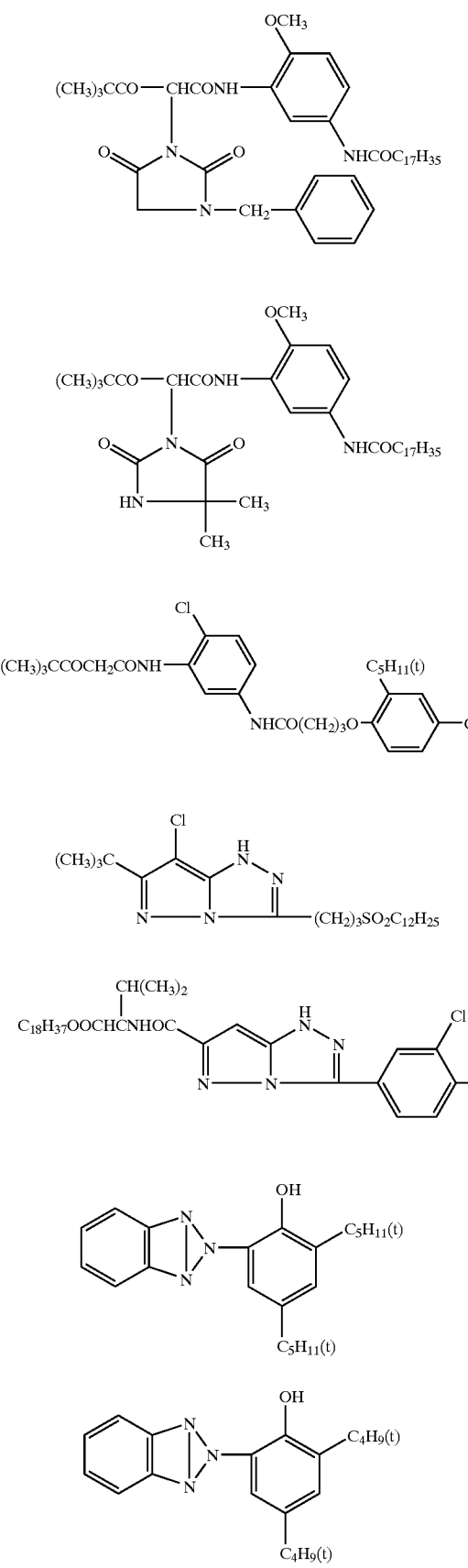
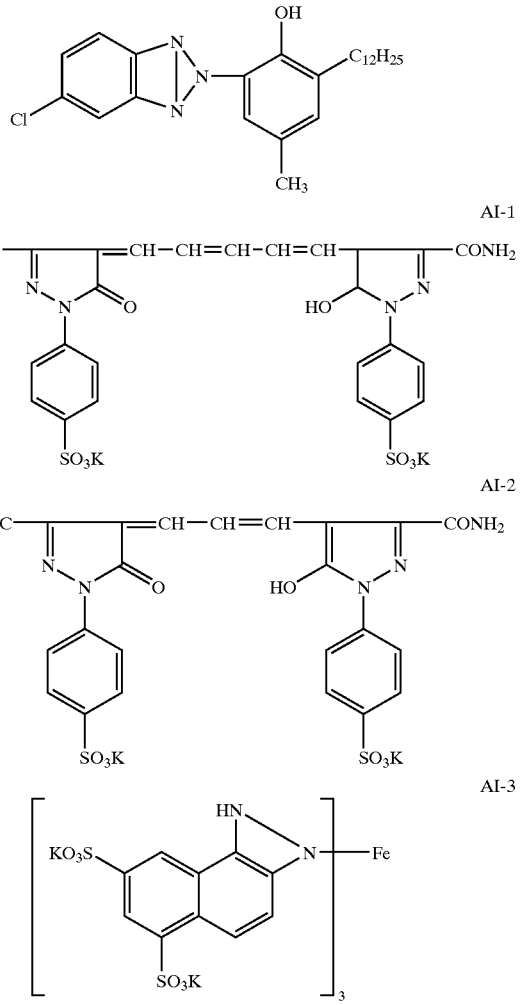

SO-1: trioctylphosfine oxide

SO-2: di(i-decyl)phthalate

HQ-1: 2,5-di(t-butyl)hydroquinone

HQ-2: 2,5-di[(1,1-dimethyl-4-hexyloxycarbonyl)butyl]hydroquinone

HQ-3: a mixture of 2,5-di-sec-dodecylhydroquinone and 2,5-di-sec-tetradecylhydroquinone, and 2-sec-dodecyl-5-sec-tetradecylhydroquinone in a weight ratio of 1:1:2

T-2: 1-(3-acetoamidophenyl)-5-mercaptotetrazole

T-3: N-benzyladenine

| (Processing Steps) | | |
|---|---|---|
| Processing Step | Temperature | Time |
| Immersion (Developer) | 37° C. | 12 seconds |
| Fogging exposure | — | 12 seconds |
| Development | 37° C. | 95 seconds |
| Bleach-fixing | 35° C. | 45 seconds |
| Stabilizing | 25 to 35° C. | 90 seconds |
| Drying | 50 to 85° C. | 40 seconds |

-continued

<Composition of Color Developer>

| | |
|---|---|
| Benzyl alcohol | 15.0 ml |
| Ethylene glycol | 8.0 ml |
| Diethylene glycol | 15.0 ml |
| Potassium sulfite | 2.5 g |
| Potassium bromide | 1.0 g |
| Potassium carbonate | 25.0 g |
| T-1 | 0.1 g |
| Hydroxylamine sulfate salt | 5.0 g |
| Sodium diethylenetriaminetetraacetate | 2.0 g |
| 4-Amino-N-ethyl-N-(β-hydroxyethyl) aniline sulfate | 4.5 g |
| Fluorescent whitening agent (4,4'-diaminostilbenedisulfonic acid derivative) | 1.0 g |
| Potassium hydroxide | 2.0 g |
| Water to make | 1000 ml |

The pH was adjusted to 10.15.

<Composition of the Bleach-fixer>

| | |
|---|---|
| Diethylenetriaminetetraacetic acid ferric ammonium | 90.0 g |
| Ammonium thiosulfate (70% aqueous solution) | 180.0 ml |
| Ammonium sulfite (40% aqueous solution) | 27.5 ml |
| 3-Mercapto-1,2,4-triazole | 0.15 |

The pH was adjusted to 7.1, employing potassium carbonate or glacial acetic acid, and the total volume was adjusted to 1000 ml, employing water.

<Composition of the Stabilizer>

| | |
|---|---|
| o-Phenylphenol | 0.1 g |
| 1-Hydroxyethylidene-1,1-disulfonic acid | 4.0 g |
| Diethylenetriamonetetraacetic acid | 2.0 g |
| Ammonium hydroxide (28% aqueous solution) | 0.7 g |
| Fluorescent whitening agent (4,4'-diaminostilbenedisulfonic acid derivative) | 1.0 g |
| Water to make | 1000 ml |

The pH was adjusted to 7.5, employing ammonium hydroxide or sulfuric acid.

Further, the stabilizing process was carried out employing a counter-current system composed of three tanks.

The compositions of replenishers for carrying out running processes are described below.

<Composition of Color Developer Replenisher>

| | |
|---|---|
| Benzyl alcohol | 18.5 ml |
| Ethylene glycol | 10.0 ml |
| Diethylene glycol | 18.0 ml |
| Potassium sulfite | 2.5 g |
| Potassium bromide | 0.2 g |
| Potassium carbonate | 25.0 g |
| T-1 | 0.1 g |
| Hydroxylamine sulfate salt | 5.0 g |
| Sodium diethylenetriaminetetraacetate | 2.0 g |
| 4-Amino-N-ethyl-N-(β-hydroxyethyl) aniline sulfate | 5.4 g |
| Fluorescent whitening agent (4,4'-diaminostilbenedisulfonic acid derivative) | 1.0 g |
| Potassium hydroxide | 2.0 g |
| Water to make | 1000 ml |

The pH was adjusted to 10.35.

<Composition of Bleach-fixer Replenisher>

Being the same as the bleach-fixer

<Composition of Stabilizer Replenisher>

Being the same as the stabilizer

Experimental Example 2

Prepared next, was a silver halide photosensitive material employing a negative-working silver halide emulsion containing a high ratio of silver chloride.

(Preparation of Infrared-sensitive Silver Halide Emulsion)

Simultaneously added to 1 liter of a 2% aqueous gelatin solution maintained at 40° C. were (A Solution) and (B Solution) mentioned below while the pAg was adjusted to 7.3 and the pH was adjusted to 3.0, and further, simultaneously added to the resulting mixture were (C Solution) and (D Solution) described below while the pAg was adjusted to 8.0 and the pH was adjusted to 5.5. At the same time, the pAg was controlled by a method described in Japanese Patent Publication Open to Public Inspection No. 59-45437, and the pH was controlled employing sulfuric acid or an aqueous sodium hydroxide solution.

| (A Solution) | |
|---|---|
| Sodium chloride | 3.42 g |
| Potassium bromide | 0.03 g |
| Water to make | 200 ml |
| (B Solution) | |
| Silver nitrate | 10 g |
| Water to make | 200 ml |
| (C Solution) | |
| Sodium chloride | 102.7 g |
| Potassium hexachloroiridate(IV) | $4 \times 10^{-8}$ mole |
| Potassium hexacyanoferrate(II) | $2 \times 10^{-5}$ mole |
| Potassium bromide | 1.0 g |
| Water to make | 600 ml |
| (D Solution) | |
| Silver nitrate | 300 g |
| Water to make | 600 ml |

After completing of addition, the resulting mixture was desalted employing a 5% aqueous solution of Demol N, manufactured by Kao-Atlas Co. and a 20% aqueous magnesium sulfate solution. The desalted mixture was mixed with an aqueous gelatin solution to obtain a monodispersed cubic grain emulsion having a silver chloride content ratio of 99.5 percent, an average grain diameter of 0.40 μm, and a variation coefficient of 0.08.

The above-mentioned EMP-201 was subjected to optimum chemical sensitization at 55° C. employing compounds described below to obtain an infrared-sensitive silver halide emulsion (Em-IR201).

| | |
|---|---|
| Sodium thiosulfate | 1.5 mg/mole AgX |
| Chloroauric acid | 1.0 mg/mole AgX |
| Stabilizer T-2 | $3 \times 10^{-4}$ mole/mole AgX |
| Stabilizer T-4 | $3 \times 10^{-4}$ mole/mole AgX |
| Stabilizer T-5 | $3 \times 10^{-4}$ mole/mole AgX |
| Sensitizing dye IRS-2 | $0.5 \times 10^{-4}$ mole/mole AgX |
| Sensitizing dye IRS-3 | $0.5 \times 10^{-4}$ mole/mole AgX |
| Supersensitizer SS | $2.0 \times 10^{-3}$ mole/mole AgX |

T-4: 1-phenyl-5-mercaptotetrazole

T-5: 1-(4-ethoxyphenyl)-5-mercaptotetrazole (Preparation of Green-sensitive Silver Halide Emulsion)

EMP-201 was subjected to optimum chemical sensitization at 55° C. employing the compounds described below to obtain a green-sensitive silver halide emulsion (Em-G2101).

| | |
|---|---|
| Sodium thiosulfate | 1.5 mg/mole AgX |
| Chloroauric acid | 1.0 mg/mole AgX |
| Stabilizer T-2 | $3 \times 10^{-4}$ mole/mole AgX |
| Stabilizer T-4 | $3 \times 10^{-4}$ mole/mole AgX |
| Stabilizer T-5 | $3 \times 10^{-4}$ mole/mole AgX |
| Sensitizing dye GS-1 | $4 \times 10^{-4}$ mole/mole AgX |

(Preparation of Red-sensitive Silver Halide Emulsion)

EMP-201 was subjected to optimum chemical sensitization at 60° C. employing the compounds described below to obtain red-sensitive silver halide emulsion (Em-R201).

| | |
|---|---|
| Sodium thiosulfate | 1.8 mg/mole AgX |
| Chloroauric acid | 2.0 mg/mole AgX |
| Stabilizer T-2 | $3 \times 10^{-4}$ mole/mole AgX |
| Stabilizer T-4 | $3 \times 10^{-4}$ mole/mole AgX |
| Stabilizer T-5 | $3 \times 10^{-4}$ mole/mole AgX |
| Sensitizing dye RS-3 | $1 \times 10^{-4}$ mole/mole AgX |
| Sensitizing dye RS-4 | $1 \times 10^{-4}$ mole/mole AgX |
| Supersensitizer SS | $2.0 \times 10^{-3}$ mole/mole AgX |

Employing the silver halide emulsions as described above, silver halide photosensitive material No. 201 was prepared under constitutions shown in Tables 4 and 5.

TABLE 3

| Layer | Composition | Added Amount (g/m²) |
|---|---|---|
| 8th Layer (UV absorbing layer) | gelatin | 1.20 |
| | UV absorber (UV-1) | 0.075 |
| | UV absorber (UV-2) | 0.025 |
| | UV absorber (UV-3) | 0.100 |
| | silica matting agent | 0.01 |
| 7th Layer (red-sensitive layer) | gelatin | 1.20 |
| | red-sensitive silver halide emulsion (EM-R201) | 0.25 |
| | cyan coupler (C-1) | 0.28 |
| | antistaining agent (HQ-1) | 0.014 |
| | high boiling point organic solvent (SO-2) | 0.28 |

TABLE 3-continued

| Layer | Composition | Added Amount (g/m²) |
|---|---|---|
| 6th Layer (interlayer) | gelatin | 1.50 |
| | antistaining agents (HQ-2 and HQ-3 in equal weight parts) | 0.45 |
| | PVP | 0.03 |
| | antiirradiation dye (AI-4) | 0.03 |
| 5th Layer (green-sensitive layer) | gelatin | 1.60 |
| | green-sensitive silver halide emulsion (Em-G201) | 0.40 |
| | magenta coupler (M-1) | 0.35 |
| | yellow coupler (Y-3) | 0.09 |
| | antistaining agent (HQ-1) | 0.05 |
| | high boiling point organic solvent (SO-1) | 0.13 |
| 4th Layer (interlayer) | gelatin | 1.00 |
| | antistaining agent HQ-3 and HQ-3 in equal weight parts | 0.30 |
| | antiirradiation dye (AI-5) | 0.03 |
| 3rd Layer (infrared-sensitive layer | gelatin | 1.20 |
| | infrared-sensitive silver halide emulsion (Em-IFR201) | 0.48 |
| | yellow coupler (Y-1) | 0.30 |
| | yellow coupler (Y-2) | 0.30 |
| | antistaining agent (HQ-1) | 0.06 |
| | high boiling point organic solvent (SO-1) | 0.45 |

TABLE 4

| Layer | Composition | Added Amount (g/m²) |
|---|---|---|
| 2nd Layer (interlayer) | gelatin | 0.50 |
| | antistaining agents (HQ-2 and HQ-3 in equal weight parts) | 0.02 |
| | antiirradiation dye (AI-6) | 0.20 |
| | antiirradiation dye (AI-7) | 0.20 |
| 1st Layer (colored layer) | gelatin | 0.70 |
| | black colloidal silver | 0.05 |
| | styrene/n-butyl methacrylate/2-sulfoethyl methacrylate sodium salt | 0.35 |
| Support | polyethylene laminated paper (comprising minimal amount of colorants) | |

The added amount of silver halide emulsions is described in terms of silver.

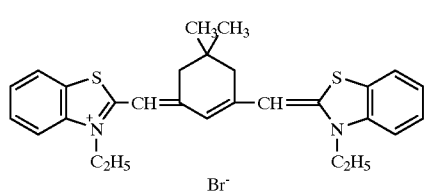

RS-3

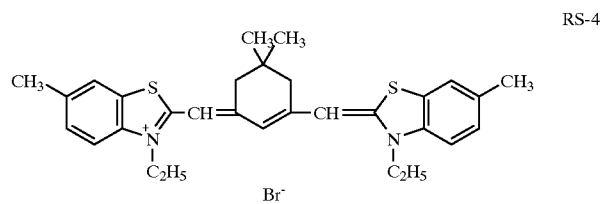

RS-4

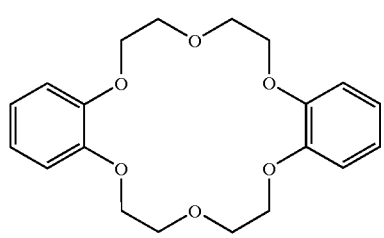

SS

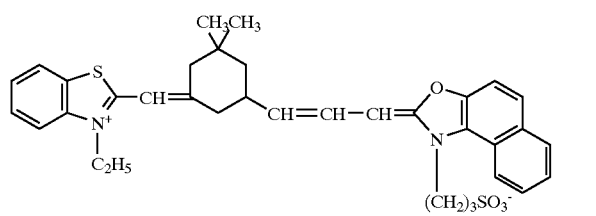

IRS-3

-continued

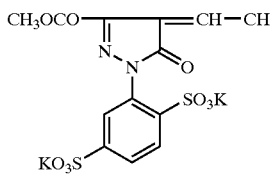 AI-4 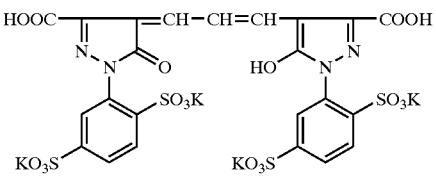 AI-5

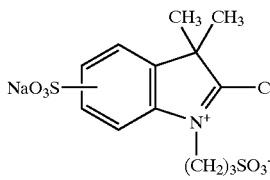 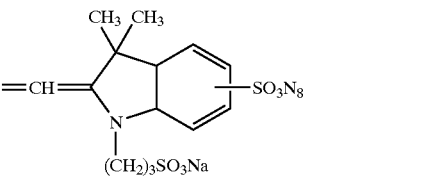 AI-6

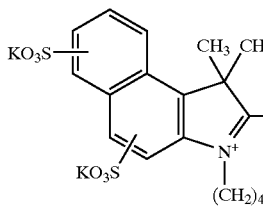 AI-7

Because a negative-working silver halide emulsion was employed, the processing steps were varied as follows.

| Processing Step | Processing Temperature | Time | Amount of Replenishment |
|---|---|---|---|
| Color Development | 38.0 ± 0.3° C. | 45 seconds | 80 ml |
| Bleach-fixing | 35.0 ± 0.5° C. | 45 seconds | 120 ml |
| Stabilizing | 30 to 34° C. | 60 seconds | 150 ml |
| Drying | 60 to 80° C. | 30 seconds | |

The composition of the color developer is shown below.

| Color Developer Tank Solution and Replenisher | Tank Solution | Replenisher |
|---|---|---|
| Deionized water | 800 ml | 800 ml |
| Triethylenediamine | 2 g | 3 g |
| Diethylene glycol | 10 g | 10 g |
| Potassium bromide | 0.01 g | — |
| Potassium chloride | 3.5 g | — |
| Potassium sulfite | 0.25 g | 0.5 g |
| N-ethyl-N-(β-hydroxyethyl)-4-aminoaniline sulfate salt | 2.9 g | 4.8 g |
| N,N-diethylhydroxylamine | 6.8 g | 6.0 g |
| Triethanolamine | 10.0 g | 10.0 g |
| Sodium diethylenetriamine-tetraacetate | 2.0 g | 2.0 g |
| Fluorescent Whitening agent (4,4'-diaminostylbenedisulfonic acid derivative) | 2.0 g | 2.5 g |
| Sodium carbonate | 30 g | 30 g |

The total volume was adjusted employing water. The pH of the tank solution was adjusted to 10.0, whole the pH of the replenisher was adjusted to 10.6.

Bleach-fixer Tamk Solution and Replenisher

| | |
|---|---|
| Diethylenetriaminetetraacetic acid ferric ammonium dihydrate | 65 g |
| Diethylenetriaminetetraacetic acid | 3 g |
| Ammonium thiosulfate (70% aqueous solution) | 100 ml |
| 2-Amino-5-mercapto-1,3,4-thiadiazole | 2 0 g |
| Ammonium sulfite (40% aqueous solution) | 27.5 ml |

The total volume was adjusted to 1 liter employing water, and the pH was adjusted to 5.0 employing potassium carbonate or glacial acetic acid.

Stabilizer Tank Solution and Replenosher

| | |
|---|---|
| o-Phenylphenol | 1.0 g |
| 5-Chloro-2-methyl-4-isothiazoline-3-on | 0.02 g |
| 2-Methyl-4-isothiazoline-3-on | 0.02 g |
| Diethyleneglycol | 1.0 g |
| Fluorescent whitening agent (Tinopal SFP) | 2.0 g |
| 1-Hydroxyethylidne-1,1-disulfonic acid | 1.8 g |
| Bismuth chloride (45% aqueous solution) | 0.65 g |
| Magnesium sulfate heptahydride salt | 0.2 g |
| PVP (polyvinylpyrrolidone) | 1.0 g |
| Aqueous ammonia (25% aqueous ammonium hydroxide solution) | 2.5 g |
| Nitrilotriacetic acid trisodium salt | 1.5 g |

The total volume was adjusted employing water and the pH was adjusted to 7.5 employing sulfuric acid or aqueous ammonia.

What is claimed is:

1. An image recording system, comprising:
   an image data producing apparatus to produce and output halftone dot image data corresponding to a single sheet of output image, for each of plural colors successively;
   an image recording apparatus comprising
      a drum, wherein a light sensitive material is fixed on an outer circumferential surface of the drum,
      a rotation driving mechanism to rotate the drum, an optical unit to expose the light sensitive material on the drum by plural color light simultaneously in according with the halftone dot image data of a plural colors N (N≧3) produced by the image data producing apparatus, and a sub-scanning mechanism to move the optical unit in a direction parallel to a rotation axis of the drum, whereby the image recording apparatus records a halftime dot image on the light sensitive material in such a way that the light sensitive material is fixed on the drum, the drum is rotated by the rotation driving mechanism, the optical unit exposes the light sensitive on the drum by plural color light in accordance with the halftime dot image data, and the sub-scanning mechanism moves the optical unit in a direction parallel to a rotation axis of the drum; and an image data storing apparatus to receive the halftone dot image of each of plural color successively from the image data producing apparatus and to output the halftone dot image data of the plural colors simultaneously to the image recording apparatus, the image data storing apparatus comprising plural memory devices each storing the halftone dot image data corresponding to a single sheet of the output image for one of plural colors N or N−1.

2. The image recording apparatus of claim 1, wherein the image data storing apparatus comprises a data arrangement changing apparatus to change an input arrangement of the half tone dot image data inputted sequentially for each color from the image data producing apparatus into a scanning arrangement to scan simultaneously plural (M) lines, whereby the image recording apparatus records simultaneously plural line images by the M scanning lines during a single rotation of the drum on the basis of the scanning arrangement rearranged by the data arrangement changing apparatus.

3. The image recording system of claim 2, wherein the data arrangement changing apparatus rearranges the input arrangement of the halftone dot image data corresponding to a single sheet of the output image so as to have a scanning arrangement for each of plural (N or N−1) colors and the memory device is provided for each of plural (N or N−1) colors and stores the halftone dot image data which are rearranged by the data arrangement changing apparatus and correspond to the single sheet of the output image.

4. The image recording system of claim 1, wherein the memory device is a disk type memory device.

5. The image recording system of claim 4, wherein the image data storing apparatus comprises a first buffer memory provided for each of plural (N) colors and the first buffer memory temporally stores and outputs the half tone dot image data read out in a predetermined sequential order from the disk type memory device, and wherein the first buffer memory adjusts irregularities in the read-out speed to read out the half tone dot image data from the disk type memory device.

6. The image recording system of claim 5, wherein the image data storing apparatus comprises a second buffer memory to temporally sequentially store the half tone dot image data outputted form the first buffer memory and to output sequentially the half tone dot image data, and wherein the second buffer memory adjusts a speed difference between an output speed at which the first buffer memory outputs the half tone dot image data and an input speed at which the half tone dot image data is inputted into the image recording apparatus and outputs the half tone dot image data to the image recording apparatus.

7. The image recording system of claim 2, wherein the data memory device is a disk type memory device, wherein the image data storing apparatus comprises a write buffer memory to temporally store the half tone dot image data rearranged by the data arrangement changing apparatus and to output sequentially the halftone dot image data, and wherein the write buffer memory adjusts a speed difference between an output speed at which the data arrangement changing apparatus outputs the half tone dot image data and a write-in speed at which the half tone dot image data is written into the disk type memory device and outputs the half tone dot image data to the disk type memory device.

8. The image recording system of claim 4, wherein the disk type memory device comprises plural memory regions which are separated physically and stores the half tone dot image data corresponding to a single sheet of the output image in substantially only one of the plural memory regions, and wherein the disk type memory device detects whether or not any of the plural memory regions has malfunctioned and does not use a memory region detected to have malfunctioned.

9. The image recording system of claim 8, wherein the disk type memory device detects from a read-out speed of the halftone dot image data whether or not the memory regions from which the halftone dot image data are read out has malfunctioned.

10. The image recording system of claim 8, wherein the halftone dot image data corresponding to a single sheet of the output image are physically continuously stored in one of the plural memory regions substantially.

11. The image recording system of claim 1, wherein the halftone dot image data storing apparatus comprises plural memory sets each comprising plural memory devices each provided for one of plural colors and a controller to control the plural memory sets such that halftone dot image data are written in a first memory set selected from the plural memory sets and halftone dot image data are read out from a second memory set which is different from the first memory and is selected form the plural memory sets.

12. In an image data storing apparatus for use in an image recording system provided with an image data producing apparatus to produce and output halftone dot image data corresponding to a single sheet of output image, for each of plural colors successively;

an image recording apparatus comprising a drum, wherein a light sensitive material is fixed on an outer circumferential surface of the drum, a rotation driving mechanism to rotate the drum, an optical unit to expose the light sensitive material on the drum by plural color light simultaneously in according with the halftone dot image data of a plural colors N (N≧3) produced by the image data producing apparatus, and a sub-scanning mechanism to move the optical unit in a direction parallel to a rotation axis of the drum, whereby the image recording apparatus records a halftime dot image on the light sensitive material in such a way that the light sensitive material is fixed on the drum, the drum is rotated by the rotation driving mechanism, the optical unit exposes the light sensitive on the drum by plural color light in accordance with the halftime dot image data, and the sub-scanning mechanism moves the optical unit in a direction parallel to a rotation axis of the drum; and an image data storing apparatus to receive the halftone dot image of each of plural color successively from the image data producing apparatus and to output the halftone dot image data of the plural colors simultaneously to the image recording apparatus;

the image data storing apparatus is characterized by comprising plural memory devices each storing the halftone dot image data corresponding to a single sheet of the output image for one of plural colors N or N−1.

* * * * *